(12) United States Patent
Shinkai et al.

(10) Patent No.: US 10,055,067 B2
(45) Date of Patent: Aug. 21, 2018

(54) SENSOR DEVICE, INPUT DEVICE, AND ELECTRONIC APPARATUS

(71) Applicant: Sony Corporation, Tokyo (JP)

(72) Inventors: Shogo Shinkai, Kanagawa (JP); Kei Tsukamoto, Kanagawa (JP); Tomoko Katsuhara, Kanagawa (JP); Hiroto Kawaguchi, Kanagawa (JP); Hayato Hasegawa, Kanagawa (JP); Fumihiko Iida, Kanagawa (JP); Takayuki Tanaka, Kanagawa (JP); Tomoaki Suzuki, Kanagawa (JP); Taizo Nishimura, Kanagawa (JP); Hiroshi Mizuno, Kanagawa (JP); Yasuyuki Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 109 days.

(21) Appl. No.: 14/774,732

(22) PCT Filed: Feb. 6, 2014

(86) PCT No.: PCT/JP2014/000632
§ 371 (c)(1),
(2) Date: Sep. 11, 2015

(87) PCT Pub. No.: WO2014/147943
PCT Pub. Date: Sep. 25, 2014

(65) Prior Publication Data
US 2016/0026297 A1    Jan. 28, 2016

(30) Foreign Application Priority Data

Mar. 18, 2013  (JP) .................................. 2013-055782
Sep. 11, 2013  (JP) .................................. 2013-188831

(51) Int. Cl.
*G06F 3/045*     (2006.01)
*G06F 3/044*     (2006.01)
(Continued)

(52) U.S. Cl.
CPC .......... *G06F 3/044* (2013.01); *G06F 3/03547* (2013.01); *G06F 3/0416* (2013.01);
(Continued)

(58) Field of Classification Search
CPC .... G06F 3/044; G06F 3/03547; G06F 3/0416; G06F 2203/0414; G06F 2203/04112
(Continued)

(56) References Cited

U.S. PATENT DOCUMENTS 4,687,885 A     8/1987  Talmage, Jr. et al.
5,561,326 A *   10/1996 Ito ...................... C23C 14/0641
                                                                257/751
(Continued)

FOREIGN PATENT DOCUMENTS

EP    2 544 081 A2   1/2013
JP    63-121219 A    5/1988
(Continued)

OTHER PUBLICATIONS

U.S. Appl. No. 14/914,405, filed Feb. 25, 2016, Itaya et al.
(Continued)

*Primary Examiner* — Mark Regn
(74) *Attorney, Agent, or Firm* — Wolf, Greenfield & Sacks, P.C.

(57) ABSTRACT

[Object] To provide a sensor device capable of detecting an operation position and a pressing force with high accuracy. [Solution] A sensor device includes a first conductor layer, an electrode substrate, and a plurality of first structural bodies configured to separate the first conductor layer from the electrode substrate. At least one of the first conductor
(Continued)

layer and the electrode substrate has flexibility. The electrode substrate includes a plurality of first electrodes and a plurality of second electrodes intersecting the plurality of first electrodes. At least one of the first and second electrodes includes a plurality of sub-electrodes.

16 Claims, 65 Drawing Sheets

(51) Int. Cl.
    *G06F 3/0354*     (2013.01)
    *G06F 3/041*     (2006.01)

(52) U.S. Cl.
    CPC .............. *G06F 2203/04104* (2013.01); *G06F 2203/04112* (2013.01)

(58) Field of Classification Search
    USPC ........................................................ 345/174
    See application file for complete search history.

(56) References Cited

U.S. PATENT DOCUMENTS

| | | |
|---|---|---|
| 5,815,141 A | 9/1998 | Phares |
| 6,094,981 A | 8/2000 | Hochstein |
| 6,708,564 B2 | 3/2004 | Ishikawa et al. |
| 6,979,873 B2 | 12/2005 | Fujii |
| 7,249,509 B2 | 7/2007 | Hirano |
| 7,513,154 B2 | 4/2009 | Ino |
| 7,603,903 B2 | 10/2009 | Ohta |
| 8,063,886 B2 | 11/2011 | Serban et al. |
| 8,225,660 B2 | 7/2012 | Sakai et al. |
| 8,256,288 B2 | 9/2012 | Matsunaga |
| 8,826,734 B2 | 9/2014 | Ohkoshi et al. |
| 8,913,031 B2 | 12/2014 | Honda et al. |
| 9,310,200 B2 | 4/2016 | Kabasawa et al. |
| 9,664,947 B2 | 5/2017 | Kawaura |
| 9,760,183 B2 | 9/2017 | Kawaguchi et al. |
| 9,785,297 B2 | 10/2017 | Kawaguchi et al. |
| 9,811,226 B2 | 11/2017 | Itaya et al. |
| 2003/0127308 A1 | 7/2003 | Chen et al. |
| 2003/0154787 A1 | 8/2003 | Yoshiuchi et al. |
| 2004/0096594 A1 | 5/2004 | Takeuchi et al. |
| 2005/0217373 A1 | 10/2005 | Ishikawa et al. |
| 2006/0147701 A1 | 7/2006 | Lockridge |
| 2007/0044557 A1 | 3/2007 | Takemasa et al. |
| 2007/0229464 A1 | 10/2007 | Hotelling et al. |
| 2008/0180585 A1 | 7/2008 | Kubota et al. |
| 2008/0202251 A1 | 8/2008 | Serban et al. |
| 2009/0122026 A1 | 5/2009 | Oh |
| 2009/0135162 A1* | 5/2009 | Van De Wijdeven ............ G06F 3/0421 345/175 |
| 2009/0231305 A1 | 9/2009 | Hotelling et al. |
| 2009/0256825 A1 | 10/2009 | Klinghult et al. |
| 2010/0026659 A1 | 2/2010 | Long et al. |
| 2010/0307242 A1 | 12/2010 | Sakai et al. |
| 2011/0025631 A1 | 2/2011 | Han |
| 2011/0069036 A1 | 3/2011 | Anno |
| 2011/0074728 A1 | 3/2011 | Liu |
| 2011/0090175 A1 | 4/2011 | Mamba et al. |
| 2011/0115738 A1 | 5/2011 | Suzuki et al. |
| 2011/0175845 A1 | 7/2011 | Honda et al. |
| 2011/0181548 A1* | 7/2011 | Sekiguchi ............... G06F 3/044 345/174 |
| 2011/0212661 A1 | 9/2011 | Lee et al. |
| 2011/0240989 A1 | 10/2011 | Sekine et al. |
| 2012/0038583 A1 | 2/2012 | Westhues et al. |
| 2012/0070614 A1 | 3/2012 | Takahashi et al. |
| 2012/0086666 A1 | 4/2012 | Badaye et al. |
| 2012/0098783 A1 | 4/2012 | Badaye et al. |
| 2012/0098788 A1 | 4/2012 | Sekiguchi |
| 2012/0113071 A1 | 5/2012 | Kawaguchi et al. |
| 2012/0169625 A1* | 7/2012 | Fan ........................ G06F 3/044 345/173 |
| 2012/0218221 A1 | 8/2012 | Igeta |
| 2012/0235953 A1 | 9/2012 | Kim et al. |
| 2012/0298497 A1 | 11/2012 | Maeda et al. |
| 2013/0033450 A1 | 2/2013 | Coulson et al. |
| 2013/0076994 A1 | 3/2013 | Kawaura |
| 2013/0234734 A1* | 9/2013 | Iida ........................ G06F 3/044 324/661 |
| 2014/0007682 A1 | 1/2014 | Kabasawa et al. |
| 2014/0299360 A1 | 10/2014 | Yoshida |
| 2015/0212633 A1 | 7/2015 | Yamagishi et al. |
| 2015/0270076 A1 | 9/2015 | Katsuhara et al. |
| 2015/0277626 A1 | 10/2015 | Shinkai et al. |
| 2015/0280708 A1 | 10/2015 | Goto et al. |
| 2015/0346839 A1 | 12/2015 | Kawaguchi et al. |
| 2015/0363023 A1 | 12/2015 | Kawaguchi et al. |
| 2016/0011691 A1 | 1/2016 | Shinkai et al. |
| 2016/0023444 A1 | 1/2016 | Uejukkoku et al. |
| 2016/0188039 A1 | 6/2016 | Yoon et al. |
| 2016/0202800 A1 | 7/2016 | Itaya et al. |
| 2016/0294388 A1 | 10/2016 | Kawaguchi et al. |
| 2017/0364182 A1 | 12/2017 | Kawaguchi et al. |

FOREIGN PATENT DOCUMENTS

| | | |
|---|---|---|
| JP | 03-020832 A | 2/1991 |
| JP | 04-125722 A | 4/1992 |
| JP | 2007-272898 A | 10/2007 |
| JP | 2008-181438 A | 8/2008 |
| JP | 2009-123106 A | 6/2009 |
| JP | 2009-169523 A | 7/2009 |
| JP | 2009-211531 A | 9/2009 |
| JP | 2011-065515 A | 3/2011 |
| JP | 2011-154512 A | 8/2011 |
| JP | 2011-170659 A | 9/2011 |
| JP | 2011-175528 A | 9/2011 |
| JP | 2012-133580 A | 7/2012 |
| JP | 2012-178093 A | 9/2012 |
| JP | 2013-015976 A | 1/2013 |
| JP | 2013-105275 A | 5/2013 |
| WO | WO 97/040482 A1 | 10/1997 |
| WO | WO 2013/132736 A1 | 9/2013 |
| WO | WO 2014/125539 A1 | 8/2014 |

OTHER PUBLICATIONS

U.S. Appl. No. 13/608,048, filed Sep. 10, 2012, Kawaura.
U.S. Appl. No. 13/069,669, filed Mar. 23, 2011, Sekine et al.
U.S. Appl. No. 13/286,487, filed Nov. 1, 2011, Kawaguchi et al.
U.S. Appl. No. 13/927,299, filed Jun. 26, 2013, Kabasawa et al.
U.S. Appl. No. 14/665,063, filed Mar. 23, 2015, Goto et al.
U.S. Appl. No. 14/644,666, filed Mar. 11, 2015, Katsuhara et al.
U.S. Appl. No. 12/940,309, filed Nov. 5, 2010, Honda et al.
U.S. Appl. No. 14/661,368, filed Mar. 18, 2015, Shinkai et al.
U.S. Appl. No. 14/759,667, filed Jul. 8, 2015, Kawaguchi et al.
U.S. Appl. No. 14/763,657, filed Jul. 27, 2015, Kawaguchi et al.
U.S. Appl. No. 14/771,918, filed Sep. 1, 2015, Shinkai et al.
U.S. Appl. No. 14/777,776, filed Sep. 17, 2015, Kawaguchi.
U.S. Appl. No. 15/694,688, filed Sep. 1, 2017, Kawaguchi et al.
U.S. Appl. No. 15/784,108, filed Oct. 14, 2017, Itaya et al.

\* cited by examiner

FIG. 5
A
B
C
D
E
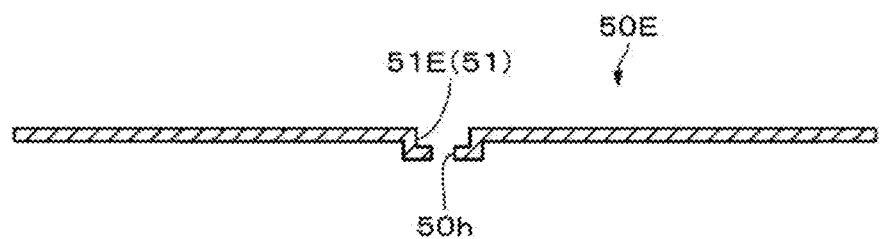

FIG. 6
A
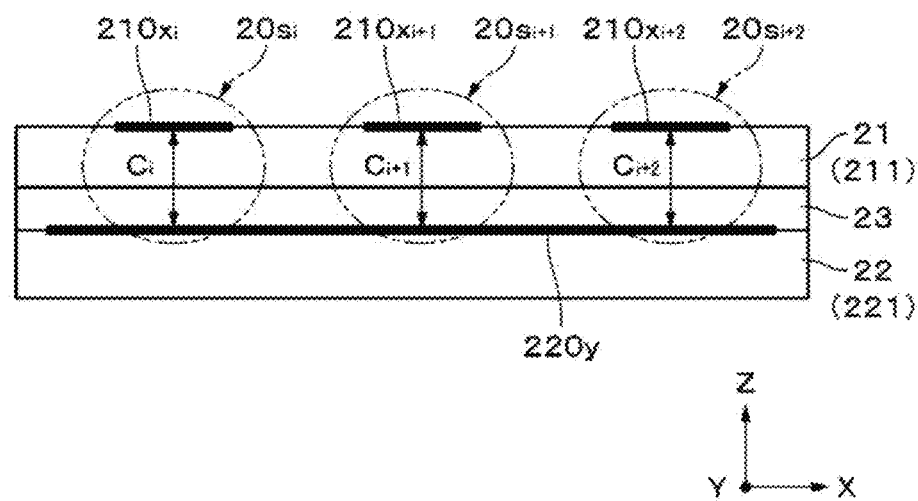
B
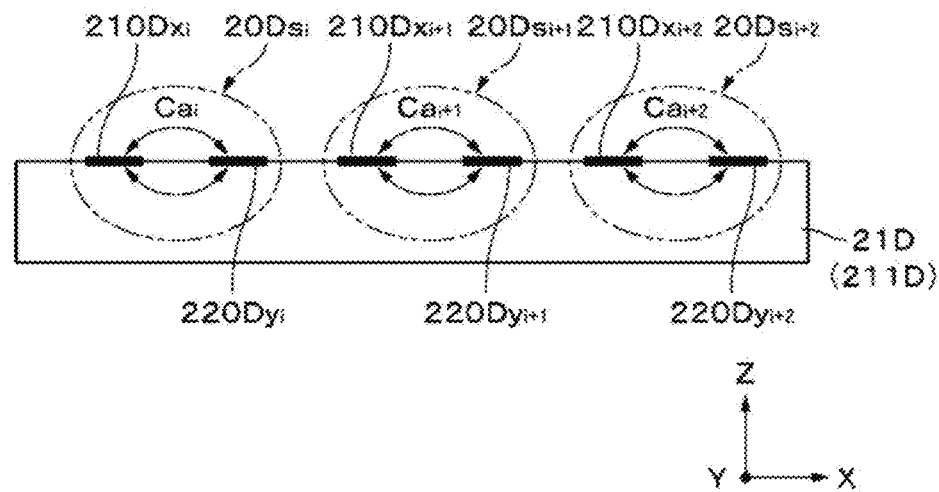

FIG.7
A
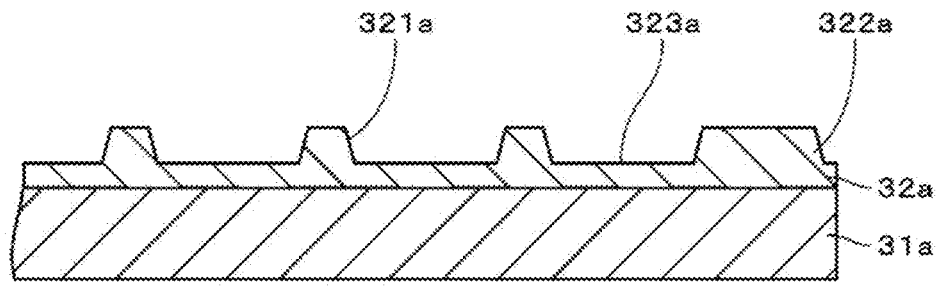
B
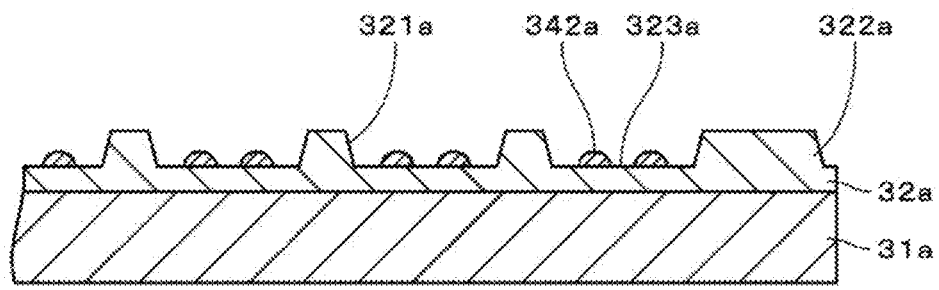
C
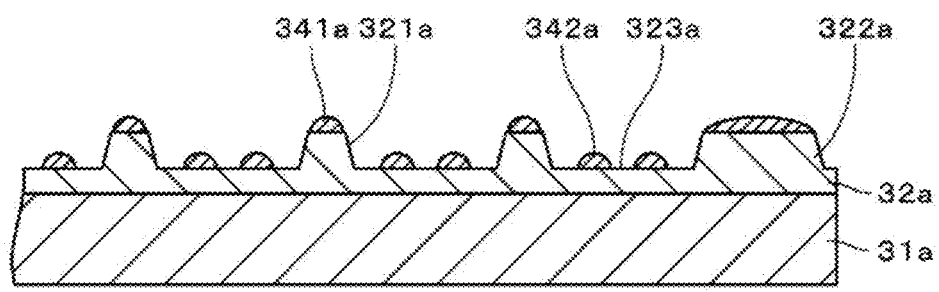

FIG. 9
A
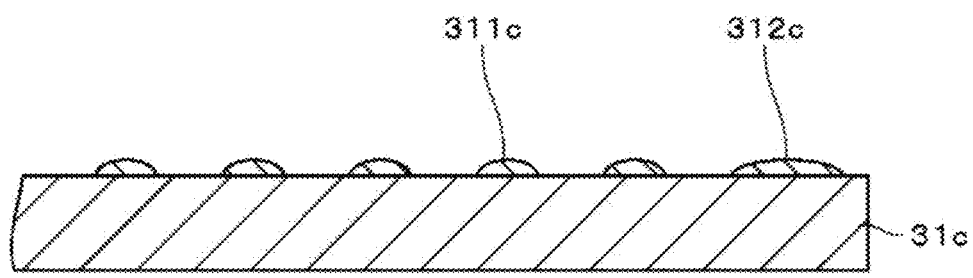
B
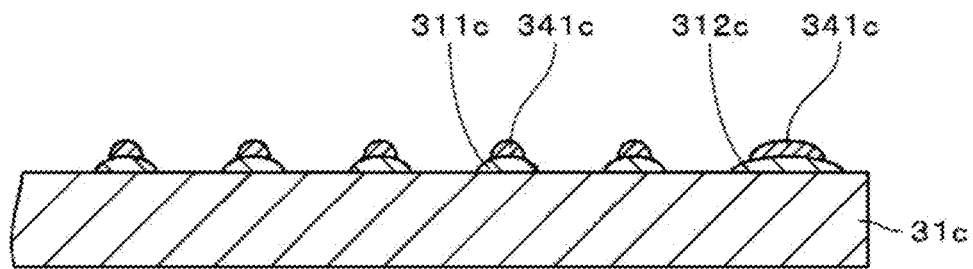

FIG. 10
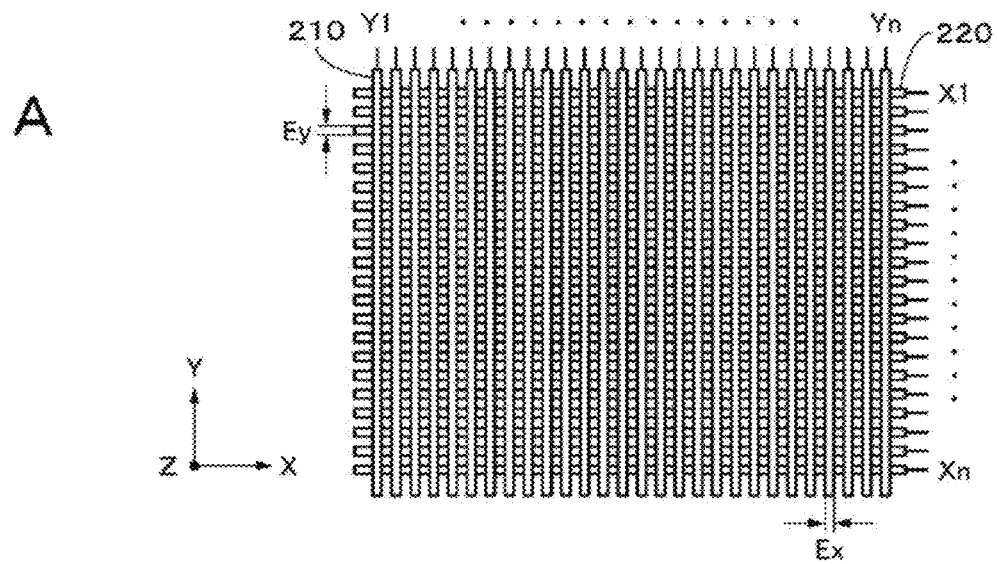
A
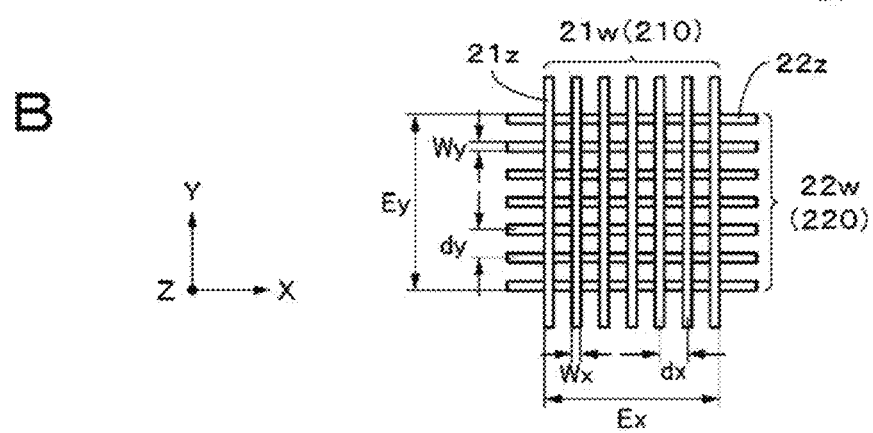
B
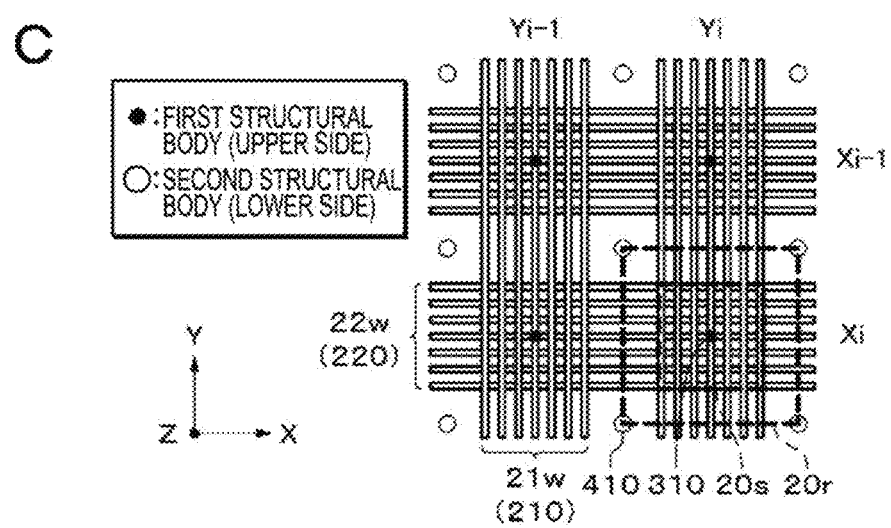
C

FIG. 11
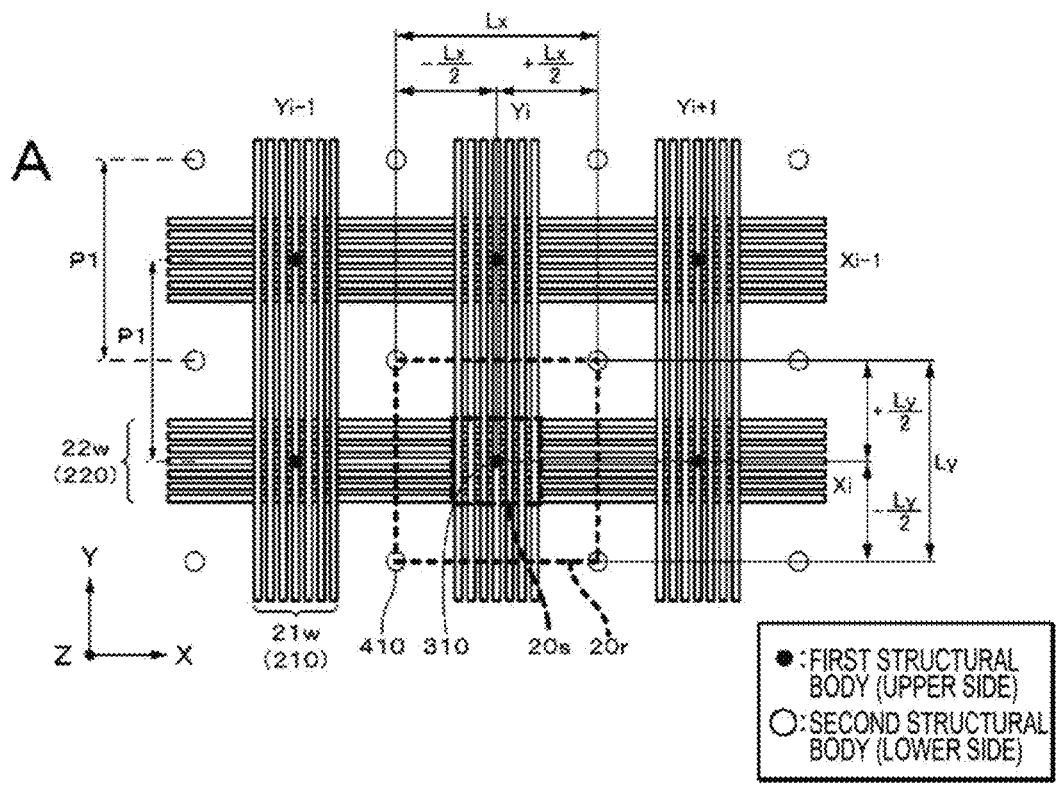
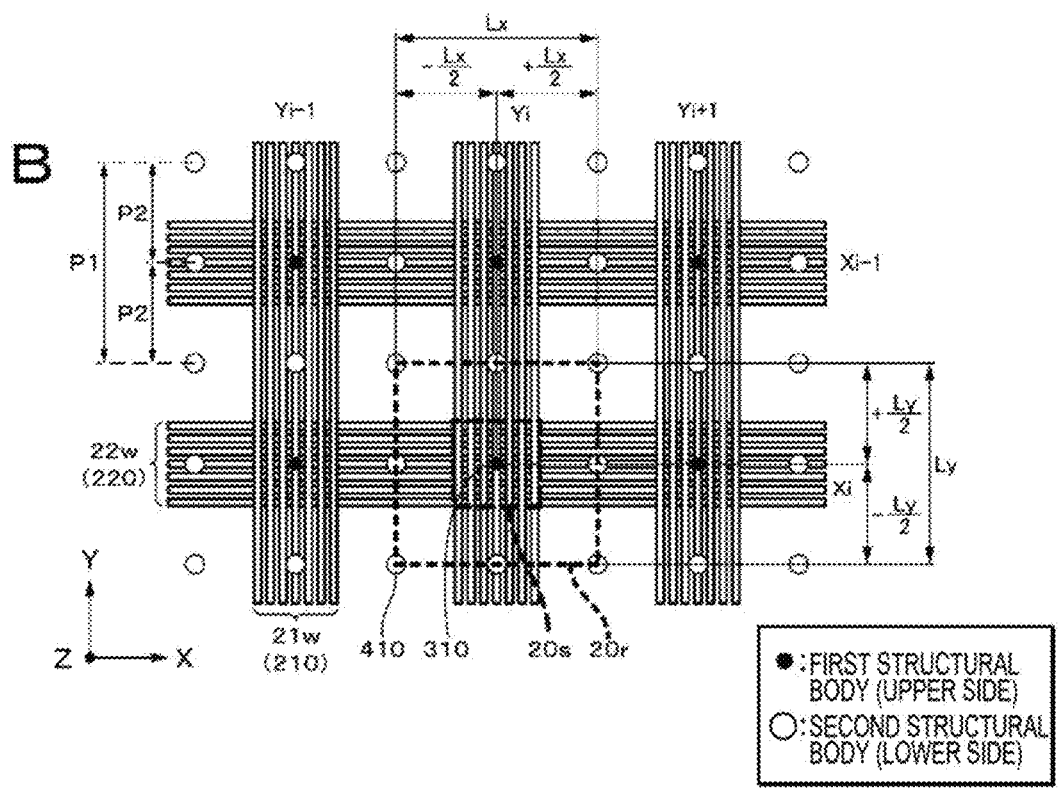

FIG. 13
A
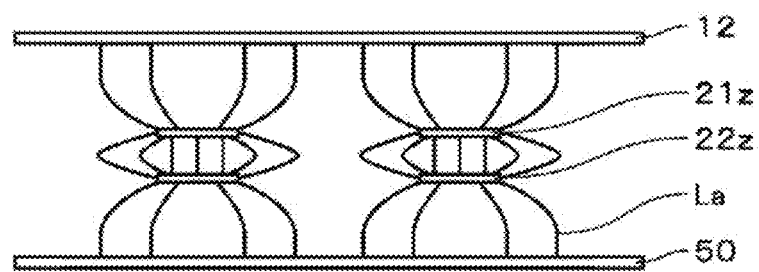
B
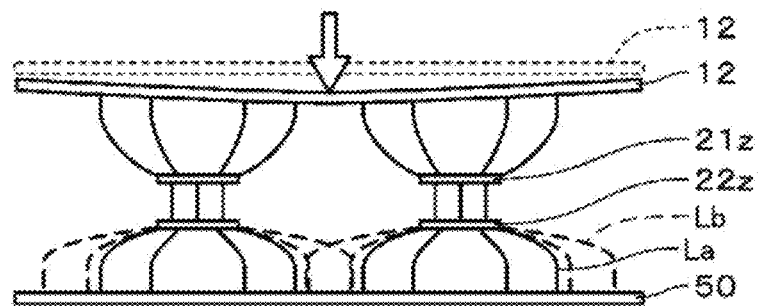

FIG. 14
A
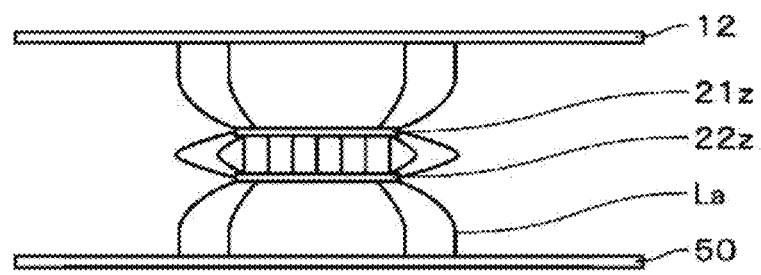
B
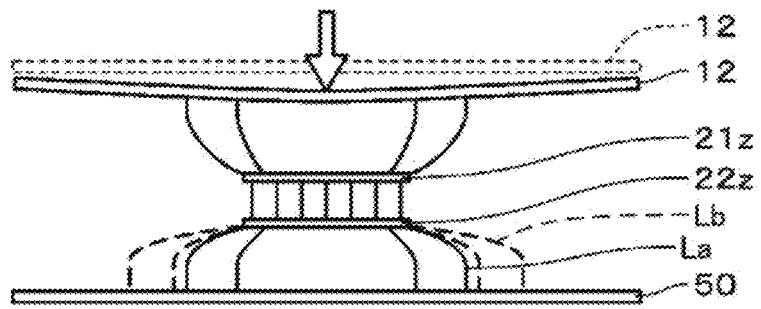

FIG. 19
A
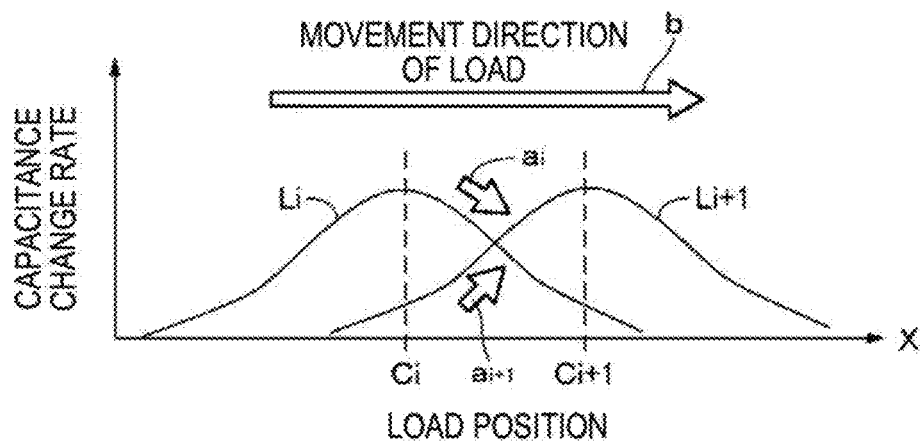
B
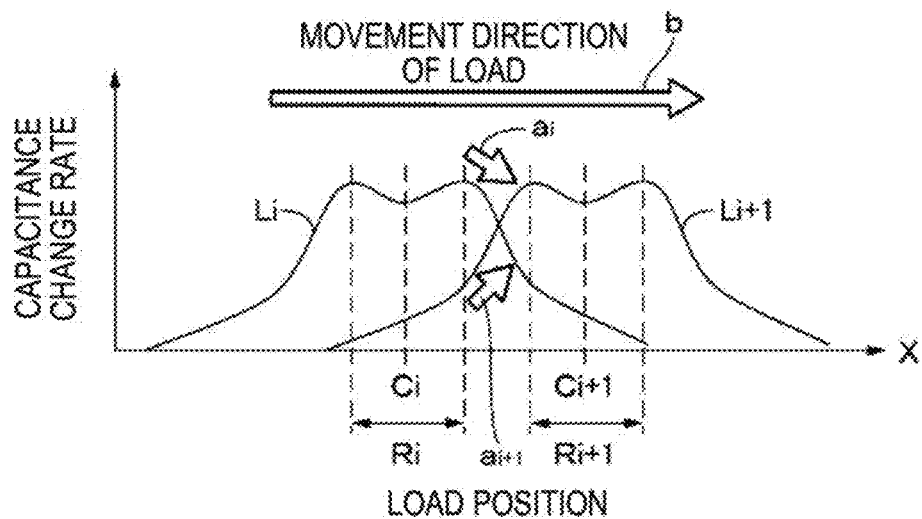

FIG. 21
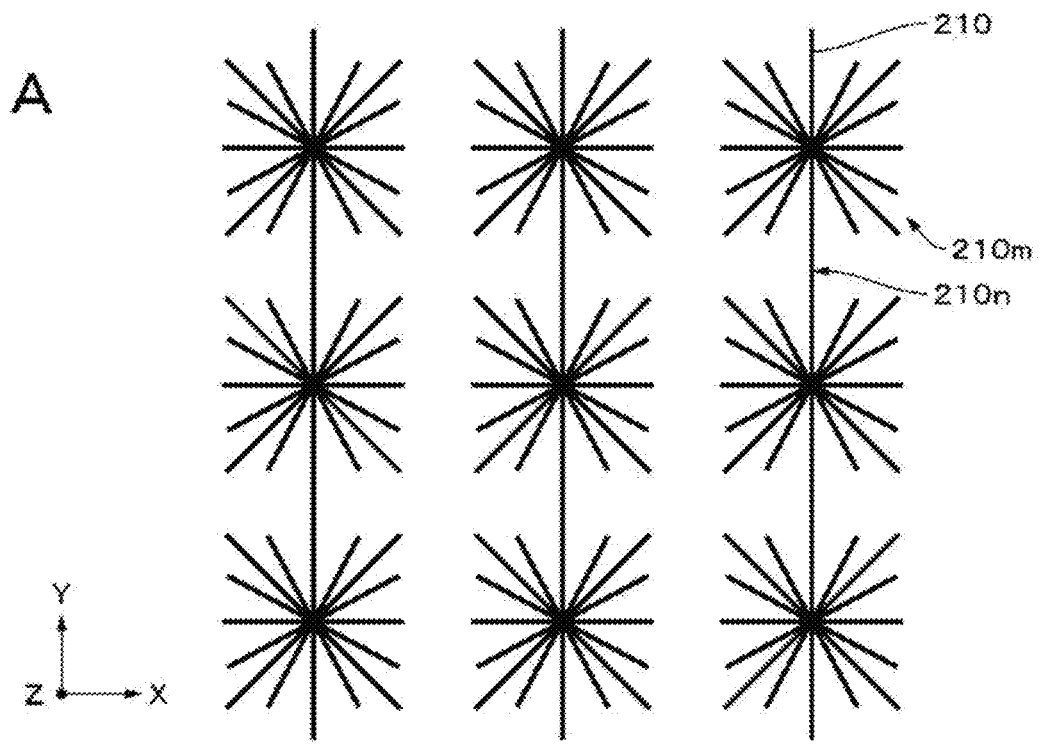
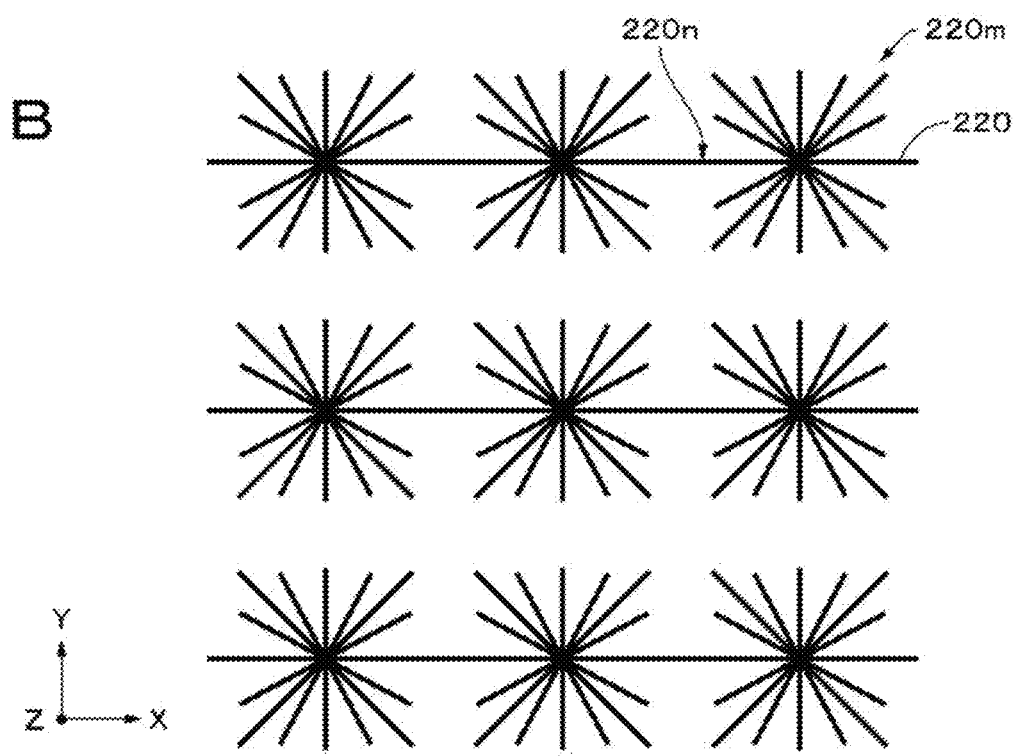

FIG. 25
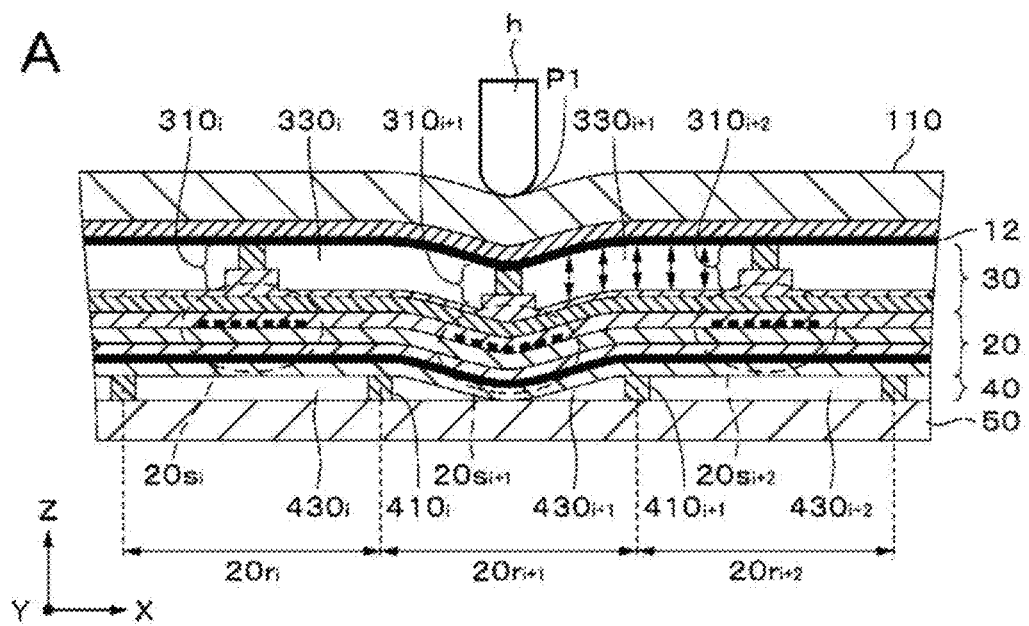
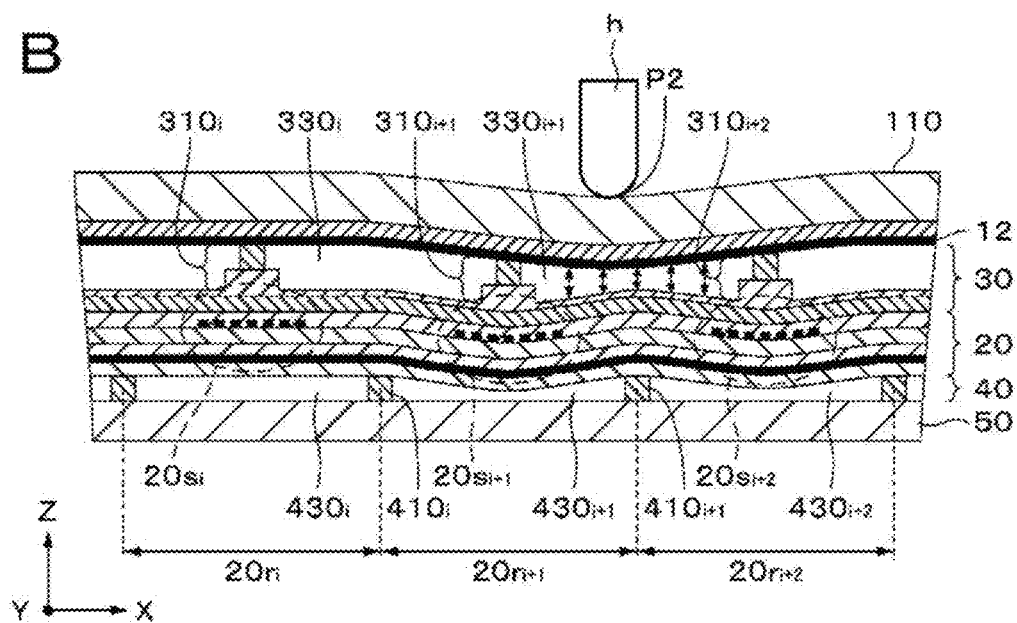

FIG. 26
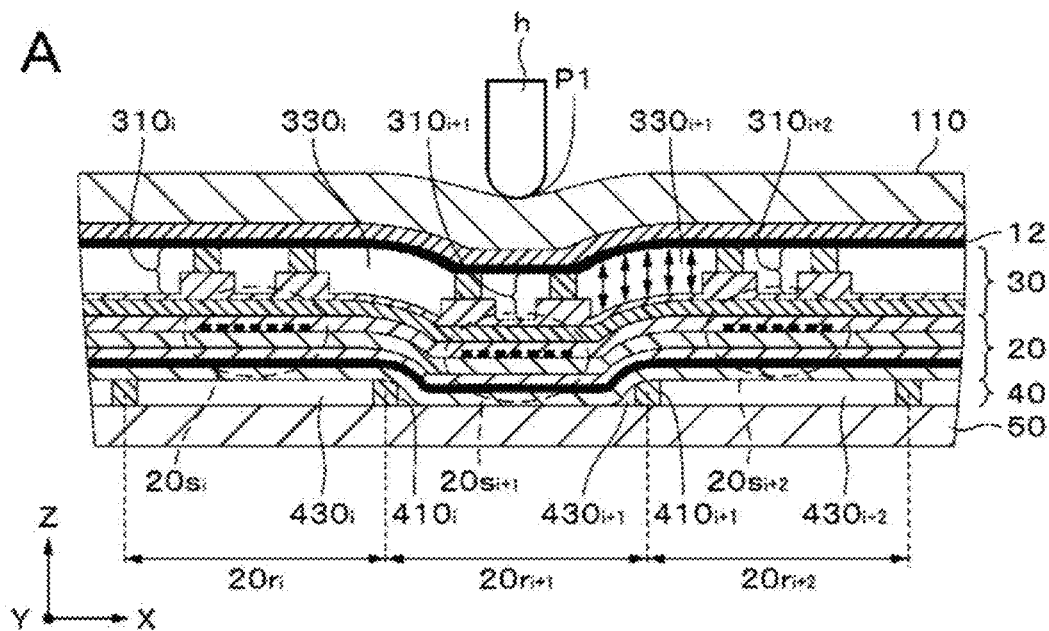
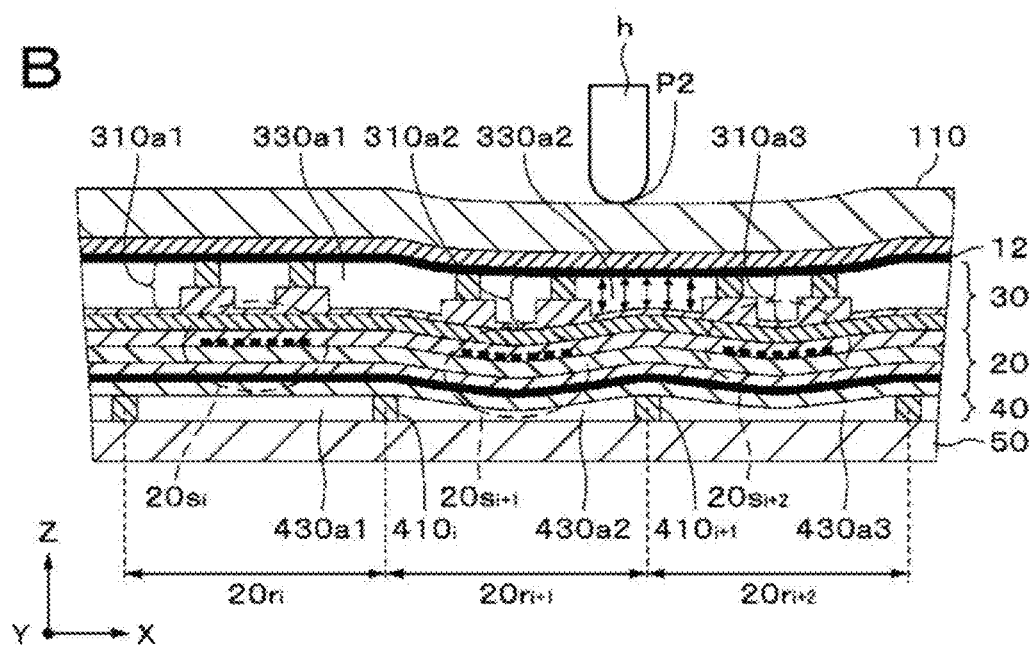

FIG. 27
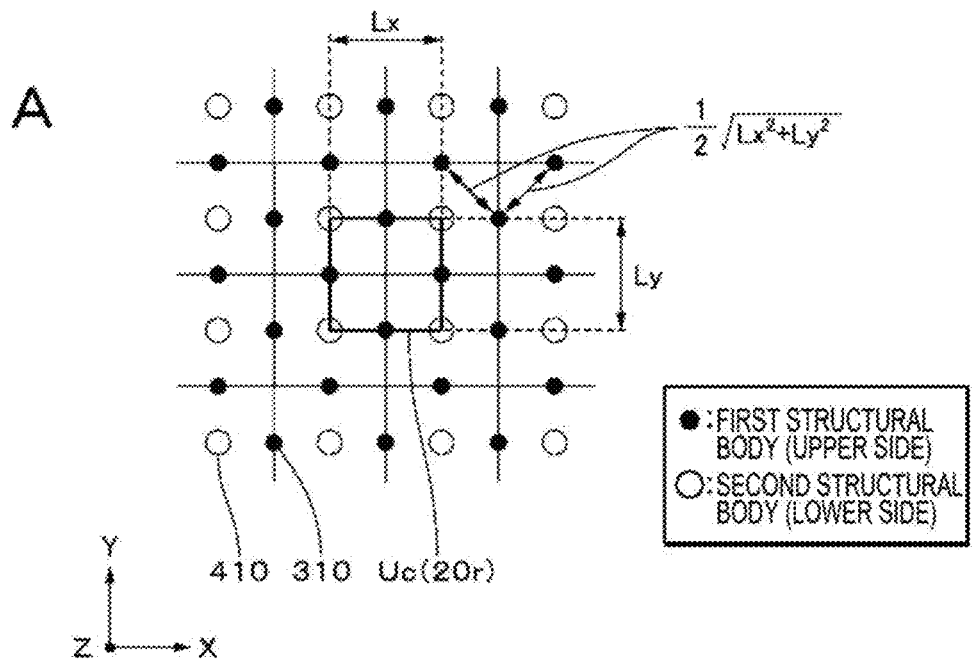
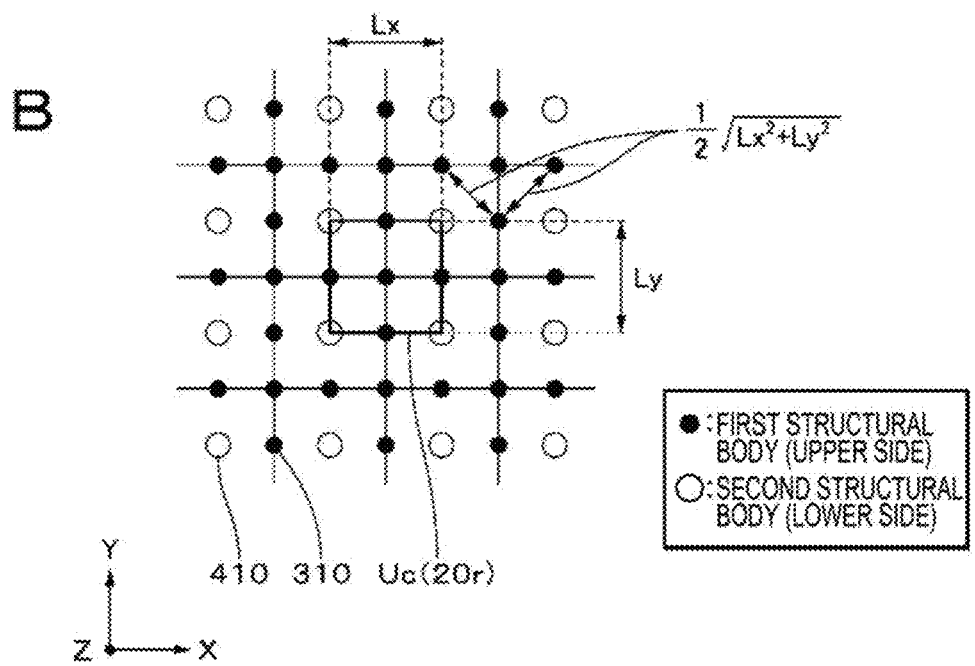

FIG. 28
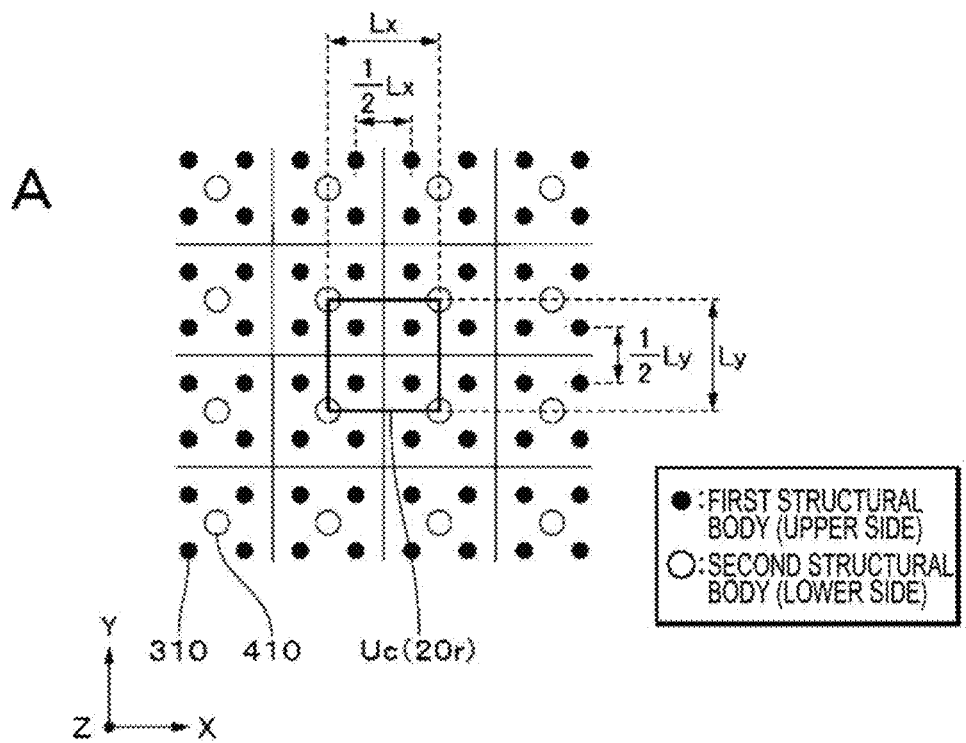
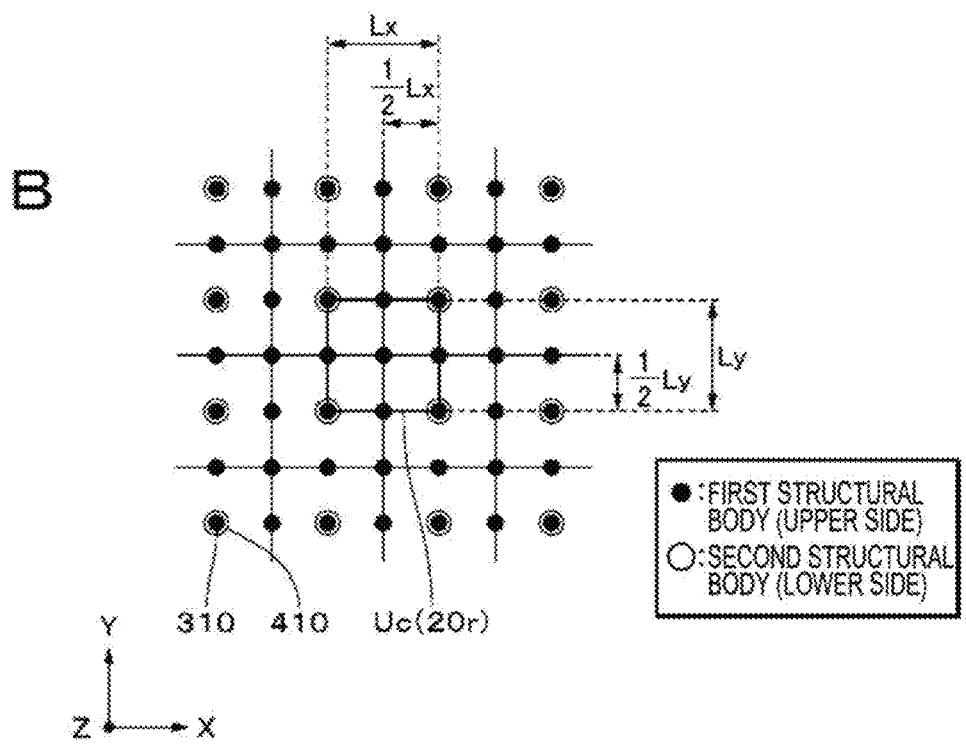

FIG. 29
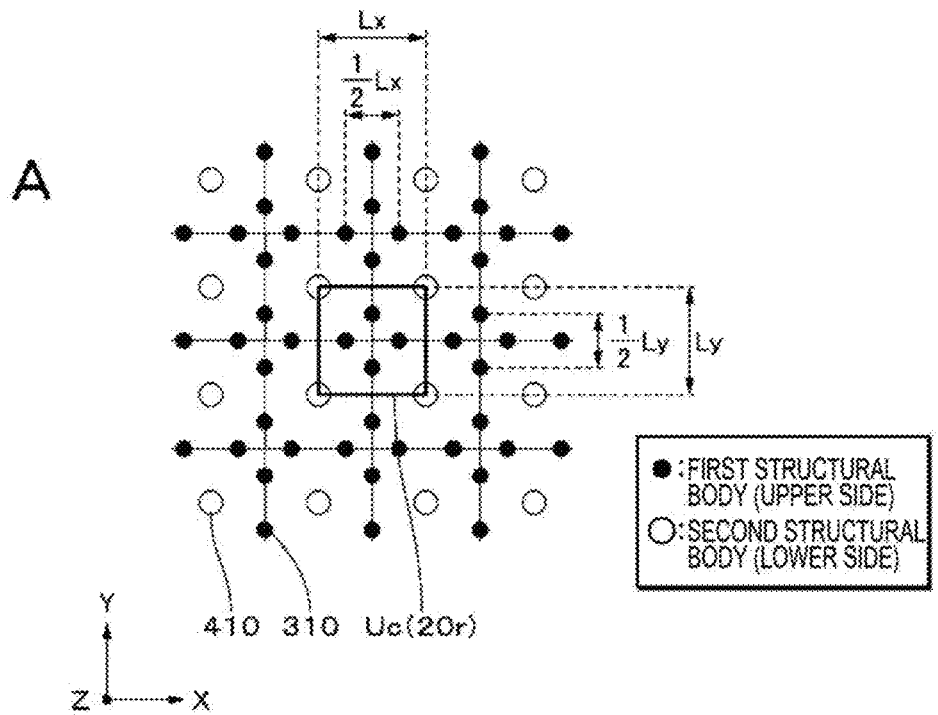
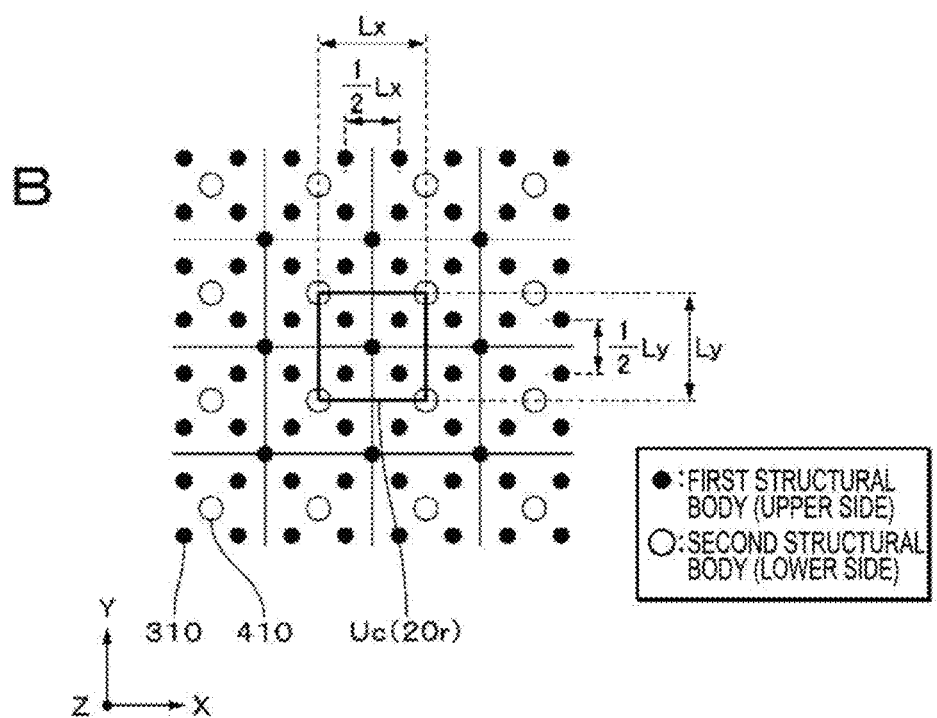

FIG. 31
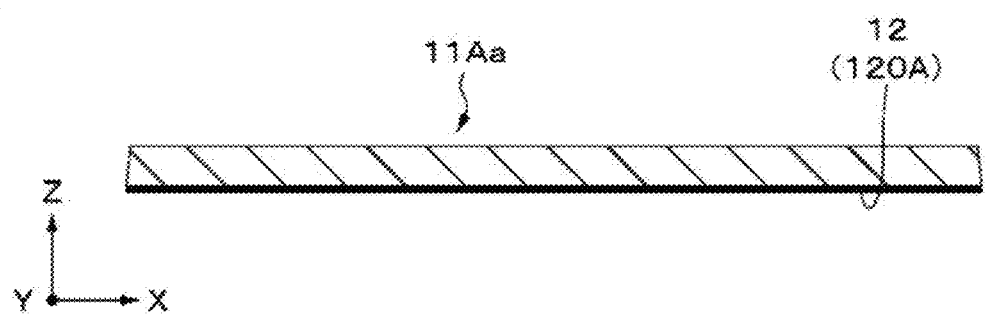
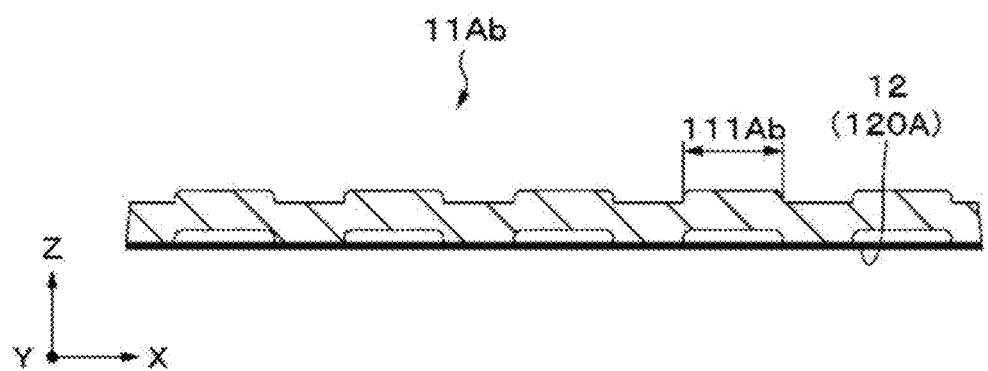

FIG. 33
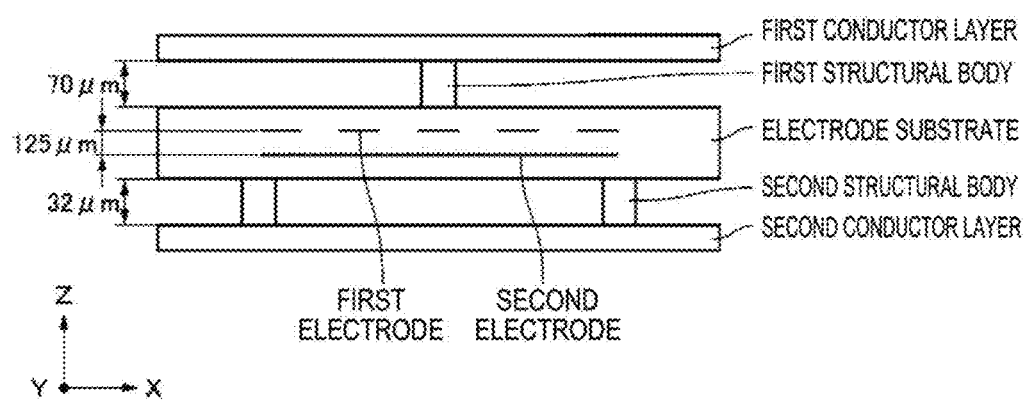
A
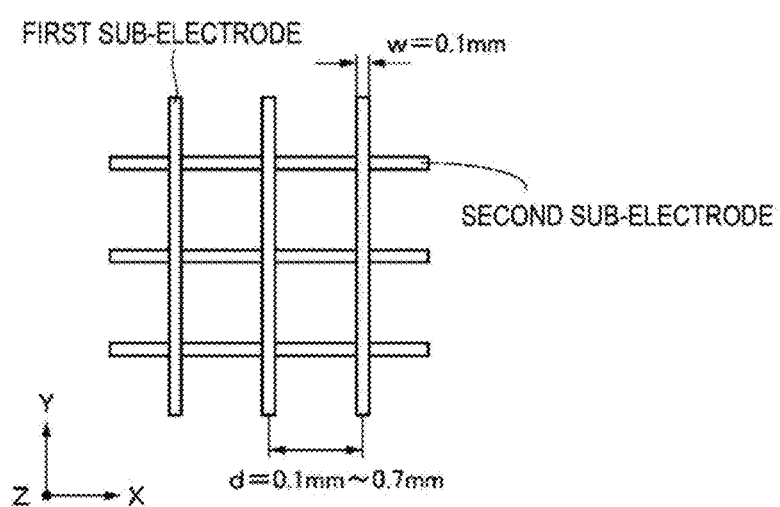
B

FIG. 34
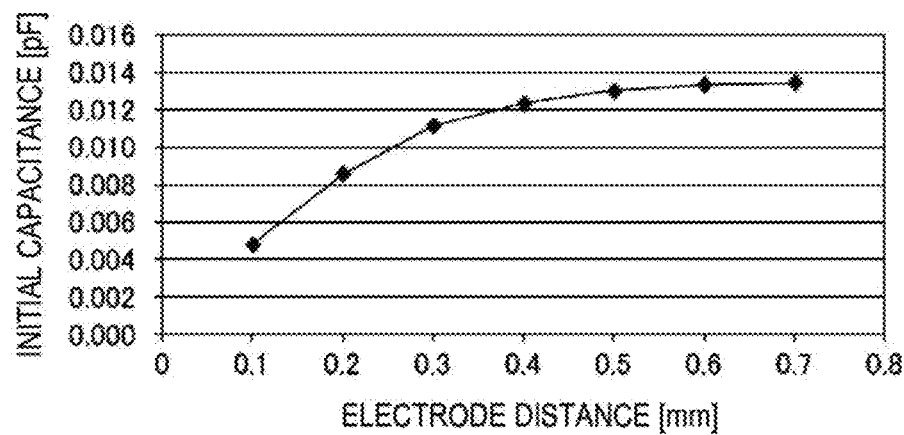
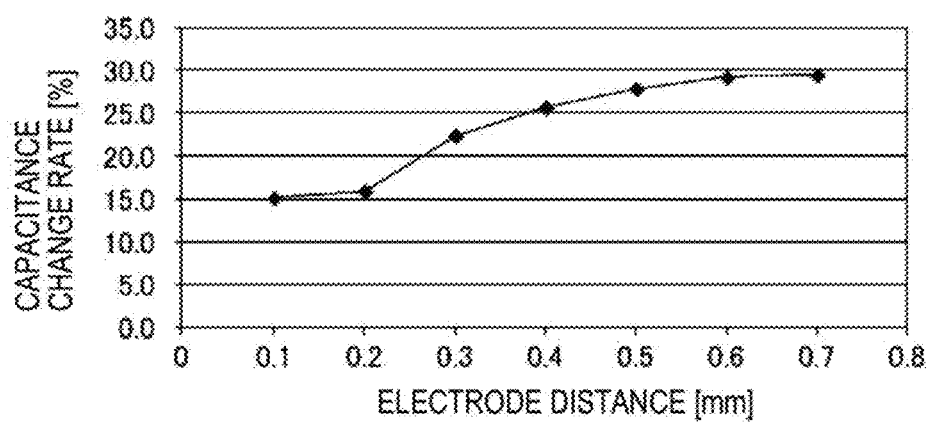

FIG. 35
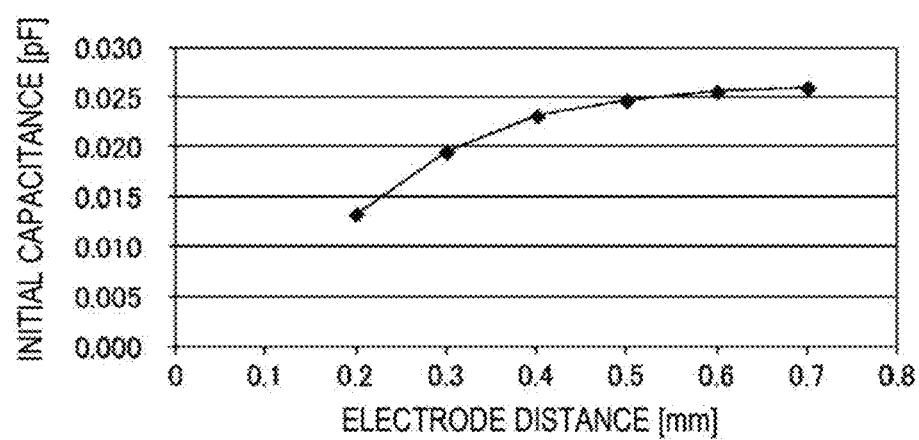
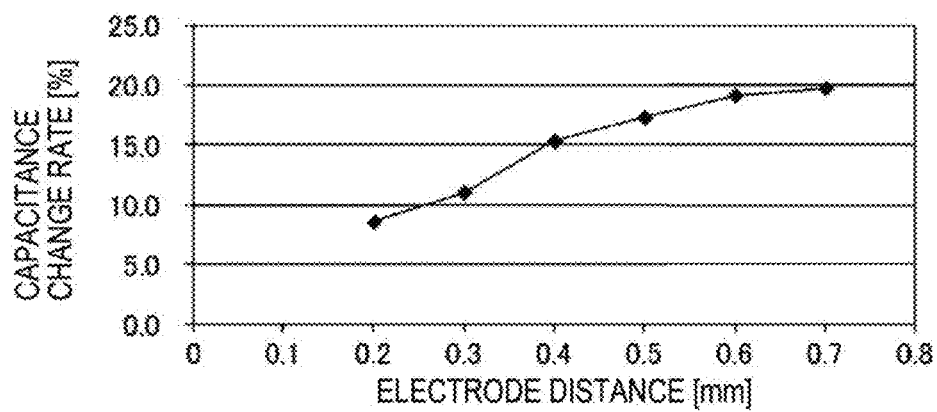

FIG. 36
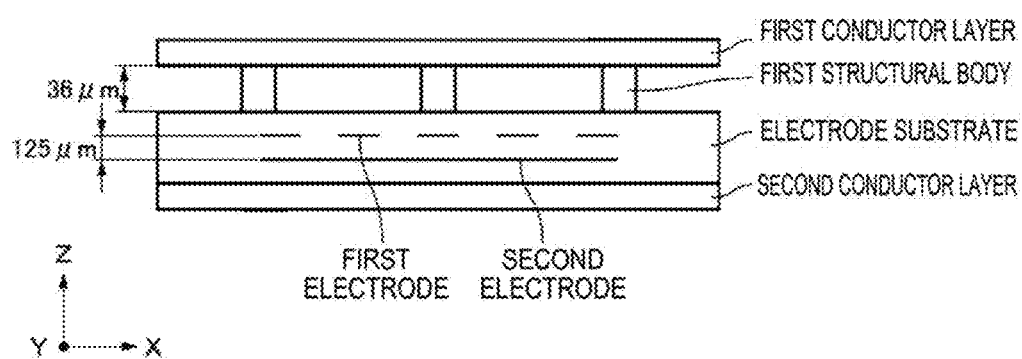
A
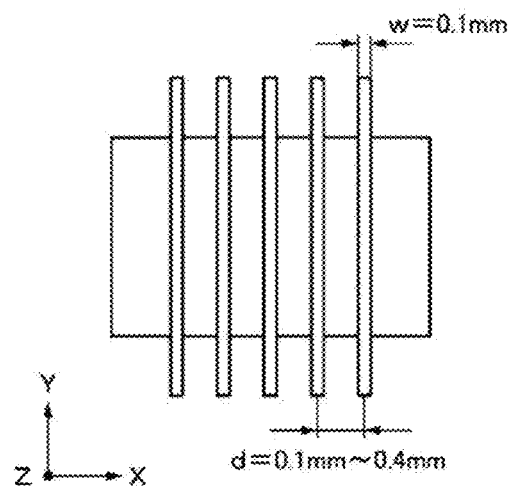
B

FIG. 37
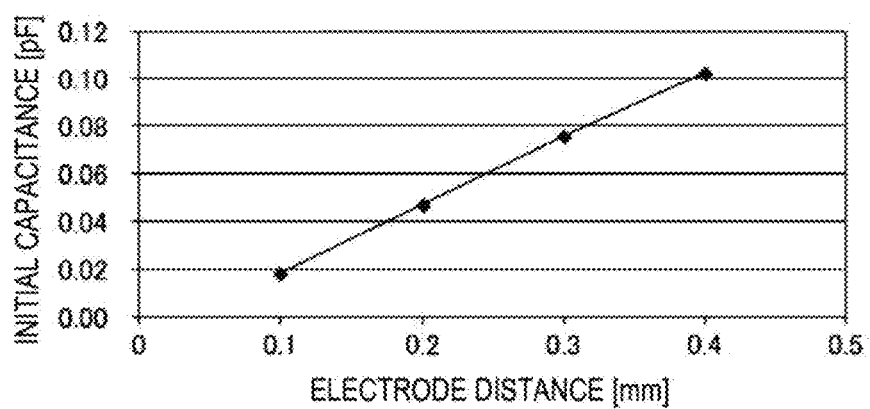
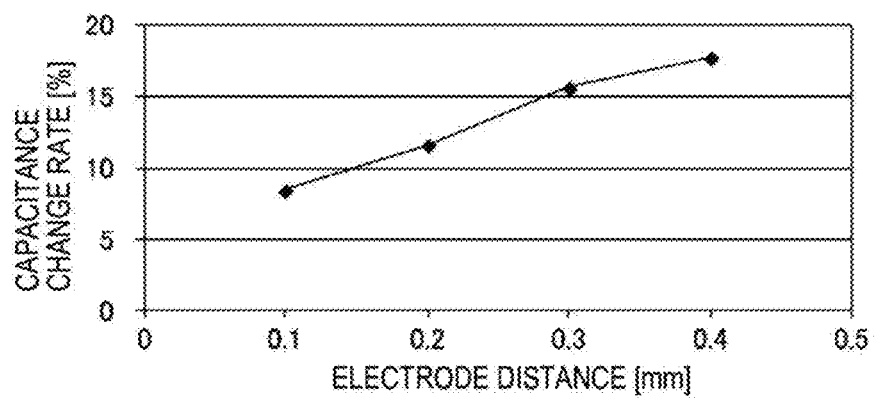

FIG. 39
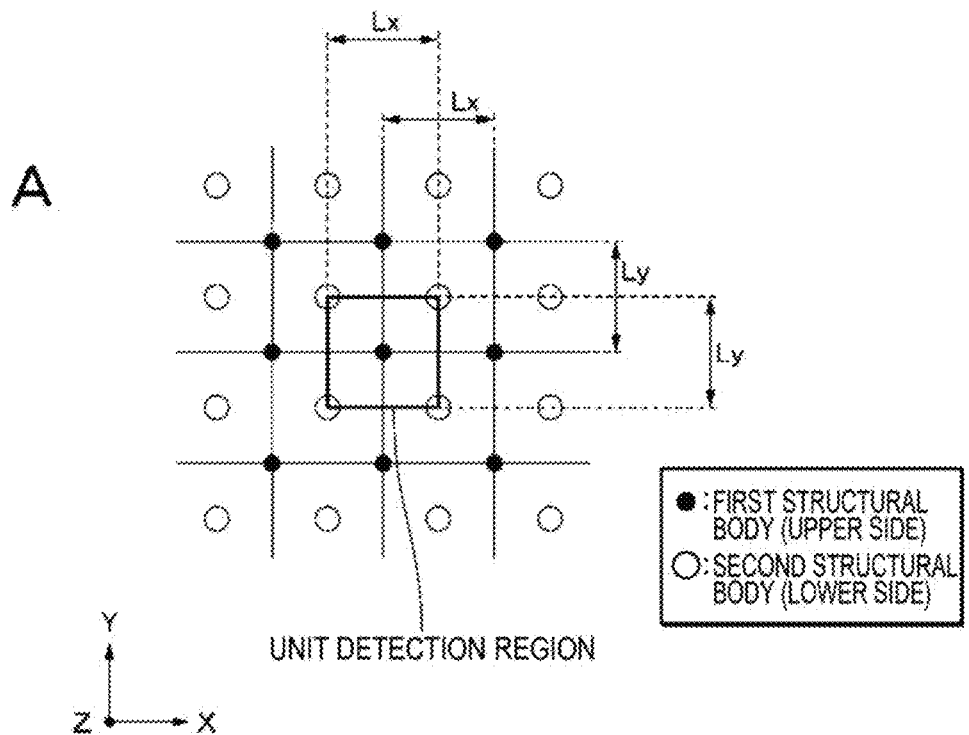
A
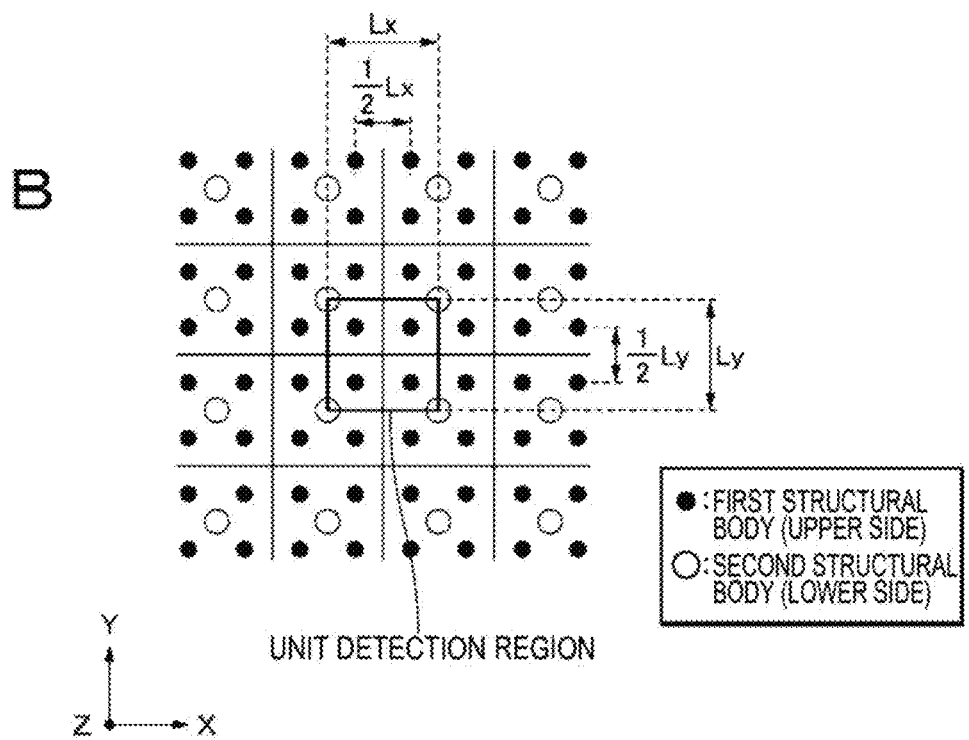
B

FIG. 40
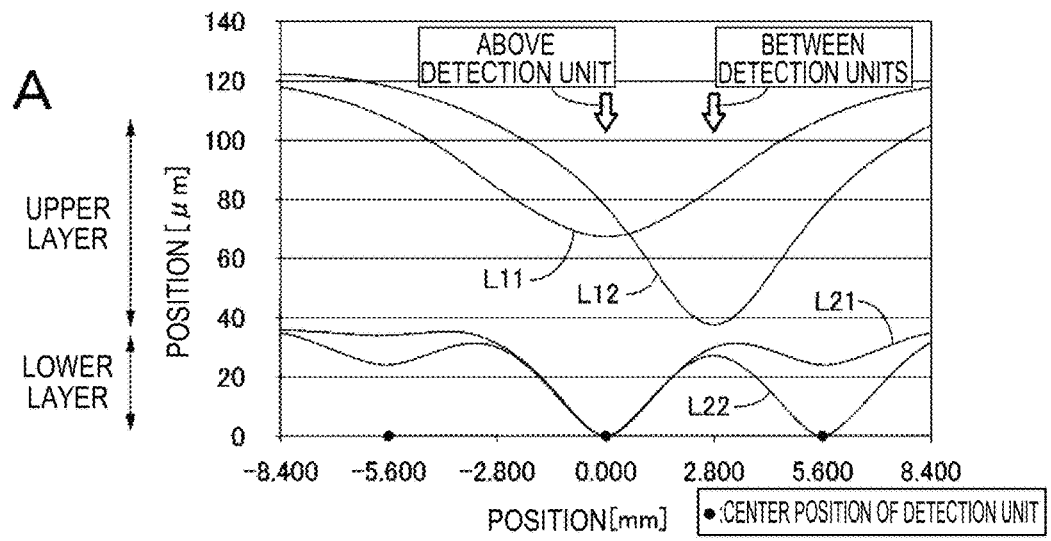
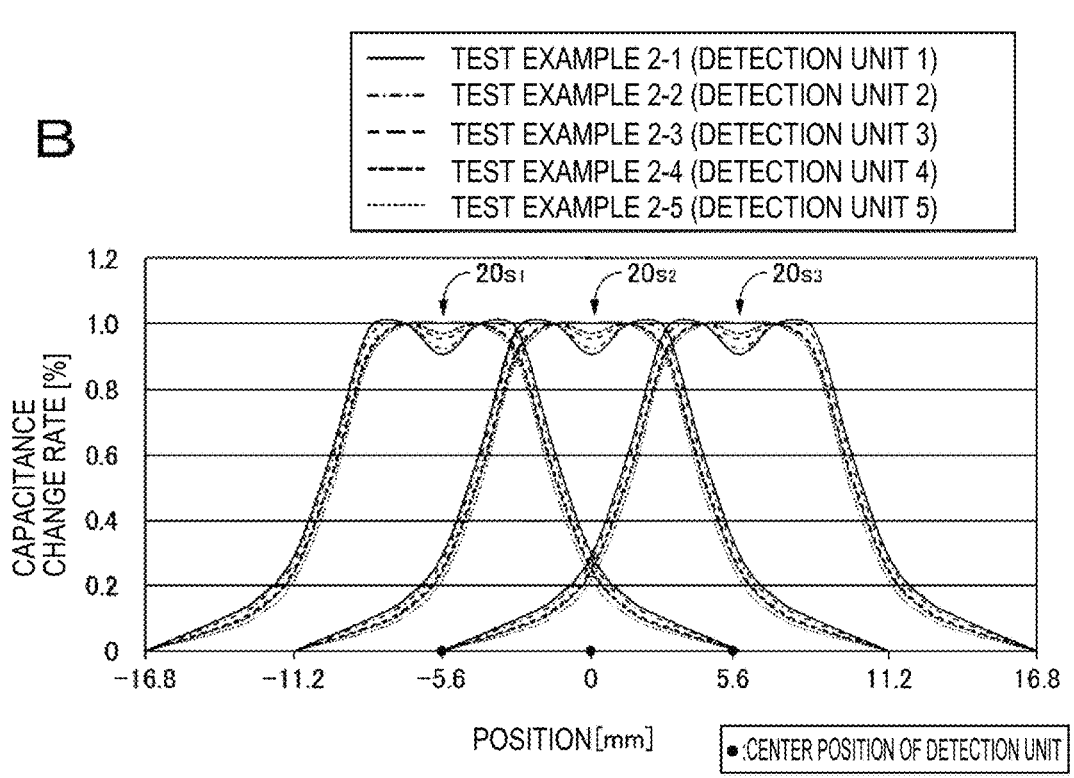

FIG. 44
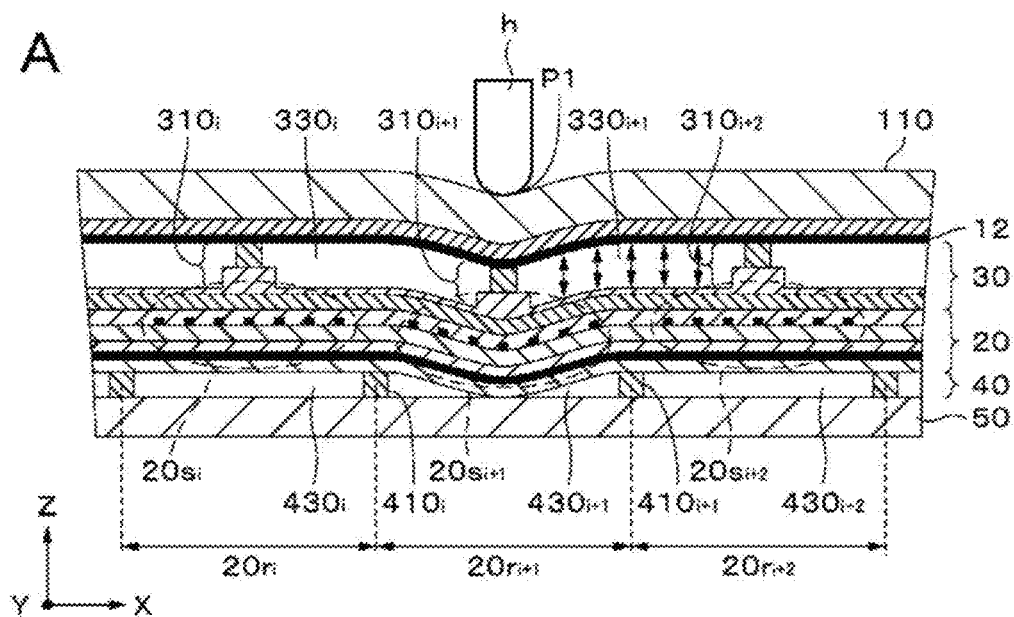
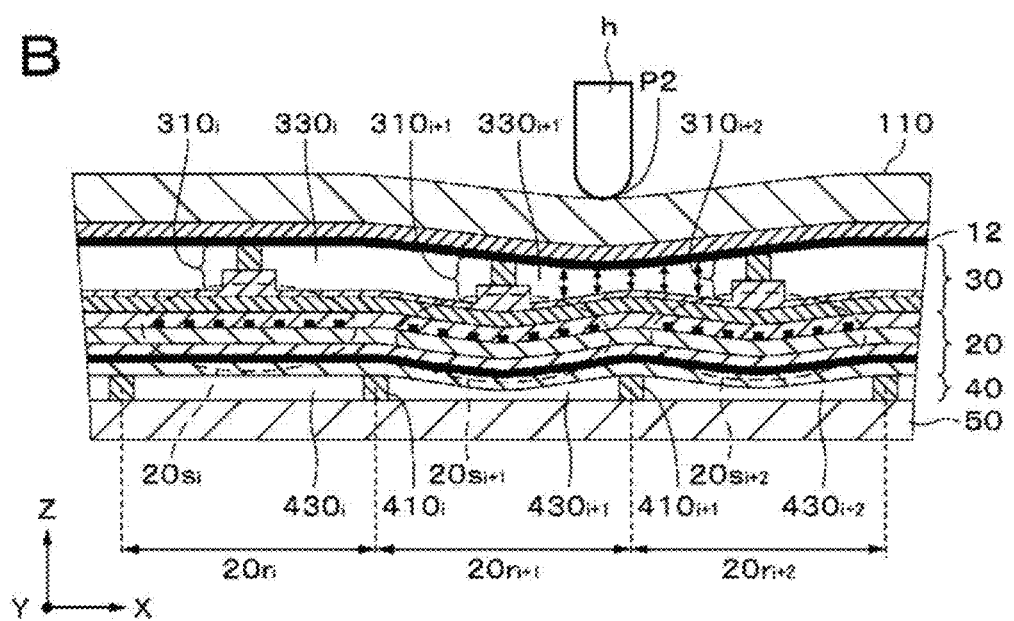

FIG. 45
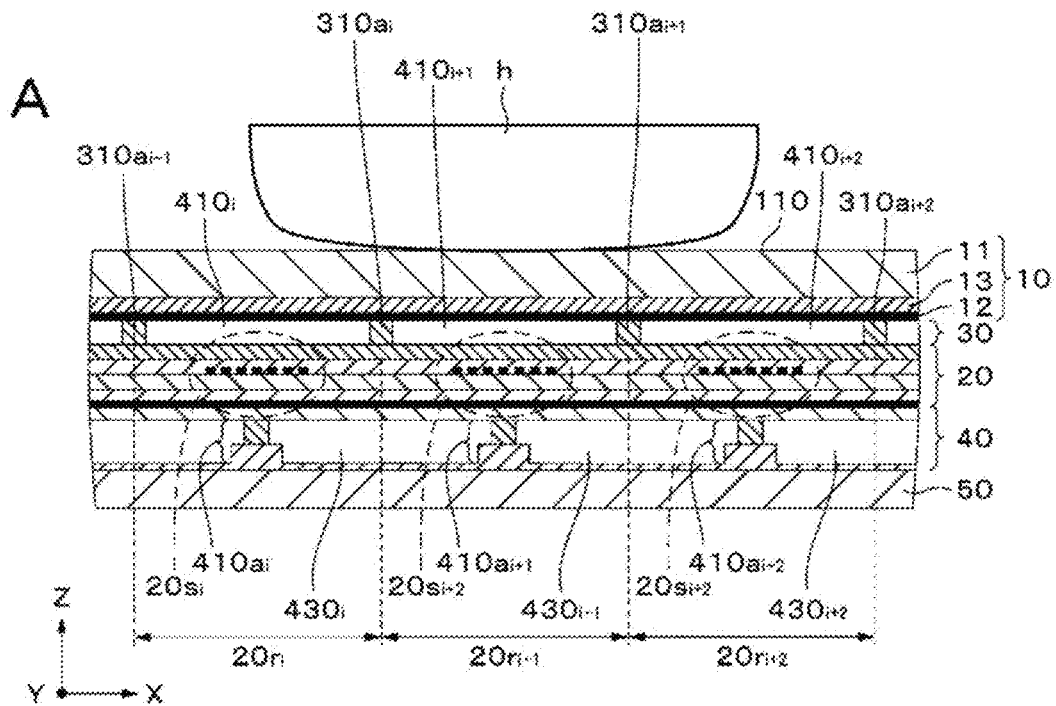
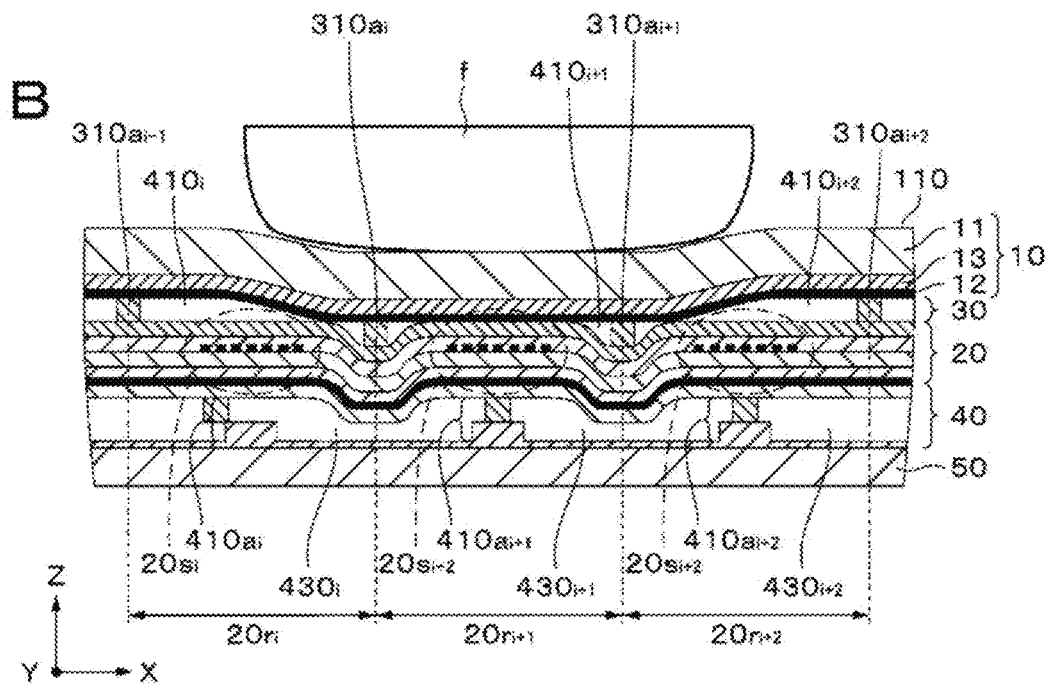

FIG. 46
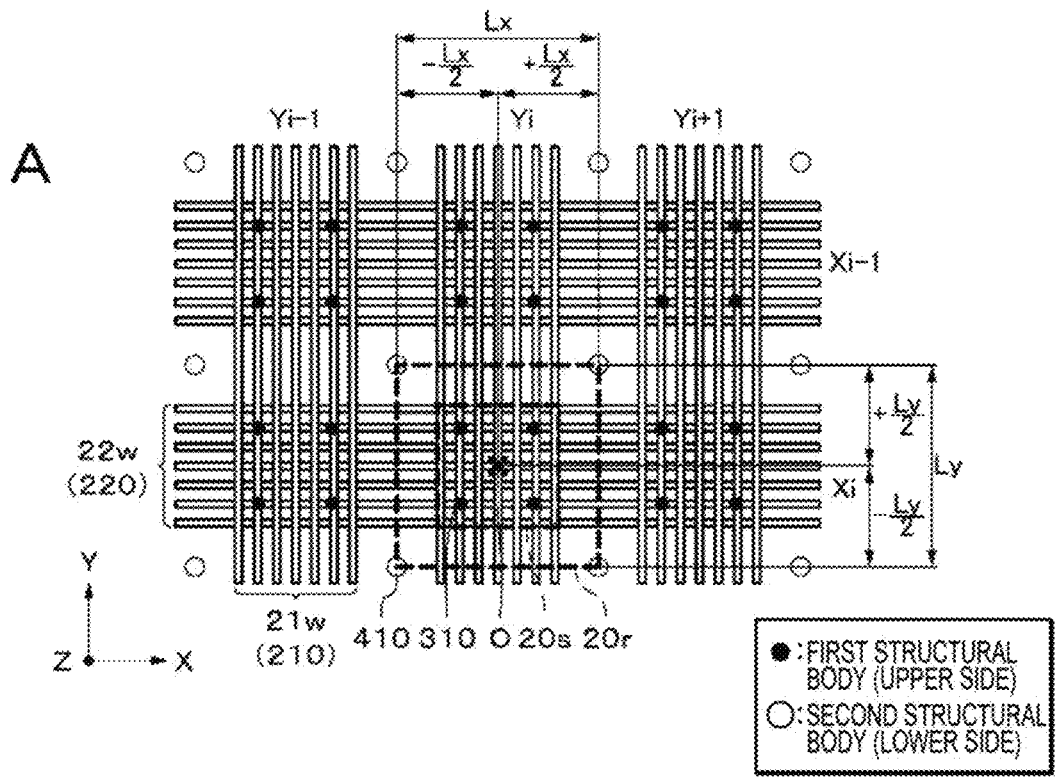
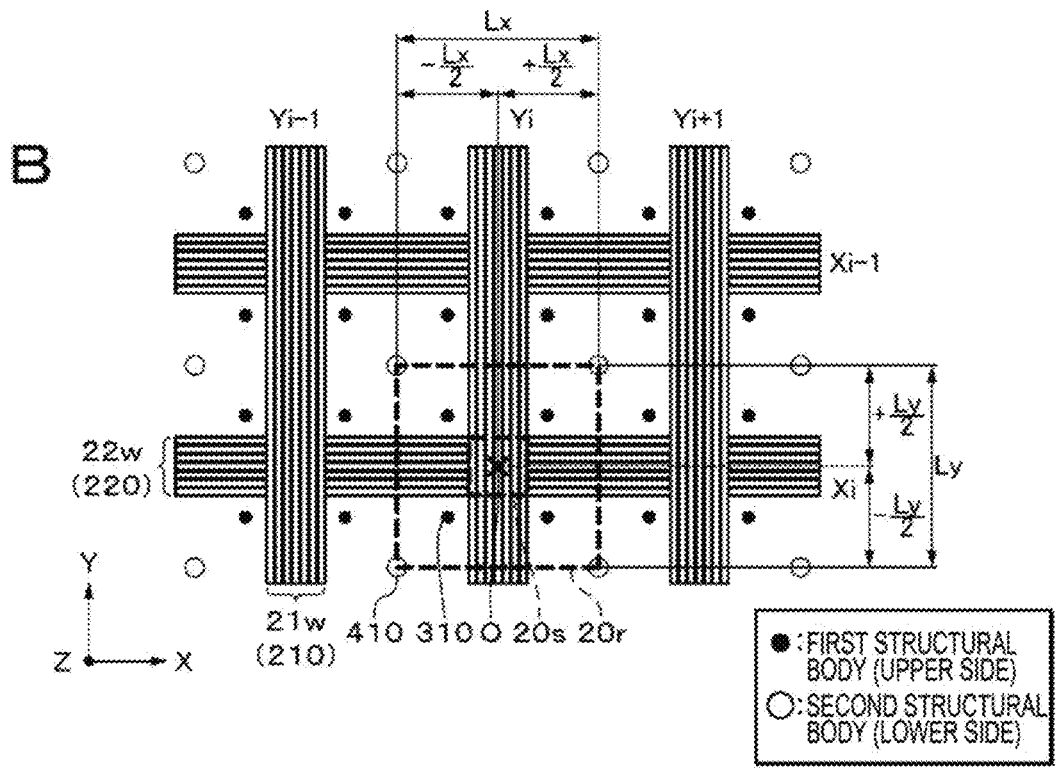

FIG. 51
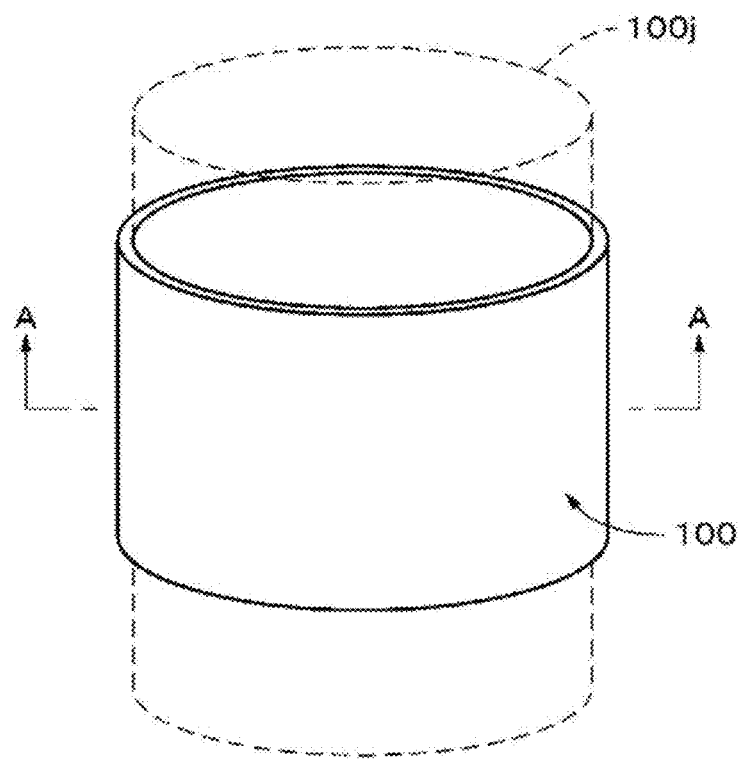
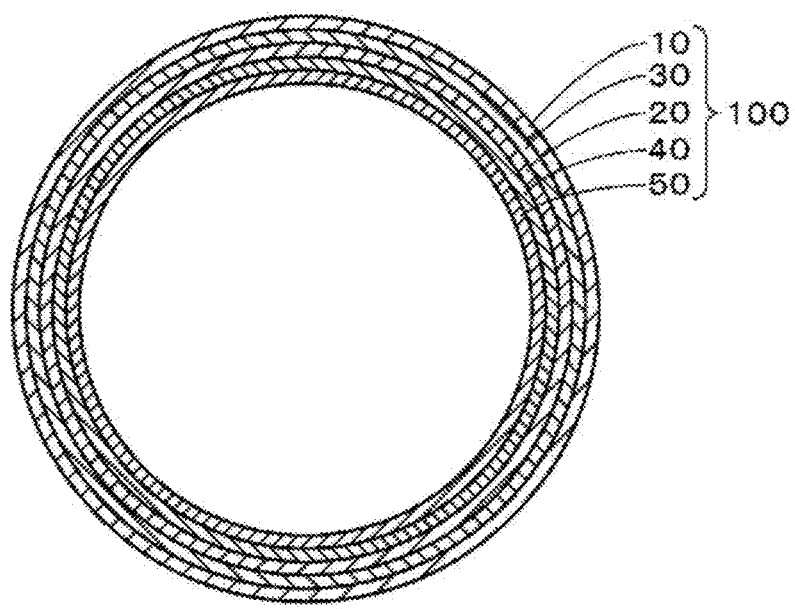

FIG. 52
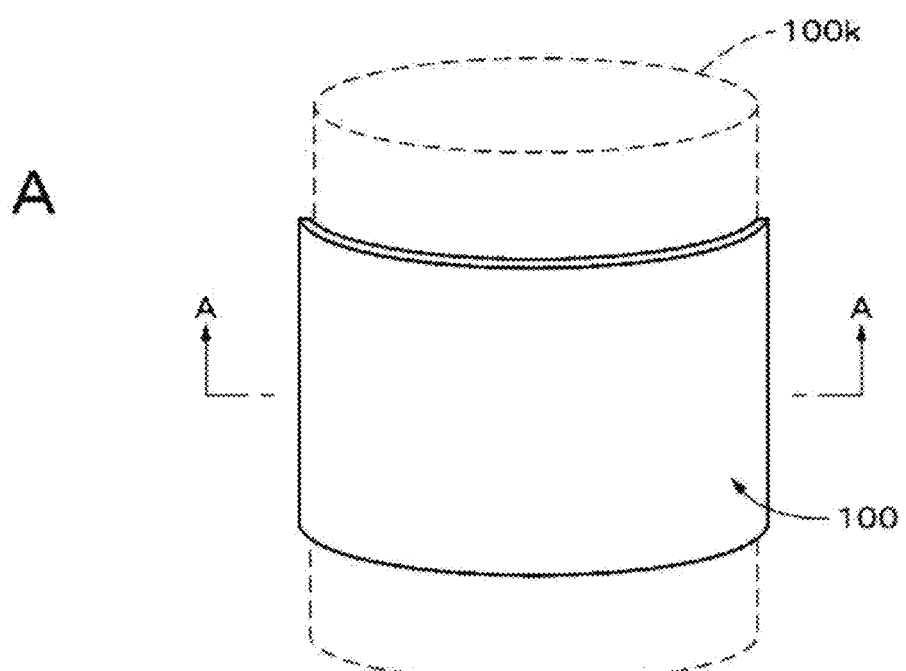
A
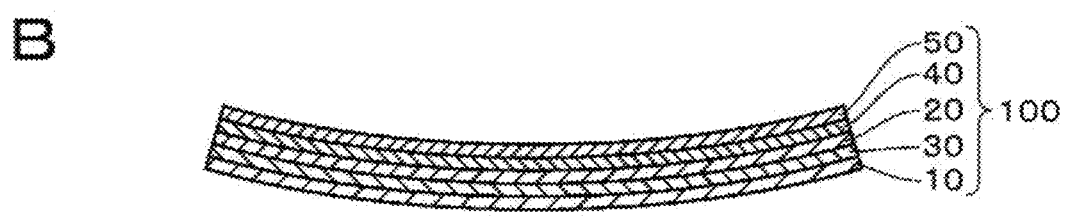
B

FIG. 54
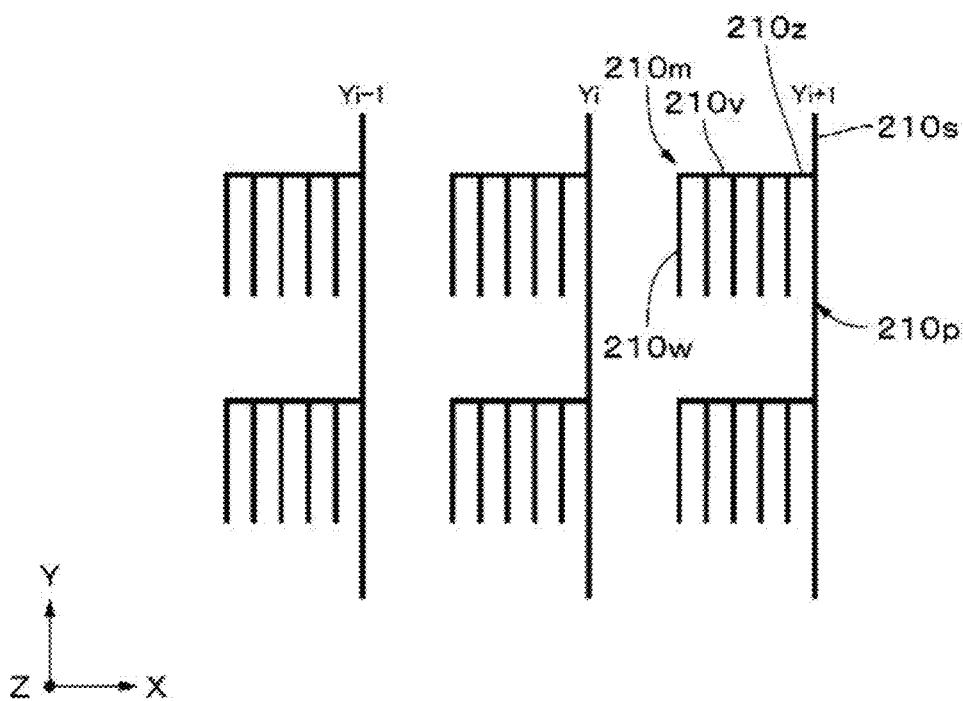
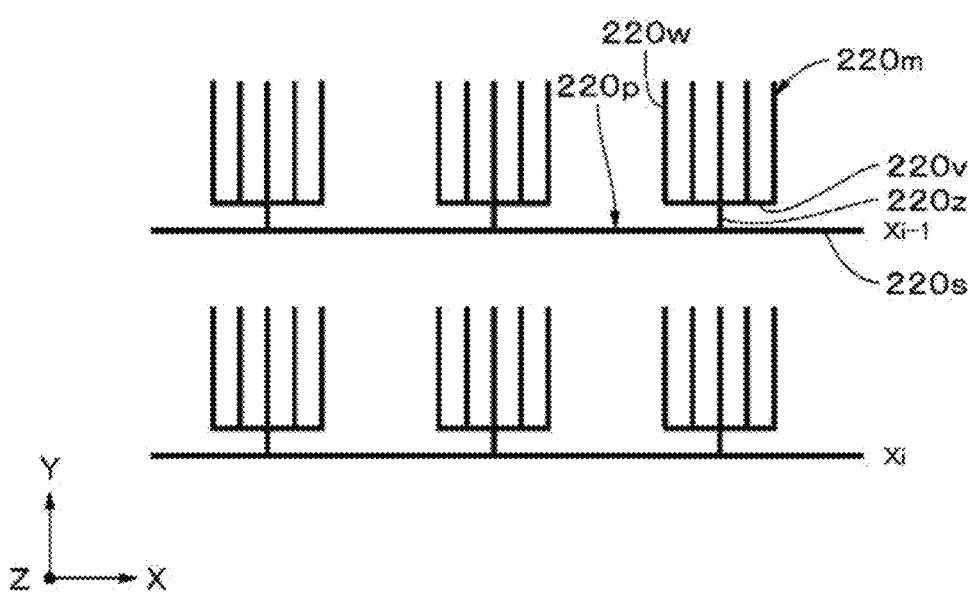

FIG. 55
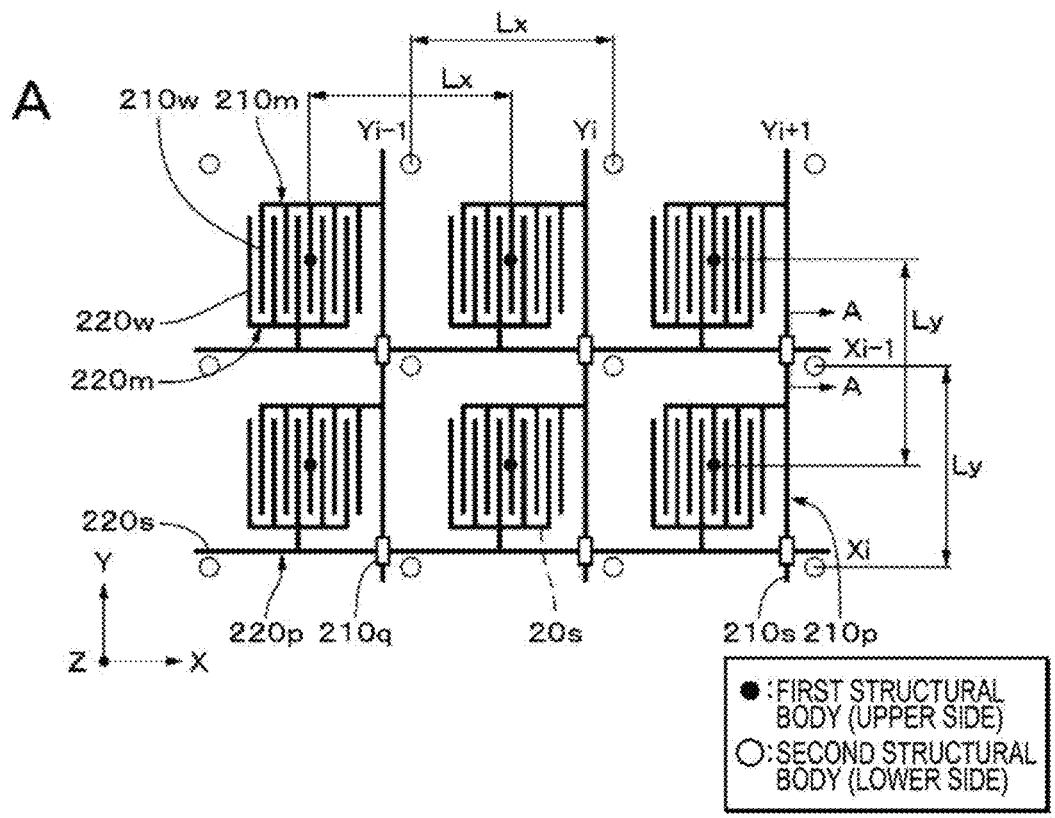
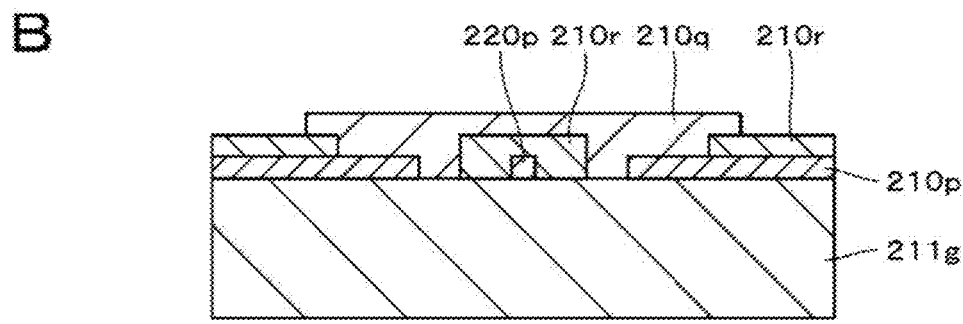

FIG. 57
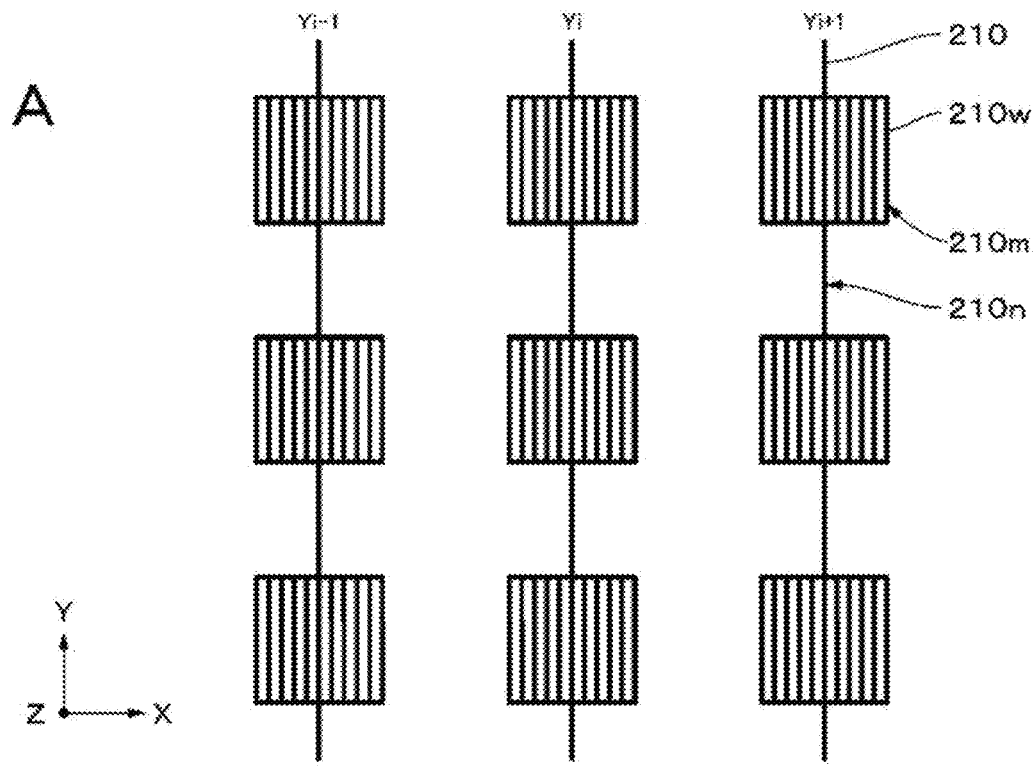
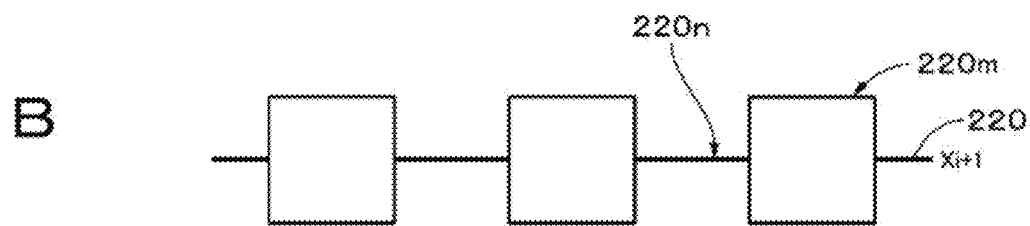

FIG. 58
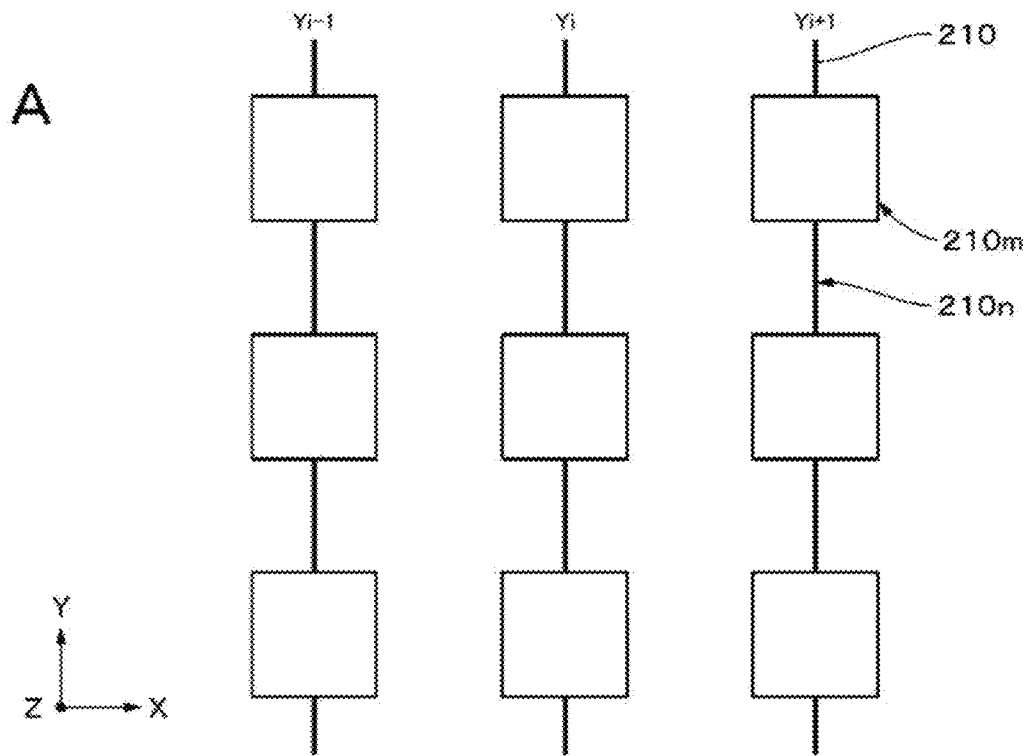
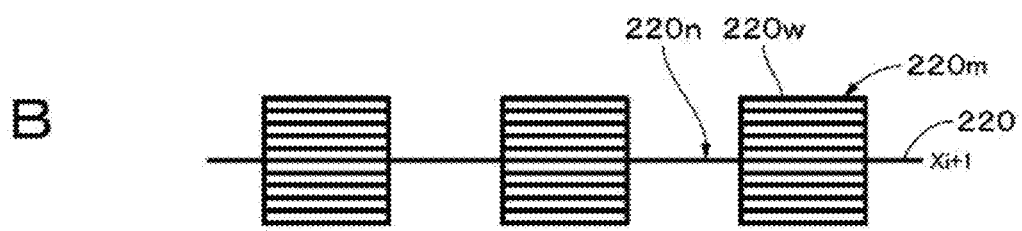
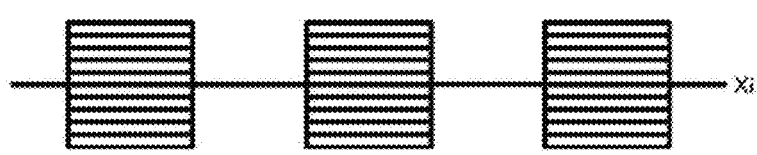
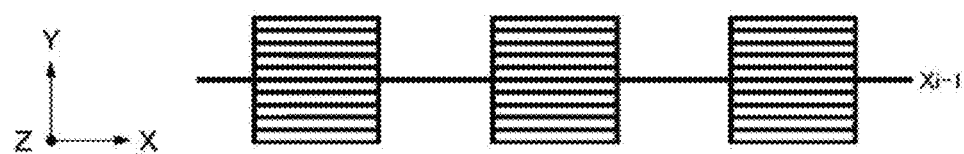

FIG. 61
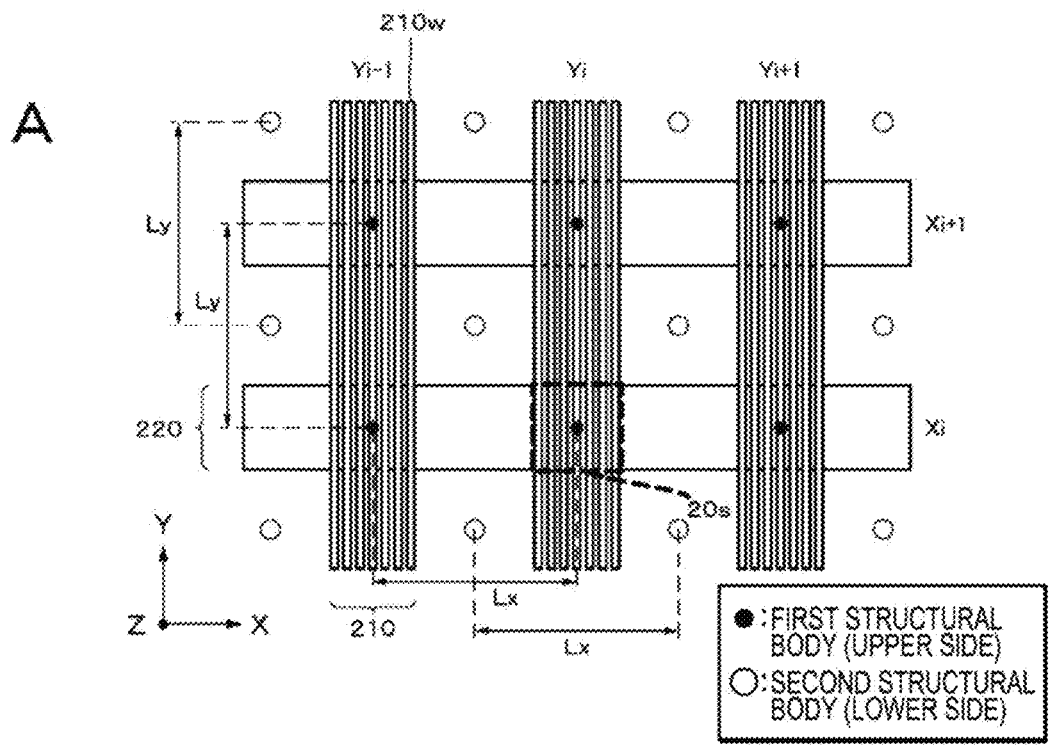
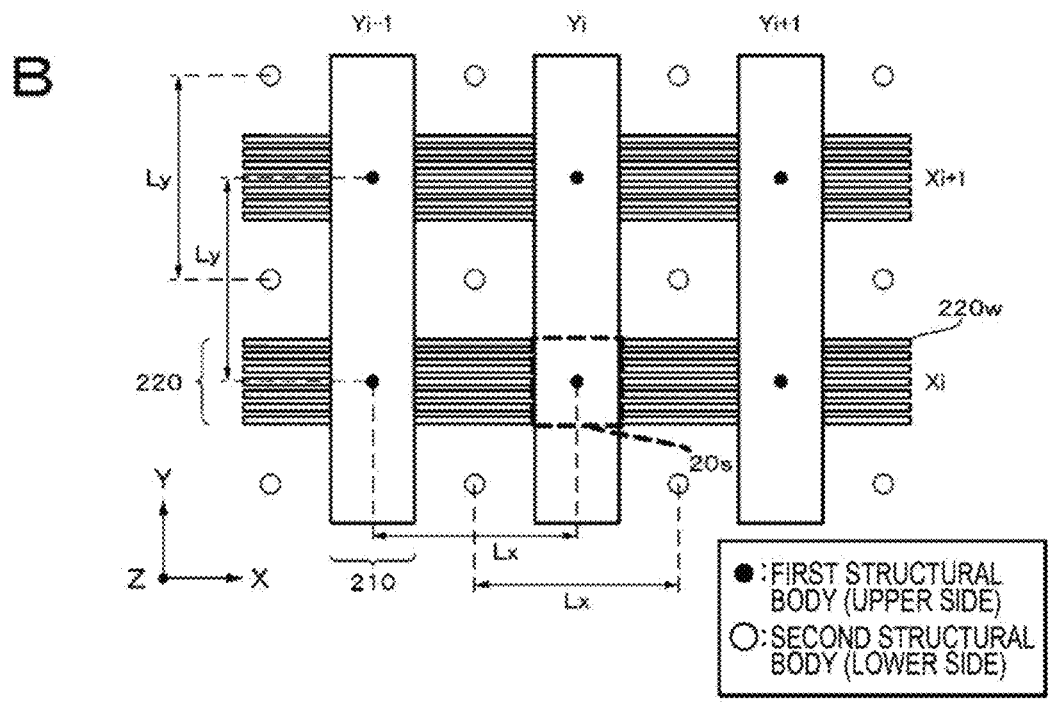

SENSOR DEVICE, INPUT DEVICE, AND ELECTRONIC APPARATUS

CROSS REFERENCE TO RELATED APPLICATIONS

This application is a U.S. National Stage Entry under 35 U.S.C. § 371 of International Application No. PCT/JP2014/000632, filed in the Japanese Patent Office as a Receiving Office on Feb. 6, 2014, which claims priority to Japanese Patent Application Number JP2013-188831, filed in the Japanese Patent Office on Sep. 11, 2013 and Japanese Patent Application Number JP2013-055782, filed in the Japanese Patent Office on Mar. 18, 2013, each of which is hereby incorporated by reference in its entirety.

TECHNICAL FIELD

The present disclosure relates to a sensor device, an input device and an electronic apparatus, which are capable of electrostatically detecting an input operation.

BACKGROUND ART

As a sensor device for an electronic apparatus, a configuration including, for example, a capacity element that is capable of detecting an operation position and a pressing force of an operant with respect to an input operation surface is known (for example, refer to Patent Literature 1).

CITATION LIST

Patent Literature

Patent Literature 1: JP 2011-170659A

SUMMARY OF INVENTION

Technical Problem

In recent years, various improvements of characteristics for improving operability of sensor devices are being anticipated. One such improvement is improvement of operation sensitivity.

In view of the circumstances described above, the present disclosure provides a sensor device, an input device and an electronic apparatus capable of improving operation sensitivity.

Solution to Problem

In order to solve the above-described problem, a first technique is a sensor device including: a first conductor layer; an electrode substrate; and a plurality of first structural bodies configured to separate the first conductor layer from the electrode substrate. At least one of the first conductor layer and the electrode substrate has flexibility. The electrode substrate includes a plurality of first electrodes and a plurality of second electrodes intersecting the plurality of first electrodes. At least one of the first and second electrodes includes a plurality of sub-electrodes.

In the sensor device of the first technique, when pressing is performed from the upper side of the first conductor layer, a relative distance between the first conductor layer and the electrode substrate is changed, and thus an input operation such as pressing can be electrostatically detected based on the change in the distance. Since at least one of the first and second electrodes includes the plurality of sub-electrodes, a difference in the electrostatic capacitance before and after the input operation such as pressing can be increased. Accordingly, it is possible to improve the operation sensitivity.

The sensor device of the first technique preferably further includes a second conductor layer provided to face the first conductor layer; and a plurality of second structural bodies configured to separate the electrode substrate from the second conductor layer. The electrode substrate preferably has flexibility.

Accordingly, when pressing is performed from the upper side of the first conductor layer, a relative distance between each of the first and second conductor layers and the electrode substrate is changed, and thus an input operation such as pressing can be electrostatically detected based on the change in the distance. Therefore, it is possible to increase an amount of change in electrostatic capacitance with respect to the input operation and increase detection sensitivity. Accordingly, it is possible to detect not only an intentional press operation but also a minute pressing force when a contact operation is performed, and the sensor device can also be used as a touch sensor.

The sensor device in the first technique can detect the input operation with high accuracy even when an operant such as a finger wearing a glove or a fine-tipped stylus is used to perform the input operation through the first conductor layer rather than a configuration in which the operant and each electrode of the electrode substrate are directly capacitively coupled.

The electrode substrate may include a plurality of detection units which are formed at the intersection regions between the plurality of first electrodes and the plurality of second electrodes and of which capacitance can change according to the relative distance with each of the first and second conductor layers.

Accordingly, it is possible to detect an input operation in a so-called mutual capacitance method of performing detection based on an amount of change in electrostatic capacitance between the first and second electrodes. Thus, it is also easy to simultaneously detect two or more points in a multi-touch operation.

A second technique is an input device including: an operation member that includes a conductor layer; an electrode substrate; and a plurality of first structural bodies configured to separate the operation member from the electrode substrate. At least one of the first conductor layer and the electrode substrate has flexibility. The electrode substrate includes a plurality of first electrodes and a plurality of second electrodes intersecting the plurality of first electrodes. At least one of the first and second electrodes includes a plurality of sub-electrodes.

In the input device of the second technique, when pressing is performed from a point on the operation member, a relative distance between the operation member and the electrode substrate changes, and thus an input operation such as pressing can be electrostatically detected based on the change in the distance. Since at least one of the first and second electrodes includes the plurality of sub-electrodes, a difference in the electrostatic capacitance before and after the input operation such as pressing can be increased. Accordingly, it is possible to improve the operation sensitivity.

The input device of the second technique preferably further includes a conductor layer provided to face the operation member and a plurality of second structural bodies configured to separate the electrode substrate from the conductor layer. The electrode substrate preferably has flexibility.

Accordingly, when pressing is performed from a point on the operation member, a relative distance between each of the operation member and the conductor layer and the electrode substrate changes, and thus an input operation such as pressing can be electrostatically detected based on the change in the distance. Therefore, it is possible to increase an amount of change in electrostatic capacitance with respect to the input operation and increase detection sensitivity. Accordingly, it is possible to detect not only an intentional press operation but also a minute pressing force when a contact operation is performed, and the input device can also be used as an input device including a touch sensor.

The operation member may include a metal film. The detection substrate may electrostatically detect a change in the distance between the metal film and the conductor layer.

Accordingly, the input operation is performed with high accuracy even when an operant such as a finger wearing a glove or a fine-tipped stylus is used to perform the input operation through the metal film without using a configuration in which the operant and each electrode of the electrode substrate are directly capacitively coupled.

The operation member may include a display unit.

As described above, the input device does not have the configuration in which the operant and each electrode of the electrode substrate are directly capacitively coupled. Therefore, even when the display unit including a conductive material between the electrode substrate and the operant is arranged, the input operation can be detected with high accuracy. That is, the sensor device can be arranged on the rear surface of the display unit, and thus it is possible to suppress deterioration in the display quality of the display unit.

The operation member may include a plurality of key regions.

Accordingly, the input device can be applied as a keyboard device.

The electrode substrate may include a plurality of detection units which are formed at the intersecting regions between the plurality of first electrodes and the plurality of second electrodes and of which capacitance can change according to the relative distance with the conductor layer.

The input device may further include a control unit electrically connected to the electrode substrate and capable of generating a signal according to an input operation with respect to each of the plurality of key regions based on a change in electrostatic capacitance of the plurality of detection units.

Accordingly, in the input device, the control unit can perform control corresponding to the key region in which the input operation is performed.

The plurality of second structural bodies may be arranged along a boundary between the plurality of key regions.

Accordingly, each key region can be configured to face the space portion. Thus, the distance between the operation member and the electrode substrate can be easily changed through the input operation in the key region, and thus it possible to increase the detection sensitivity of the input operation.

A third technique is an electronic apparatus including: an operation member that includes a conductor layer; an electrode substrate; a plurality of first structural bodies configured to separate the operation member from the electrode substrate; and a control unit configured to generate a signal according to an input operation with respect to the operation member based on a change in electrostatic capacitance of the electrode substrate. At least one of the first conductor layer and the electrode substrate has flexibility. The electrode substrate includes a plurality of first electrodes and a plurality of second electrodes intersecting the plurality of first electrodes. At least one of the first and second electrodes includes a plurality of sub-electrodes.

A fourth technique is a sensor device including: a first conductor layer that has flexibility; an electrode substrate; and a plurality of first structural bodies configured to separate the first conductor layer from the electrode substrate. The electrode substrate includes a plurality of first electrodes and a plurality of second electrodes intersecting the plurality of first electrodes. At least one of the first and second electrodes includes a plurality of sub-electrodes.

A fifth technique is a sensor device including: a first layer; a second layer; an electrode substrate provided between the first and second layers; and a plurality of structural bodies configured to separate at least one of the first and second layers from the electrode substrate. At least one of the first and second layers includes a conductive layer. At least one of the first layer and the electrode substrate has flexibility. The electrode substrate includes a plurality of first electrodes and a plurality of second electrodes intersecting the plurality of first electrodes. At least one of the first and second electrodes includes a plurality of sub-electrodes.

A sixth technique is an input device including: a first layer that includes an operation member; a second layer; an electrode substrate provided between the first and second layers; and a plurality of structural bodies configured to separate at least one of the first and second layers from the electrode substrate. At least one of the first layer and the electrode substrate has flexibility. The electrode substrate includes a plurality of first electrodes and a plurality of second electrodes intersecting the plurality of first electrodes. At least one of the first and second electrodes includes a plurality of sub-electrodes.

A seventh technique is an electronic apparatus including: a first layer that includes an operation member; a second layer; an electrode substrate provided between the first and second layers; a plurality of structural bodies configured to separate at least one of the first and second layers from the electrode substrate; and a control unit configured to generate a signal according to an input operation with respect to the operation member based on a change in electrostatic capacitance of the electrode substrate. At least one of the first layer and the electrode substrate has flexibility. The electrode substrate includes a plurality of first electrodes and a plurality of second electrodes intersecting the plurality of first electrodes. At least one of the first and second electrodes includes a plurality of sub-electrodes.

An eighth technique is a sensor device including: a first layer; a second layer; an electrode substrate provided between the first and second layers; and a plurality of structural bodies configured to separate at least one of the first and second layers from the electrode substrate. At least one of the first and second layers includes a conductive layer. At least one of the first layer and the electrode substrate has flexibility. The electrode substrate includes a plurality of first electrodes having a plurality of first unit electrode bodies and a plurality of second electrodes having a plurality of second unit electrode bodies. At least one of the first and second unit electrode bodies includes a plurality of sub-electrodes.

Advantageous Effects of Invention

According to an embodiment of the present disclosure, as described above, it is possible to improve operation sensitivity.

BRIEF DESCRIPTION OF DRAWINGS

FIG. 5A is a schematic cross-sectional view illustrating an exemplary configuration of a conductor layer of the input device according to the first embodiment of the present disclosure. FIG. 5B is a schematic cross-sectional view illustrating a modification of the conductor layer. FIG. 5C is a schematic cross-sectional view illustrating a modification of the conductor layer. FIG. 5D is a schematic cross-sectional view illustrating a modification of the conductor layer. FIG. 5E is a schematic cross-sectional view illustrating a modification of the conductor layer.

FIG. 6A is a schematic cross-sectional view for describing a configuration of a detection unit of the input device according to the first embodiment of the present disclosure. FIG. 6B is a schematic cross-sectional view for describing a configuration of a modification of the detection unit.

FIG. 7A is a schematic cross-sectional view illustrating an exemplary method of forming a first support of the input device according to the first embodiment of the present disclosure. FIG. 7B is a schematic cross-sectional view illustrating an exemplary method of forming a first support. FIG. 7C is a schematic cross-sectional view illustrating an exemplary method of forming a first support.

FIG. 9A is a schematic cross-sectional view illustrating a modification of the method of forming the first or second support. FIG. 9B is a schematic cross-sectional view illustrating a modification of the method of forming the first or second support.

FIG. 10A is a schematic diagram illustrating an arrangement example of first and second electrode lines. FIG. 10B is a schematic diagram illustrating one exemplary configuration of first and second electrode lines. FIG. 10C is a schematic diagram for describing a unit detection region.

FIG. 11A is a schematic plan view illustrating an arrangement example of first and second structural bodies, and a first electrode line (Y electrode) and a second electrode line (X electrode). FIG. 11B is a schematic plan view illustrating another arrangement example of first and second structural bodies, and a first electrode line (Y electrode) and a second electrode line (X electrode).

FIGS. 13A and 13B are diagrams for describing advantages that are obtainable due to the fact that first and second electrodes are configured as sub-electrodes.

FIGS. 14A and 14B are diagrams for describing advantages that are obtainable due to the fact that first and second electrodes are configured as sub-electrodes.

FIG. 19A is a diagram illustrating an ideal capacitance change rate distribution. FIG. 19B is a diagram illustrating an actual capacitance change rate distribution.

FIG. 21A is a plan view illustrating a modification of the first electrode line. FIG. 21B is a plan view illustrating a modification of the second electrode line.

FIGS. 25A and 25B are schematic cross-sectional views for describing a reason for which two split peaks occur in a capacitance change rate distribution.

FIGS. 26A and 26B are schematic cross-sectional views for describing a reason for which improvement in accuracy of coordinate calculation is possible when two or more first structural bodies are included in a unit detection region.

FIG. 27A is a plan view illustrating a first example of a symmetrical arrangement. FIG. 27B is a plan view illustrating a second example of the symmetrical arrangement.

FIG. 28A is a plan view illustrating a third example of a symmetrical arrangement. FIG. 28B is a plan view illustrating a fourth example of the symmetrical arrangement.

FIG. 29A is a plan view illustrating a fifth example of a symmetrical arrangement. FIG. 29B is a plan view illustrating a sixth example of the symmetrical arrangement.

FIG. 31A is a schematic cross-sectional view illustrating one exemplary configuration of an operation member of the input device according to the fifth embodiment of the present disclosure. FIG. 31B is a schematic cross-sectional view illustrating a modification of the operation member.

FIGS. 33A and 33B are schematic diagrams illustrating simulation conditions in test examples 1-1 to 1-7.

FIG. 34A is a diagram illustrating simulation results of test examples 1-1-1 to 1-1-7. FIG. 34B is a diagram illustrating simulation results of test examples 1-2-1 to 1-2-7.

FIG. 35A is a diagram illustrating simulation results of Test Examples 1-3-1 to 1-3-6. FIG. 35B is a diagram illustrating simulation results of Test Examples 1-4-1 to 1-4-6.

FIGS. 36A and 36B are schematic diagrams illustrating simulation conditions in test examples 1-5-1 to 1-5-4.

FIG. 37A is a diagram illustrating simulation results of Test Examples 1-5-1 to 1-5-4. FIG. 37B is a diagram illustrating simulation results of Test Examples 1-6-1 to 1-6-4.

FIG. 39A is a schematic diagram illustrating simulation conditions in test example 2-1. FIG. 39B is a schematic diagram illustrating the simulation conditions in test example 2-2.

FIG. 40A is a schematic diagram illustrating simulation conditions in test example 2-1. FIG. 40B is a schematic diagram illustrating the simulation conditions in test examples 2-1 to 2-5.

FIGS. 44A and 44B are schematic cross-sectional views for describing a reason for which improvement in accuracy of coordinate calculation is possible when two or more first structural bodies are included in a unit detection region.

FIG. 45A is a schematic cross-sectional view illustrating a modification of the input device according to the first embodiment of the present disclosure. FIG. 45B is a schematic main part cross-sectional view illustrating an aspect of the input device when a first surface receives an operation from a finger.

FIG. 46A is a schematic plan view illustrating an arrangement example of first and second structural bodies, and a first electrode line (Y electrode) and a second electrode line (X electrode). FIG. 46B is a schematic plan view illustrating another arrangement example of first and second structural bodies, and a first electrode line (Y electrode) and a second electrode line (X electrode).

FIG. 51A is a perspective view illustrating an exemplary shape of an input device having a cylindrical shape. FIG. 51B is a cross-sectional view taken along the line A-A of FIG. 51A.

FIG. 52A is a perspective view illustrating an exemplary shape of an input device having a curved shape. FIG. 52B is a cross-sectional view taken along the line A-A of FIG. 52A.

FIG. 54A is a plan view illustrating an exemplary configuration of a Y electrode. FIG. 54B is a plan view illustrating an exemplary configuration of an X electrode.

FIG. 55A is a plan view illustrating an arrangement example of X electrodes and Y electrodes. FIG. 55B is a cross-sectional view taken along the line A-A of FIG. 55A.

FIG. 57A is a plan view illustrating a first example of a configuration of the Y electrode. FIG. 57B is a plan view illustrating a first example of a configuration of the X electrode.

FIG. 58A is a plan view illustrating a second example of a configuration of the Y electrode. FIG. 58B is a plan view illustrating a second example of a configuration of the X electrode.

FIG. 61A is a plan view illustrating a first example of a configuration of X and Y electrodes in an input device according to a modification of the third embodiment of the present disclosure. FIG. 61B is a plan view illustrating a second example of the configuration of X and Y electrodes in the input device according to the modification of the third embodiment of the present disclosure.

DESCRIPTION OF EMBODIMENTS

In the present disclosure, a sensor device and an input device are appropriately applied to an electronic apparatus, for example, a notebook personal computer, a touch panel display, a tablet computer, a cellular phone (for example, a smartphone), a digital camera, a digital video camera, an audio device (for example, a portable audio player), and a game device.

In the present disclosure, a conductive layer having electrical conductivity is preferable. As the conductor layer, for example, an inorganic conductive layer including an inorganic conductive material, an organic conductive layer including an organic conductive material, and an organic-inorganic conductive layer including both the inorganic conductive material and the organic conductive material are preferably used.

Examples of the inorganic conductive material include a metal and a metal oxide. Here, metals are defined to include semimetals. Examples of the metal include a metal such as copper, silver, gold, platinum, palladium, nickel, tin, cobalt, rhodium, iridium, iron, ruthenium, osmium, manganese, molybdenum, tungsten, niobium, tantalum, titanium, bismuth, antimony, and lead or alloys thereof, but the present disclosure is not limited thereto. Examples of the metal oxide include indium tin oxide (ITO), zinc oxide, indium oxide, an antimony-doped tin oxide, a fluorine-doped tin oxide, aluminum-doped zinc oxide, gallium-doped zinc oxide, silicon-doped zinc oxide, zinc-tin oxide, indium-tin oxide, and zinc-indium-magnesium oxide, but the present disclosure is not limited thereto.

Examples of the organic conductive material include a carbon material and a conductive polymer. Examples of the carbon material include carbon black, carbon fibers, a fullerene, graphene, carbon nanotubes, carbon microcoils, and nanohorns, but the present disclosure is not limited thereto. Examples of the conductive polymer include a substituted or unsubstituted polyaniline, a polypyrrole, a polythiophene, and a (co)polymer including one or two selected therefrom, but the present disclosure is not limited thereto.

Embodiments of the present disclosure will be described in the following order.
1. First embodiment (example of input device)
2. Second embodiment (example of input device)
3. Third embodiment (example of input device)
4. Fourth embodiment (example of input device)
5. Fifth embodiment (example of input device)
6. Sixth embodiment (example of electronic apparatus)

1 First Embodiment

Figure 1:
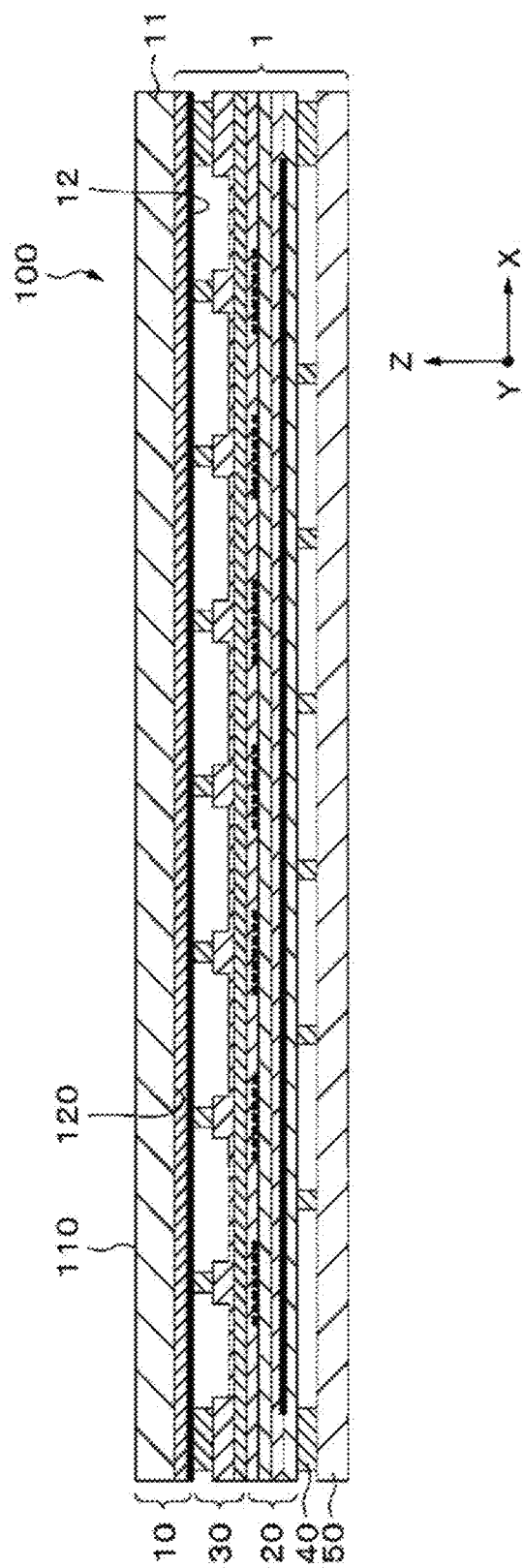
FIG. 1 is a schematic cross-sectional view illustrating one exemplary configuration of an input device according to a first embodiment of the present disclosure.
Figure 2:
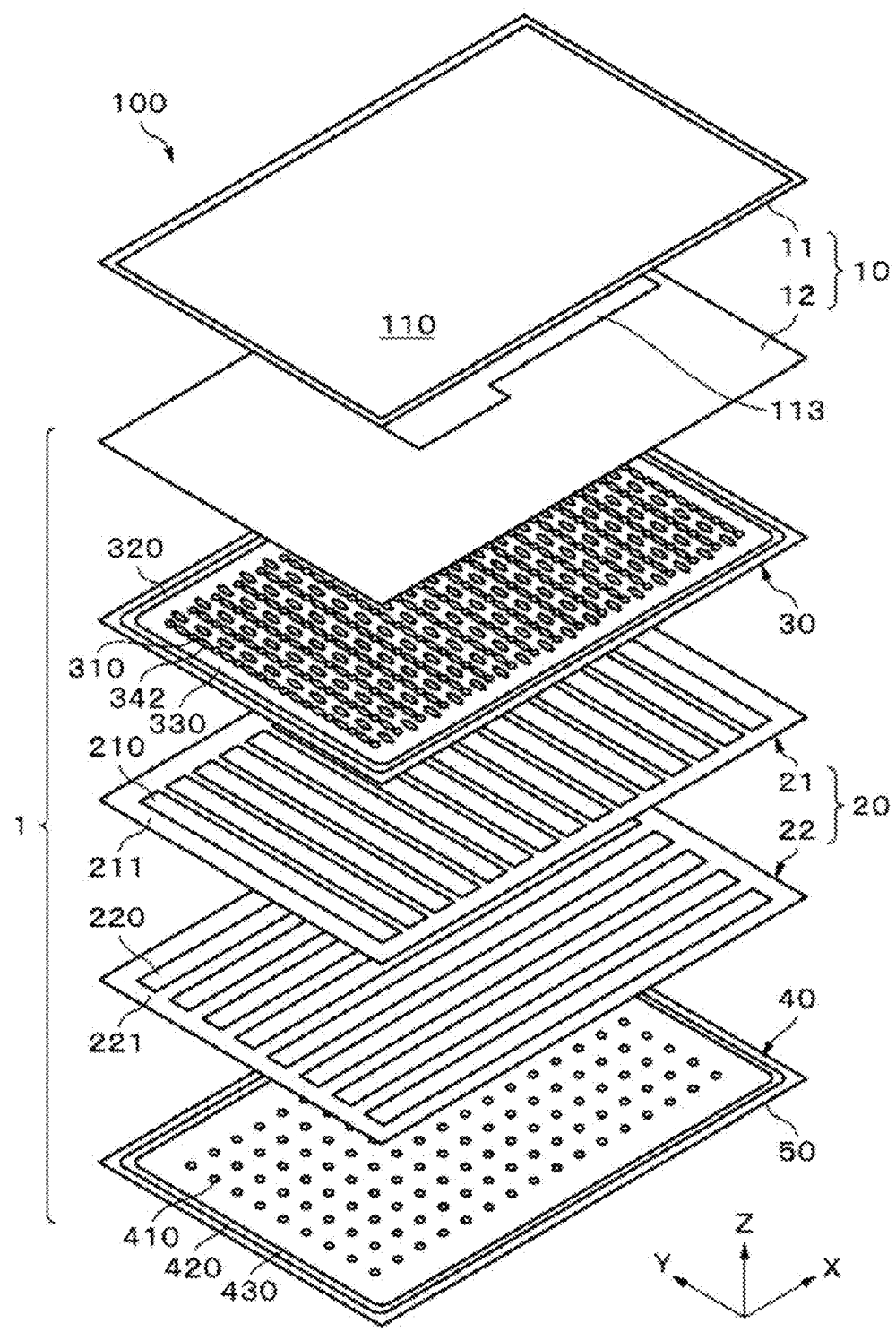
FIG. 2 is an exploded perspective view illustrating one exemplary configuration of the input device according to the first embodiment of the present disclosure.
Figure 3:
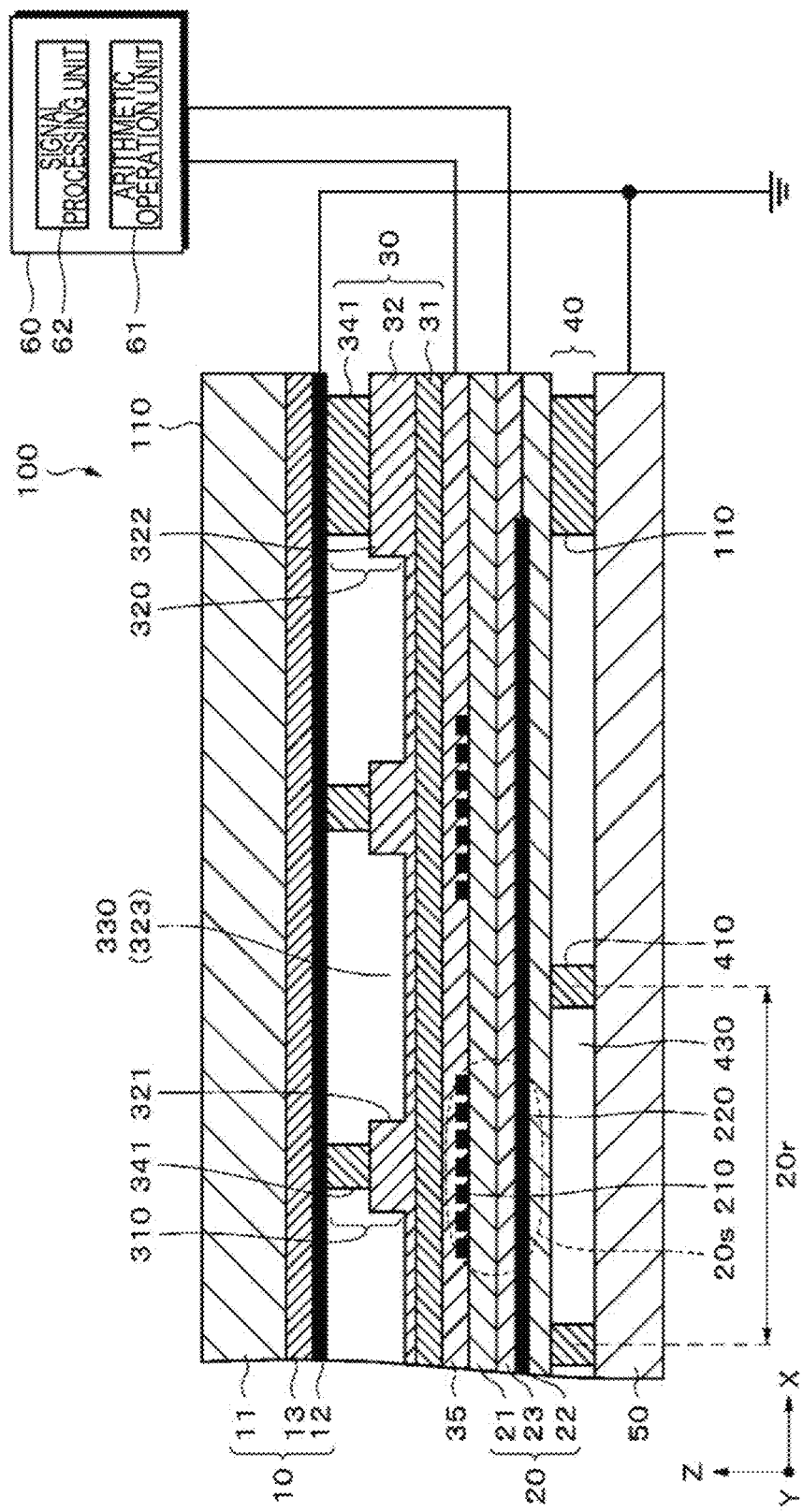
FIG. 3 is a schematic cross-sectional view illustrating one exemplary configuration of a main part of the input device according to the first embodiment of the present disclosure.
Figure 4:
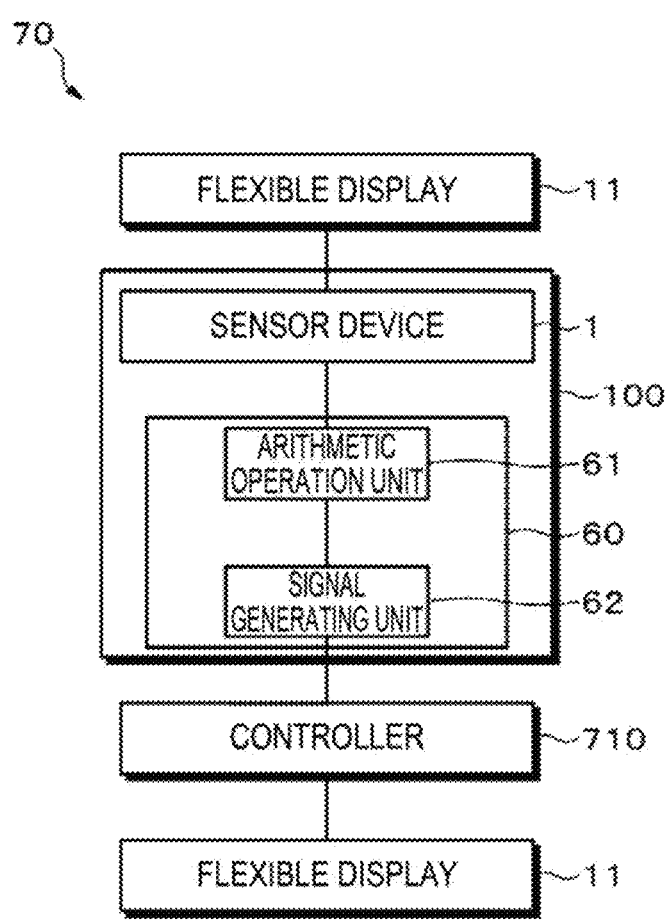
FIG. 4 is a block diagram illustrating one exemplary configuration of an electronic apparatus using the input device according to the first embodiment of the present disclosure.

FIG. 1 is a schematic cross-sectional view illustrating one exemplary configuration of an input device 100 according to the first embodiment of the present disclosure. FIG. 2 is an exploded perspective view illustrating one exemplary configuration of the input device 100. FIG. 3 is a schematic cross-sectional view illustrating one exemplary configuration of a main part of the input device 100. FIG. 4 is a block diagram illustrating one exemplary configuration of an electronic apparatus 70 using the input device 100. Hereinafter, a configuration of the input device 100 of the present embodiment will be described. Also, in the drawing, an X axis and a Y axis indicate directions (planar directions of the input device 100) which are orthogonal to each other, and a Z axis indicates a direction (a thickness direction or a vertical direction of the input device 100) orthogonal to the X axis and the Y axis.

[Input Device]

The input device 100 includes a flexible display (display unit) 11 configured to receive an operation from a user, and a sensor device 1 configured to detect the user operation. The input device 100 is configured as, for example, a flexible touch panel display, and embedded in the electronic apparatus 70 to be described below. The sensor device 1 and the flexible display 11 have a planar shape that extends in a direction perpendicular to the Z axis.

The flexible display 11 includes a first surface 110 and a second surface 120 opposite to the first surface 110. The flexible display 11 has both a function as an input operation unit in the input device 100 and a function as a display unit. That is, the flexible display 11 enables the first surface 110 to function as an input operation surface and a display surface, and displays an image corresponding to the user operation from the first surface 110 upward, i.e., a Z-axis direction. For example, an image corresponding to a keyboard or a graphical user interface (GUI) is displayed on the first surface 110. An operant that performs an operation with respect to the flexible display 11 includes, for example, a finger f illustrated in FIG. 18 or a stylus s illustrated in FIG. 17.

A specific configuration of the flexible display 11 is not particularly limited. As the flexible display 11, for example, a so-called electronic paper, an organic electroluminescent (EL) panel, an inorganic EL panel, or a liquid crystal panel can be used. In addition, a thickness of the flexible display 11 is not particularly limited, and is, for example, 0.1 mm to 1 mm.

The sensor device 1 includes a metal film (first conductor layer (conductive layer)) 12, a conductor layer (second conductor layer (conductive layer)) 50, an electrode substrate 20, a first support 30, and a second support 40. The sensor device 1 is arranged on the second surface 120 of the flexible display 11.

The metal film 12 has flexibility, and is configured in, for example, a deformable sheet shape. The conductor layer 50 is arranged to face the metal film 12. The electrode substrate 20 has flexibility, and includes a plurality of first electrode lines 210 and a plurality of second electrode lines 220 that are arranged to face the plurality of first electrode lines 210 and intersect the plurality of first electrode lines 210. The electrode substrate 20 includes a plurality of second electrode lines 220 intersecting a plurality of first electrode lines 210. The electrode substrate 20 is deformable and arranged between the metal film 12 and the conductor layer 50, and is able to electrostatically detect a change in a distance from each of the metal film 12 and the conductor layer 50. The first support 30 includes, for example, a plurality of first structural bodies 310 connecting the metal film 12 and the electrode substrate 20 and a first space portion 330 formed between the plurality of first structural bodies 310. The metal film 12 and the electrode substrate 20 are separated by the plurality of first structural bodies 310. The second support 40 includes, for example, a plurality of second structural bodies 410 that are arranged between the plurality of adjacent first structural bodies 310 and connect the conductor layer 50 and the electrode substrate 20, and a second space portion 430 formed between the plurality of second structural bodies 410. The conductor layer 50 and the electrode substrate 20 are separated by the plurality of second structural bodies 410. The first space portion 330 and the second space portion 430 may be filled with a medium such as a liquid or gel. In addition, a gas other than air may be filled therein.

The sensor device 1 (the input device 100) according to the present embodiment electrostatically detects a change in distances between the metal film 12 and the electrode substrate 20 and between the conductor layer 50 and the electrode substrate 20 according to an input operation onto the first surface 110 of the flexible display 11, and thus detects the input operation. The input operation is not limited to an intentional press (push) operation on the first surface 110, but may include a contact (touch) operation. That is, as will be described below, since the input device 100 can also detect a minute pressing force (for example, about several tens of g) applied by a general touch operation, it is configured such that the same touch operation as a general touch sensor is possible.

The input device 100 includes a control unit 60. The control unit 60 includes an arithmetic operation unit 61 and a signal generating unit 62. The arithmetic operation unit 61 detects the user operation based on a change in electrostatic capacitance of a detection unit 20s. The signal generating unit 62 generates an operation signal based on the detection result of the arithmetic operation unit 61.

The electronic apparatus 70 illustrated in FIG. 4 includes a controller 710 configured to perform a process based on an operation signal that is generated from the signal generating unit 62 of the input device 100. The operation signal processed by the controller 710 is output to the flexible display 11 as, for example, an image signal. The flexible display 11 is connected to a drive circuit mounted in the controller 710 through a flexible wiring substrate 113 (refer to FIG. 2). The drive circuit may also be mounted on the wiring substrate 113.

In the present embodiment, the flexible display 11 is configured as a part of an operation member 10 of the input device 100. That is, the input device 100 includes the operation member 10, the electrode substrate 20, the first support 30, the second support 40, and the conductor layer 50. Hereinafter, these components will be described.

(Operation Member)

The operation member 10 has a structure in which the flexible display 11 having the first surface 110 and the second surface 120 and the metal film 12 are laminated. That is, the operation member 10 includes the first surface 110 receiving the user operation and the second surface 120 in which the metal film 12 is formed and that is opposite to the first surface 110, and is configured in a deformable sheet shape. The metal film 12 is provided in the second surface 120 facing the conductor layer 50.

The metal film 12 is configured in a sheet shape that is deformable according to deformation of the flexible display 11, and is configured as a metallic foil such as copper (Cu), aluminum (Al), or stainless steel (SUS), or a mesh material. In addition, the metal film 12 may be configured as a vapor deposited film or a sputtering film of a conductor formed on a base material of a sheet shape, or a coating film such as a conductive paste. Also, the metal film 12 may function as the conductive layer and may also be an oxide conductor such as indium tin oxide (ITO) or an organic conductor such as carbon nanotubes. A thickness of the metal film 12 is not particularly limited, and is, for example, several tens of nm to several tens of μm. The metal film 12 is connected to, for example, a ground potential. Accordingly, the metal film 12 functions as an electromagnetic shielding layer when it is implemented in the electronic apparatus 70. That is, for example, introduction of electromagnetic waves from the flexible display 11 or introduction of electromagnetic waves from other electronic components implemented in the electronic apparatus 70 and leakage of electromagnetic waves from the input device 100 are suppressed, which can contribute to stable operations of the electronic apparatus 70. In addition, in order to enhance the function as such an electromagnetic shielding layer, a plurality of metal films 12 may be provided.

As illustrated in FIG. 3, the metal film 12 is formed by, for example, attaching an adhesive layer 13 such as a pressure sensitive adhesive resin film in which a metallic foil is formed to the flexible display 11. Alternatively, the metal film 12 may be configured as a vapor deposited film or a sputtering film directly formed on the flexible display 11, or a coating film such as a conductive paste printed on a surface of the flexible display 11. In addition, a non-conductive film may be formed on a surface opposite to the flexible display 11 of the metal film 12. As the non-conductive film, for example, a scratch-resistant hard coat layer or a corrosion resistant anti-oxidation film can be formed.

(Conductor Layer)

The conductor layer 50 configures the lowermost portion of the input device 100, and is arranged to face the metal film 12 in the Z-axis direction. The conductor layer 50 also functions as, for example, a support plate of the input device 100, and is configured to have, for example, higher flexural rigidity than the operation member 10 and the electrode substrate 20. The conductor layer 50 may be configured as a metal plate including, for example, an Al alloy, a magnesium (Mg) alloy or other metal materials, or a conductor plate such as a carbon-fiber-reinforced plastic. Alternatively, the conductor layer 50 may have a laminated structure in which a conductive film such as a plating film, a vapor deposited film, a sputtering film or a metallic foil is formed on an insulator layer such as a plastic material. In addition, a thickness of the conductor layer 50 is not particularly limited, and is, for example, about 0.3 mm.

FIGS. 5A to 5E are schematic cross-sectional views illustrating exemplary configurations of the conductor layer 50. The conductor layer 50 is not limited to an example configured in a flat plate shape as illustrated in FIG. 5A, but may include a step portion 51 illustrated in FIGS. 5B, 5C, and 5E. Alternatively, the conductor layer 50 may also be configured in a mesh shape.

For example, a conductor layer 50B illustrated in FIG. 5B includes a step portion 51B that is formed by bending a circumference portion upward, i.e., in a Z-axis direction. Conductor layers 50C and 50E illustrated in FIGS. 5C and 5E have step portions 51C and 51E, respectively, each are formed at a middle portion and recessed downward. According to the step portion 51, it is possible to increase flexural rigidity of the conductor layer 50 in the Z-axis direction.

In addition, one or a plurality of openings 50$h$ are provided in the conductor layers 50D and 50E illustrated in FIGS. 5D and 5E. When the opening 50$h$ is provided in the conductor layer 50 in this manner, it is possible to increase heat dissipation while maintaining rigidity, suppress failure of the input device 100, and increase reliability. In addition, as described above, when the opening 50$h$ is provided in the conductor layer 50, it is possible to decrease a volume of the conductor layer 50 and decrease a weight of the input device 100. Further, as described above, when the opening 50$h$ is provided in the conductor layer 50, air flow becomes easy when a volume of the second space portion 430 is changed due to deformation, and a response time of the electrode substrate 20 decreases. Here, the response time indicates a time from when a weight of the operation member 10 is changed until a capacity of the sensor device 1 is actually changed.

As a shape of the opening 50$h$, a polygonal shape such as a triangle or a rectangle, a circular shape, an elliptical shape, an oval shape, an irregular shape and a slit shape are exemplified. These shapes may be used alone or in combinations of two or more shapes. When the plurality of openings 50$h$ are provided in the conductor layer 50, the plurality of openings 50$h$ are arranged in a regular or irregular pattern, and the regular pattern is preferable from the viewpoint of uniformity of sensor sensitivity. This arrangement may be either a 1D arrangement or a 2D arrangement. In addition, when the plurality of openings 50$h$ are provided in the conductor layer 50, the entire conductor layer 50 having the plurality of openings 50$h$ may have a mesh shape or a stripe shape as a whole, and the plurality of openings 50$h$ may form a geometric pattern as a whole.

When the opening 50$h$ is provided in the conductor layer 50, the opening 50$h$ is preferably provided at a position or a region that does not face the second structural body 410 and the second structural body 410 constituting a group. That is, the opening 50$h$ and the second structural body 410 are preferably provided to be shifted in a planar direction (within the XY plane) such that they do not overlap in the Z-axis direction (that is, a thickness direction of the input device 100). Therefore, the electrode substrate 20 and the conductor layer 50 are stably connected in the second structural body 410.

In addition, a preferable position of the opening 50$h$ in the conductor layer 50 is a position that does not face intersecting regions (the detection units 20$s$) between a plurality of electrode groups 21$w$ and a plurality of electrode groups 22$w$, which will be described below. That is, the opening 50$h$ and the detection unit 20$s$ are preferably provided to be shifted in the planar direction (within the XY plane) such that they do not overlap in the Z-axis direction (that is, the thickness direction of the input device 100). When the opening 50$h$ of the conductor layer 50 is arranged at a position facing the detection unit 20$s$, an initial capacitance or a capacitance change rate of the detection unit 20$s$ is changed and sensor sensitivity in the input device 100 becomes nonuniform, compared with when the opening 50$h$ of the conductor layer 50 is not arranged at a position facing the detection unit 20$s$.

It is preferable that an arrangement position of the opening 50$h$ be the same position in all detection regions 20$r$. However, the unit detection regions 20$r$ of the outermost circumference and in the vicinity of the outermost circumference of the input device 100 are excluded. Therefore, nonuniform sensor sensitivity in the input device 100 as described above is prevented. Also, the unit detection region 20$r$ will be described in detail below. In order to prevent sensor sensitivity from becoming nonuniform, it is preferable that the opening 50$h$ be arranged symmetrically with respect to a center of the detection unit (intersecting region) 20$s$. More specifically, the opening 50$h$ is preferably arranged in linear symmetry with respect to a center line of each of the first and second electrode lines 210 and 220.

Figure 47:
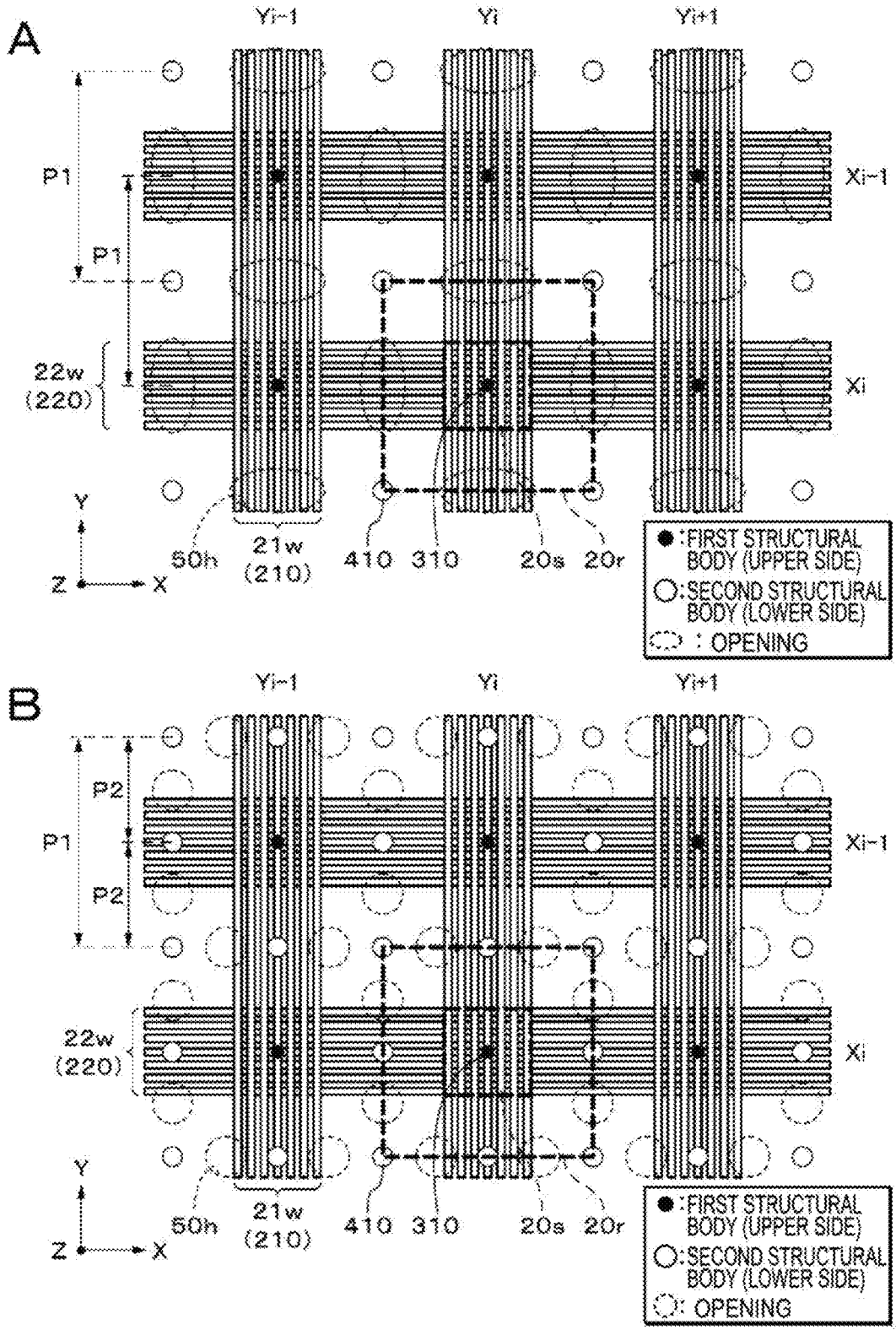
FIG. 47A is a plan view illustrating a first example of arrangement positions of a plurality of openings in a planar direction of the input device.
FIG. 47B is a plan view illustrating a second example of the arrangement positions of the plurality of openings in the planar direction of the input device.

FIGS. 47A and 47B are plan views illustrating arrangement position examples of the plurality of openings 50$h$ in the planar direction (within the XY plane) of the input device 100. FIG. 47A illustrates an example in which the opening 50$h$ has an oval shape. FIG. 47B illustrates an example in which the opening 50$h$ has a circular shape. The example illustrates that the plurality of openings 50$h$ are arranged on an outer circumference (circumference) of the unit detection region 20$r$, and the opening 50$h$, the second structural body 410 and the detection unit 20$s$ are provided to be shifted in the planar direction (within the XY plane) without overlapping the second structural body 410 or the detection unit 20$s$ in the Z-axis direction when viewed in the Z-axis direction (that is, the thickness direction of the input device 100).

The conductor layer 50 is connected to, for example, a ground potential. Accordingly, the conductor layer 50 functions as an electromagnetic shielding layer when it is implemented in the electronic apparatus 70. That is, for example, introduction of electromagnetic waves from other electronic components implemented in the electronic apparatus 70 and leakage of electromagnetic waves from the input device 100 are suppressed, which can contribute to stable operations of the electronic apparatus 70.

In order to enhance the function as the electromagnetic shielding layer, and particularly, in order to prevent electromagnetic waves from being introduced from the flexible display 11, a ground potential connecting method of the metal film 12 and the conductor layer 50 is preferably as follows.

Figure 49:
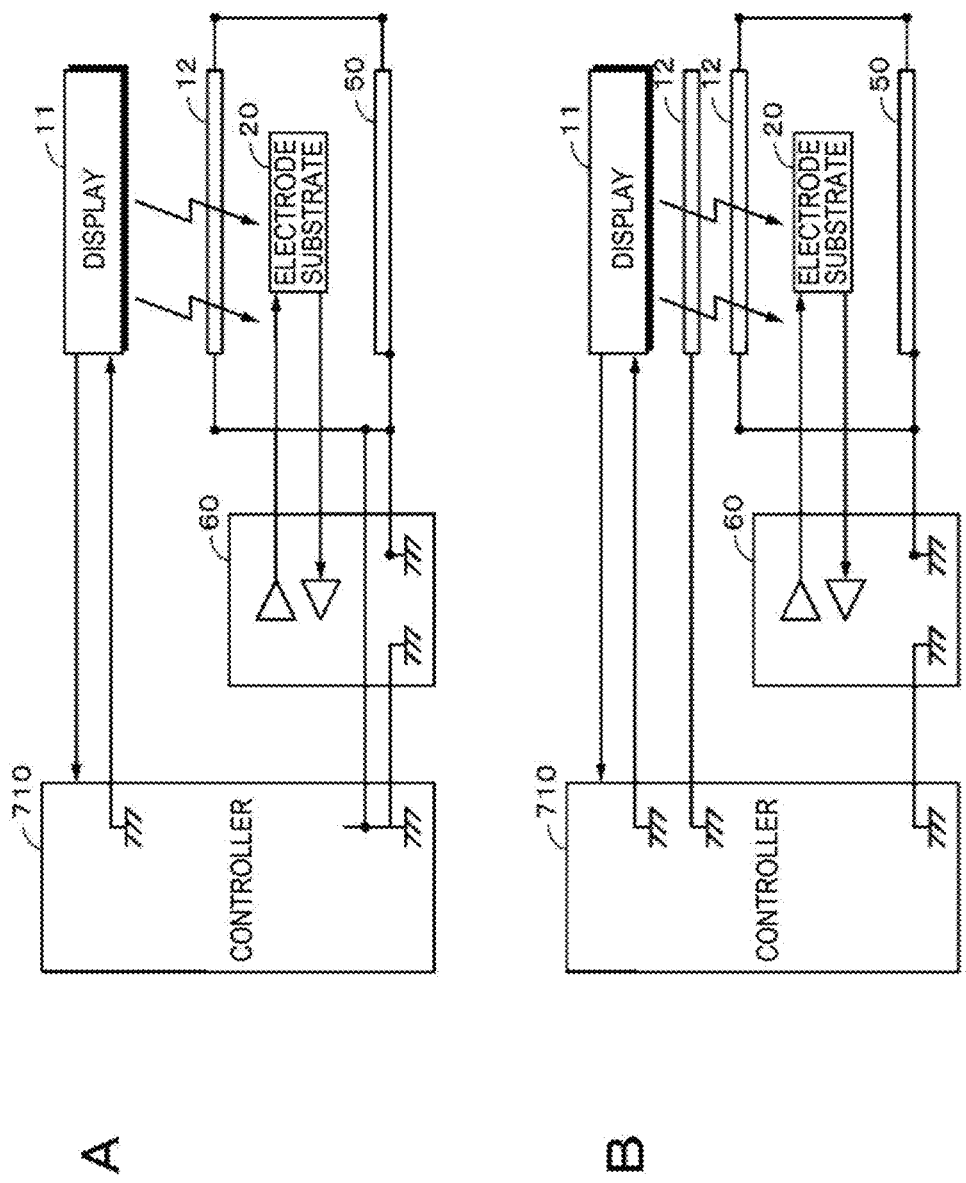
FIG. 49A is a schematic diagram illustrating a first example of a ground connection of the input device.
FIG. 49B is a schematic diagram illustrating a second example of the ground connection of the input device.

As illustrated in FIG. 49A, it is preferable that the metal film 12 and the conductor layer 50 be connected to not only a ground of the control unit 60 but also a ground of the controller 710. The flexible display 11 is connected to the controller 710 and is directly connected to a noise source. Therefore, it is possible to increase a shielding effect of the metal film 12. Moreover, when the metal film 12 and the conductor layer 50 are connected at many contact points, the effect increases.

In addition, as illustrated in FIG. 49B, a ground connection of the conductor layer 50 is in the control unit 60 and a plurality of metal films 12 are arranged. Among these metal films 12, the metal film 12 provided closest to the flexible display 11 may be connected to the controller 710. Further, a ground connection of the metal film 12 provided closest to the electrode substrate 20 among these metal films 12 may be connected to both the control unit 60 and the controller 710. Also, FIG. 57B illustrates an example in which two metal films 12 are provided.

(Adhesive Layer)

The adhesive layer 13 may also be provided between the flexible display 11 and the metal film 12. The adhesive layer 13 is configured as, for example, an adhesive or a pressure sensitive adhesive tape having an insulating property. As the adhesive, for example, one or more selected from the group consisting of an acrylic adhesive, a silicone-based adhesive and a urethane-based adhesive may be used. In the present disclosure, pressure sensitive adhesion is defined as a type of adhesion. According to this definition, a pressure sensitive adhesive layer is considered to be a type of adhesive layer.

Entire surfaces of the flexible display 11 and the metal film 12 may be adhered by the adhesive layer 13. In this case, strong adhesion and uniform sensitivity are obtained in an entire planar surface of the flexible display 11 and the metal film 12.

In addition, only outer circumference portions of the flexible display 11 and the metal film 12 may be adhered by the adhesive layer 13, and particularly preferably, both are adhered only at a part above the first frame 320. A part of the first frame 320 has a stronger adhesive force than a part of the first structural body 310, and when an upward peeling force is applied to the flexible display 11, it is possible to suppress destruction of the part of the first structural body 310, peeling of the metal film 12 and the first structural body 310, and peeling of the electrode substrate 20 and the first structural body 310.

In addition, only a display area (effective area) of the flexible display 11 may be adhered by the adhesive layer 13. When a wire, an FPC, a driver and the like are attached to the outer circumference portion of the flexible display 11, it is possible to prevent the flexible display 11 from being damaged. When a step of the outer circumference portion of the flexible display 11 is adhered, it is possible to prevent abnormality in sensitivity of a vicinity sensor from occurring. When the step of the outer circumference portion of the flexible display 11 is large or a warp is large, bonding may only be performed further inside than the display area (effective area).

In addition, as the adhesive layer 13, for example, an adhesive layer that has a substantially uniform thickness and is continuously provided between the flexible display 11 and the metal film 12, or an adhesive layer that has a predetermined pattern in a planar direction of the flexible display 11 and the metal film 12 may be used. A pattern of the adhesive layer 13 may be either a 1D pattern in which a predetermined adhesive pattern is repeated in one direction or a 2D pattern in which a predetermined adhesive pattern is repeated in two directions. As a specific pattern shape, a columnar shape, a stripe shape, a grid shape and the like are exemplified, but the present disclosure is not limited thereto. When the adhesive layer 13 has the pattern described above, it is possible to suppress air bubbles from being mixed into in the adhesive layer 13 and increase a yield rate when the flexible display 11 is laminated. When the adhesive layer 13 has the pattern described above, it is preferable that a thickness of the adhesive layer 13 be smaller than a thickness of the metal film 12. Moreover, it is preferable that the adhesive layer 13 have higher definition than the first structural body 310. That is, it is preferable that a size of the pattern of the adhesive layer 13 be smaller than a size of the first structural body 310. In this case, it is preferable that the size of the pattern of the adhesive layer 13 be 1/10 or less the size of the first structural body 310. When the adhesive layer 13 has higher definition than the first structural body 310, it is possible to suppress occurrence of nonuniformity in sensitivity and occurrence of periodicity in sensitivity due to interference between the pattern of the adhesive layer 13 and the pattern of the first structural body 310. Also, without the adhesive layer 13, only the flexible display 11 may be placed on the metal film 12.

(Electrode Substrate)

The electrode substrate 20 is configured as a body in which a first wiring substrate 21 including the first electrode line 210 and a second wiring substrate 22 including the second electrode line 220 are laminated.

The first wiring substrate 21 includes a first base material 211 (refer to FIG. 2), and a plurality of first electrode lines (Y electrodes) 210. The first base material 211 is configured as, for example, a sheet material having flexibility, and specifically, configured as an electrically insulating plastic sheet (film) such as PET, PEN, PC, PMMA, or polyimide. A thickness of the first base material 211 is not particularly limited, and is, for example, several tens of μm to several 100 μm.

The plurality of first electrode lines 210 are integrally provided on one surface of the first base material 211. The plurality of first electrode lines 210 are arranged in an X-axis direction at predetermined intervals, and substantially linearly formed in a Y-axis direction. Each of the first electrode lines 210 is drawn to an edge or the like of the first base material 211 and connected to a different terminal. In addition, each of the first electrode lines 210 is electrically connected to the control unit 60 through these terminals.

Also, each of the plurality of first electrode lines 210 is configured as the plurality of electrode groups 21w (refer to FIG. 10B) arranged in the X-axis direction. In addition, the plurality of electrode lines constituting each of the electrode groups 21w may be connected to a common terminal, or separately connected to two or more different terminals.

On the other hand, the second wiring substrate 22 includes a second base material 221 (refer to FIG. 2), and a plurality of second electrode lines (X electrodes) 220. Similar to the first base material 211, the second base material 221 is configured as, for example, a sheet material having flexibility, and specifically, configured as an electrically insulating plastic sheet (film) such as PET, PEN, PC, PMMA, or polyimide. A thickness of the second base material 221 is not particularly limited, and is, for example, several tens of μm to several 100 μm. The second wiring substrate 22 is arranged to face the first wiring substrate 21.

The plurality of second electrode lines 220 are configured similarly to the plurality of first electrode lines 210. That is, the plurality of second electrode lines 220 are arranged in the Y-axis direction at predetermined intervals, and substantially linearly formed in the X-axis direction. In addition, each of the plurality of second electrode lines 220 is configured as the plurality of electrode groups 22w (refer to FIG. 10B) arranged in the Y-axis direction.

Each of the second electrode lines 220 is drawn to an edge or the like of the second base material 221 and connected to a different terminal. The plurality of electrode lines constituting each of the electrode groups 22w may be connected to a common terminal or separately connected to two or more different terminals. In addition, each of the second electrode lines 210 is electrically connected to the control unit 60 through these terminals.

The first and second electrode lines 210 and 220 may be formed by a printing method such as screen printing, gravure offset printing, or ink jet printing using a conductive paste, or may be formed by a patterning method using a photolithography technique of a metallic foil or a metal layer. In addition, when both of the first and second base materials 211 and 221 are configured as a sheet having flexibility, the entire electrode substrate 20 can have flexibility.

As illustrated in FIG. 3, the electrode substrate 20 includes an adhesive layer 23 that bonds the first wiring substrate 21 and the second wiring substrate 22 to each other. The adhesive layer 23 has an electrically insulating property, and is configured as, for example, a cured material of an adhesive, or a pressure sensitive adhesive material such as a pressure sensitive adhesive tape.

The electrode substrate 20 includes the plurality of detection units 20s that are formed in regions in which the first electrode line 210 and the second electrode line 220 intersect and have a capacity that is changed according to a relative distance to each of the metal film (first conductor layer) 12 and the conductor layer (second conductor layer) 50. The plurality of first structural bodies 310 may form a group associated with each of the detection units 20s. In addition, the plurality of second structural bodies 410 may form a group associated with each of the detection units 20s. The plurality of first and second structural bodies 310 and 410 constituting each group may also be arranged symmetrically with respect to a center of the detection unit (intersecting region) 20s. More specifically, the first and second electrode lines 210 and 220 may also be arranged in linear symmetry with respect to respective center lines.

FIG. 6A is a schematic cross-sectional view for describing a configuration of the detection unit 20s. The detection unit 20s includes the first electrode line 210, the second electrode line 220 facing the first electrode line 210, and a capacity element that has a dielectric layer provided between the first and second electrode lines 210 and 220 and uses a mutual capacitance method. Also, it is described in FIGS. 6A and 6B that each of the first and second electrode lines 210 and 220 is configured as a single electrode line.

FIG. 6A illustrates an example in which the first electrode lines 210 ($210x_i$, $210x_{i+1}$, and $210x_{i+2}$) and the second electrode line 220 ($220y$) are arranged to face each other in the Z-axis direction. In the example illustrated in FIG. 6A, the first wiring substrate 21 and the second wiring substrate 22 are bonded to each other by the adhesive layer 23, and the first base material 211 of the first wiring substrate 21 and the adhesive layer 23 constitute the dielectric layer. In this case, the detection units $20s_i$, $20s_{i+1}$, and $20s_{i+2}$ are configured to be formed in intersecting regions in which each of the first electrode lines $210x_i$, $210x_{i+1}$, and $210x_{i+2}$ and the second electrode line $220y$ are capacitively coupled, and these electrostatic capacitances $C_i$, $C_{i+1}$, and $C_{i+2}$ are changed according to capacitive coupling of each of the metal film 12 and the conductor layer 50 and the first electrode lines $210x_i$, $210x_{i+1}$, and $210x_{i+2}$, and the second electrode line $220y$. Also, an initial capacitance of the detection unit 20s is set by, for example, a facing area between the first and second electrode lines 210 and 220, a facing distance between the first and second electrode lines 210 and 220, and a dielectric constant of the adhesive layer 23.

In addition, FIG. 6B illustrates a modification of the configuration of the detection unit 20s and illustrates an example in which first electrode lines 210D ($210Dx_i$, $210Dx_{i+1}$, and $210Dx_{i+2}$) and the second electrode line 220D ($220Dy_i$, $220Dy_{i+1}$, and $220Dy_{i+2}$) are arranged inside the same plane on the first base material 211D and capacitively coupled inside the XY plane. In this case, for example, the first base material 211D forms a dielectric layer of detection units 20Ds ($20Ds_i$, $20Ds_{i+1}$, and $20Ds_{i+2}$). Even such an arrangement is configured such that electrostatic capacitances $Ca_i$, $Ca_{i+1}$, and $Ca_{i+2}$ of the detection units $20Ds_i$, $20Ds_{i+1}$, and $20Ds_{i+2}$ are changed according to capacitive coupling of each of the metal film 12 and the conductor layer 50 and the first and second electrode lines 210Dx and 220Dy. In addition, in the above configuration, the second base material and the adhesive layer are unnecessary, which can contribute to decreasing a thickness of the input device 100.

In the present embodiment, each of the plurality of detection units 20s may be arranged to face the first structural body 310 or the group including the first structural bodies 310 in the Z-axis direction, and alternatively, may be arranged to face the second structural body 410 or the group including the second structural bodies 410 in the Z-axis direction. In addition, in the present embodiment, while the first wiring substrate 21 is laminated to be above the second wiring substrate 22, the present disclosure is not limited thereto, but the second wiring substrate 22 may be laminated to be above the first wiring substrate 21.

(Control Unit)

The control unit 60 is electrically connected to the electrode substrate 20. More specifically, the control unit 60 is connected to each of the plurality of first and second electrode lines 210 and 220 through a terminal. The control unit 60 includes a signal processing circuit capable of generating information (a signal) about an input operation with respect to the first surface 110 based on outputs of the plurality of detection units 20s. The control unit 60 obtains an amount of changes in capacitance of each of the detection units 20s while each of the plurality of detection units 20s is scanned at predetermined periods, and generates information (a signal) about the input operation based on the amount of change in capacitance.

Typically, the control unit 60 is configured as a computer including a CPU/MPU, a memory and the like. The control unit 60 may be configured as a single chip component or may be configured as a plurality of circuit components. The control unit 60 may also be mounted in the input device 100, or mounted in the electronic apparatus 70 in which the input device 100 is embedded. In the former case, for example, the control unit 60 is implemented on a flexible wiring substrate connected to the electrode substrate 20. In the latter case, the control unit 60 may be integrally formed with the controller 710 configured to control the electronic apparatus 70.

As described above, the control unit 60 includes the arithmetic operation unit 61 and the signal generating unit 62, and executes various functions according to a program stored in a storage unit (not illustrated). The arithmetic operation unit 61 computes an operation position in an XY coordinate system on the first surface 110 based on an electrical signal (input signal) output from each of the first and second electrode lines 210 and 220 of the electrode substrate 20. The signal generating unit 62 generates an operation signal based on the results. Accordingly, an image based on the input operation on the first surface 110 can be displayed on the flexible display 11.

The arithmetic operation unit 61 illustrated in FIGS. 3 and 4 computes XY coordinates of an operation position on the first surface 110 by an operant based on outputs from each of the detection units 20s to which unique XY coordinates are assigned. Specifically, the arithmetic operation unit 61 computes an amount of changes in electrostatic capacitance in each of the detection units 20s formed in each intersecting region between the Y electrode 210 and the X electrode 220 based on the amount of change in electrostatic capacitance obtained from each of the Y electrode 210 and the X electrode 220. According to a ratio of amounts of changes in electrostatic capacitance of the detection units 20s, it is possible to compute XY coordinates of the operation position by the operant.

In addition, the arithmetic operation unit 61 can determine whether the first surface 110 receives an operation. Specifically, for example, when an amount of changes in electrostatic capacitances of all of the detection units 20s or an amount of change in electrostatic capacitance of each of the detection units 20s is equal to or greater than a predetermined threshold value, it is possible to determine that the first surface 110 is receiving an operation. In addition, when two or more threshold values are provided, it is possible to distinguish, for example, a touch operation and an (intentional) push operation. Moreover, it is possible to compute a pressing force based on the amount of change in electrostatic capacitance of the detection unit 20s.

The arithmetic operation unit 61 can output these computation results to the signal generating unit 62.

The signal generating unit 62 generates a predetermined operation signal based on the computation result of the arithmetic operation unit 61. The operation signal may be, for example, an image control signal for generating a display image to be output to the flexible display 11, an operation signal corresponding to a key of a keyboard image to be displayed at an operation position on the flexible display 11, or an operation signal related to an operation corresponding to a graphical user interface (GUI).

Here, the input device 100 includes the first and second supports 30 and 40 as a configuration that causes a change in distances of each of the metal film 12 and the conductor layer 50 from the electrode substrate 20 (the detection unit 20s) according to an operation on the first surface 110. Hereinafter, the first and second supports 30 and 40 will be described.

(Basic Configuration of First and Second Supports)

The first support 30 is arranged between the operation member 10 and the electrode substrate 20. The first support 30 includes the plurality of first structural bodies 310, the first frame 320, and the first space portion 330. In the present embodiment, the first support 30 is bonded on the electrode substrate 20 through an adhesive layer 35 (refer to FIG. 3). The adhesive layer 35 may be an adhesive, and may be configured as a pressure sensitive adhesive material such as a pressure sensitive adhesive tape.

As illustrated in FIG. 3, the first support 30 according to the present embodiment has a structure in which a base material 31, a structure layer 32 provided on a surface (upper surface) of the base material 31, and a plurality of bonding units 341 formed at predetermined positions on the structure layer 32 are laminated. The base material 31 is configured as an electrically insulating plastic sheet such as PET, PEN, or PC. A thickness of the base material 31 is not particularly limited, and is, for example, several μm to several 100 μm.

The structure layer 32 is made of a resin material having an electrically insulating property such as a UV resin, and a plurality of first convex portions 321, second convex portions 322, and concave portions 323 are formed on the base material 31. The first convex portions 321 have a shape that protrudes in the Z-axis direction, for example, a columnar shape, a prismatic shape, or a truncated cone shape, and are arranged on the base material 31 at predetermined intervals. The second convex portions 322 are formed to surround the periphery of the base material 31 at predetermined widths.

In addition, the structure layer 32 is made of a material that has relatively high rigidity at which the electrode substrate 20 is deformable according to an input operation on the first surface 110, or may be made of an elastic material that is deformable together with the operation member 10 when the input operation is performed. That is, a modulus of elasticity of the structure layer 32 is not particularly limited, but is appropriately selected in a range in which a desired operation feeling or detection sensitivity is obtained.

The concave portion 323 is configured as a flat surface formed between the first and second convex portions 321 and 322. That is, a space region on the concave portion 323 forms the first space portion 330. In addition, an adhesion prevention layer 342 made of a UV resin having low pressure sensitive adhesion or the like may be formed on the concave portion 323 (not illustrated in FIG. 3). A shape of the adhesion prevention layer 342 is not particularly limited, but it may be formed in an island shape and formed as a flat film on the concave portion 323.

Further, the bonding unit 341 made of a resin material having pressure sensitive adhesion or the like is formed on each of the first and second convex portions 321 and 322. That is, each of the first structural bodies 310 is configured as a laminated body of the first convex portion 321 and the bonding unit 341 formed thereon. Each of the first frames 320 is configured as a laminated body of the second convex portion 322 and the bonding unit 341 formed thereon. Accordingly, the first structural body 310 and the first frame 320 have substantially the same thickness (height), for example, several μm to several 100 μm in the present embodiment. Also, the height of the adhesion prevention layer 342 is not particularly limited as long as it is smaller than the height of the first structural body 310 and the first frame 320, and is, for example, smaller than the first and second convex portions 321 and 322.

The plurality of first structural bodies 310 are arranged, for example, to correspond to the arrangement of the detection unit 20s or the unit detection region 20r. In the present embodiment, the plurality of first structural bodies 310 are arranged to face, for example, the plurality of detection units 20s or the unit detection region 20r in the Z-axis direction.

On the other hand, the first frame 320 is formed to surround the periphery of the first support 30 along a circumference of the electrode substrate 20. A length of the first frame 320 in a lateral direction, that is, a width, is not particularly limited as long as strength of the first support 30 and the entire input device 100 can be sufficiently ensured.

Meanwhile, the second support 40 is arranged between the electrode substrate 20 and the conductor layer 50. The second support 40 includes the plurality of second structural bodies 410, a second frame 420, and the second space portion 430.

Figure 15:
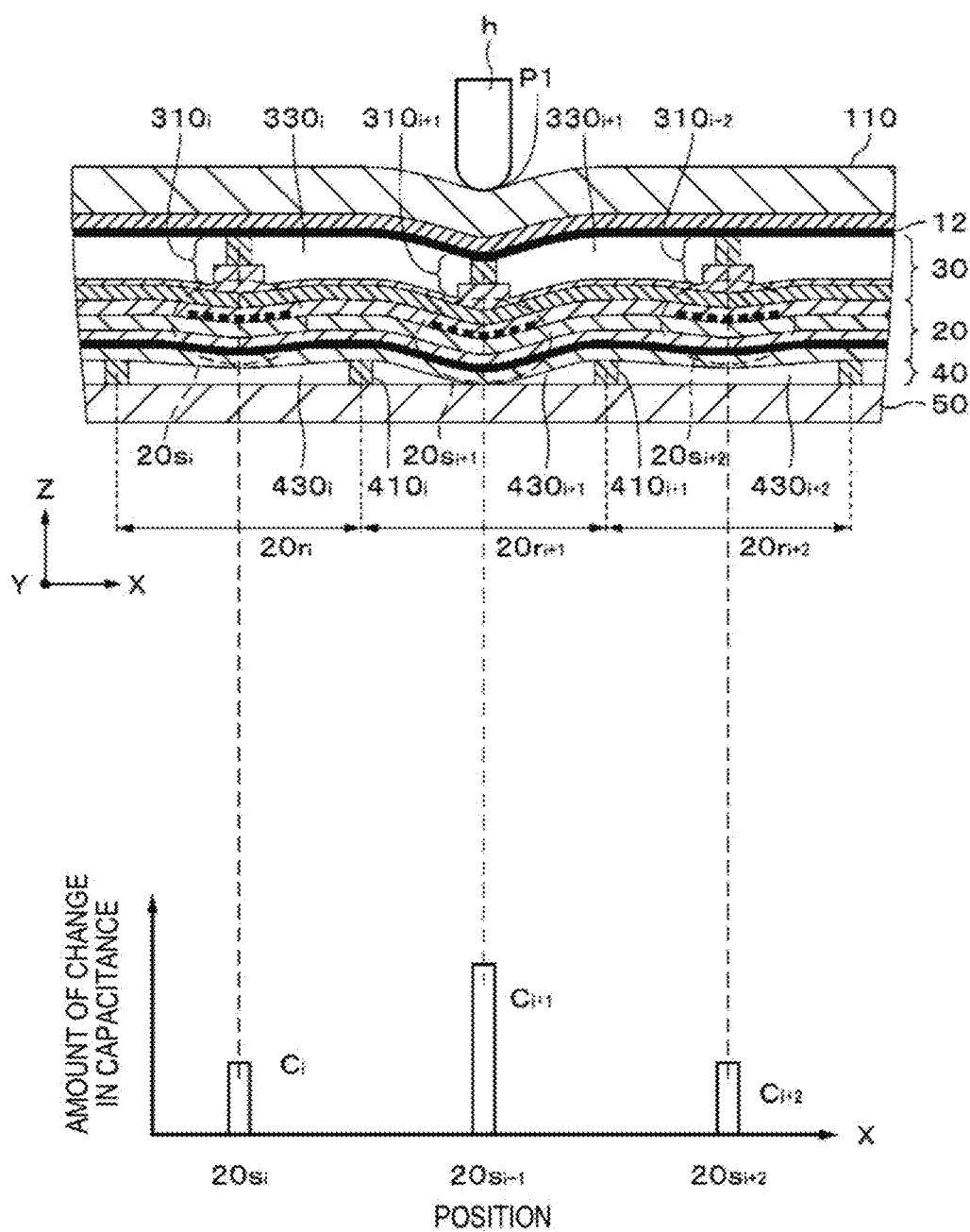
FIG. 15 is a schematic main part cross-sectional view illustrating an aspect of an input device when a point on a first structural body of a first surface receives an operation from an operant and is a diagram illustrating exemplary amounts of changes in capacitance of respective detection units at that time.

As illustrated in FIG. 3, the second support 40 according to the present embodiment includes the second structural body 410 and the second frame 420, which are directly formed on the conductor layer 50. The second structural body 410 and the second frame 420 are made of, for example, an insulating resin material having pressure sensitive adhesion, and also function as a bonding unit configured to bond the conductor layer 50 and the electrode substrate 20. A thickness of the second structural body 410 and the second frame 420 is not particularly limited, and is, for example, several μm to several 100 μm. Also, it is preferable that the thickness of the second structural body 410 be smaller than the thickness of the first structural body 310. Therefore, the electrode substrate 20 is deformed to be closer to the bottom of the conductor layer 50 and a great amount of change in capacitance is obtained, as illustrated in FIG. 15 below.

The second structural body 410 is arranged between the adjacent first structural bodies 310. That is to say, the second structural body 410 is arranged to correspond to the arrangement of each of the detection units 20s, and is arranged, between the adjacent detection units 20s in the present embodiment. On the other hand, the second frame 420 is formed to surround the periphery of the second support 40 along a circumference of the conductor layer 50. A width of the second frame 420 is not particularly limited as long as it can sufficiently ensure strength of the second support 40 and the entire input device 100, and is, for example, substantially the same as the width of the first frame 320.

In addition, similar to the structure layer 32 forming the first structural body 310, a modulus of elasticity of the second structural body 410 is not particularly limited. That is, the modulus of elasticity is appropriately selected in a range in which a desired operation feeling or detection sensitivity is obtained, and the second structural body 410 may be made of an elastic material that is deformable together with the electrode substrate 20 when the input operation is performed.

In addition, the second space portion 430 is formed between the second structural bodies 410 and forms a space region of peripheries of the second structural body 410 and the second frame 420. The second space portion 430 accommodates each of the detection units 20s and the first structural body 310 when viewed in the Z-axis direction in the present embodiment.

The first and second supports 30 and 40 having the configuration described above are formed as follows.

(Method of Forming First and Second Supports)

FIGS. 7A, 7B, and 7C are schematic cross-sectional views illustrating exemplary methods of forming the first support 30. First, a UV resin is arranged on the base material 31a, and a predetermined pattern is formed in the resin. Accordingly, as illustrated in FIG. 7A, the structure layer 32a including a plurality of first and second convex portions 321a and 322a and concave portions 323a is formed. As the UV resin, a solid sheet material or a liquid UV curable material may be used. In addition, a method of forming a pattern is not particularly limited. For example, a method in which an uneven shape pattern of a mold is transferred to the UV resin by a roll-shaped mold in which a pattern of a predetermined uneven shape is formed, UV light is radiated from the base material 31a side, and the UV resin is cured may be applied. In addition, other than the formation using the UV resin, the pattern may be formed by, for example, general thermoforming (for example, press molding or injection molding), or discharging a resin material using a dispenser or the like.

Next, as illustrated in FIG. 7B, a low adhesion UV resin or the like is applied on the concave portion 323a in a predetermined pattern by, for example, a screen printing method, and an adhesion prevention layer 342a is formed. Accordingly, for example, when a resin material forming the structure layer 32a has high adhesiveness, it is possible to prevent the metal film 12 and the concave portion 323 arranged on the first support 30 from being adhered. Also, when a resin material forming the structure layer 32a has low adhesiveness, no adhesion prevention layer 342a may be formed.

Next, as illustrated in FIG. 7C, the bonding unit 341a made of a high adhesion UV resin is formed on the convex portion 321a by, for example, a screen printing method. The first support 30 and the metal film 12 are bonded by the bonding unit 341a. By the above forming method, it is possible to form the first structural body 310 and the first frame 320 having a desired shape.

Figure 8:
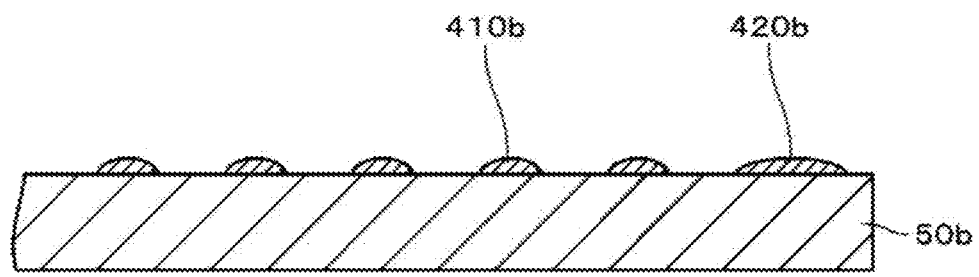
FIG. 8 is a schematic cross-sectional view illustrating an exemplary method of forming a second support of the input device according to the first embodiment of the present disclosure.

On the other hand, FIG. 8 is a schematic cross-sectional view illustrating an exemplary method of forming the second support 40. In FIG. 8, a high adhesion UV resin is directly applied on the conductor layer 50b in a predetermined pattern by, for example, a screen printing method, and the second structural body 410b and the second frame 420b are formed. Accordingly, it is possible to significantly decrease the number of processes and increase productivity.

The above forming method is an example. For example, the first support 30 may be formed by the method illustrated in FIG. 8, and the second support 40 may be formed by the method illustrated in FIG. 7. In addition, the first and second supports 30 and 40 may be formed by the following method illustrated in FIG. 9.

FIGS. 9A and 9B are schematic cross-sectional views illustrating modifications of the method of forming the first and second supports 30 and 40. Also, description of FIG. 9 will refer to reference numerals of the first support 30. In FIG. 9A, the UV resin or the like is applied onto the base material 31C or the like in a predetermined pattern by, for example, a screen printing method, and a first convex portion 311c and a second convex portion 312c are formed. Further, the bonding unit 341c made of a high adhesion UV resin or the like is formed on the first convex portion 311c and the second convex portion 312c by, for example, a screen printing method. Accordingly, it is possible to form the first structural body 310 (the second structural body 410) including the first convex portion 311c and the bonding unit 341c and the first frame 320 (or the second frame 420) including the second convex portion 312c and the bonding unit 341c.

(First and Second Electrode Lines)

FIG. 10A is a schematic diagram illustrating an arrangement example of the first and second electrode lines 210 and 220. The first electrode line 210 is a Y electrode that extends in the Y-axis direction and is provided in a stripe shape. The second electrode line 220 is an X electrode that extends in the X-axis direction and is provided in a stripe shape. The first electrode line 210 and the second electrode line 220 are arranged orthogonally to each other.

FIG. 10B is a schematic diagram illustrating one exemplary configuration of the first and second electrode lines 210 and 220. The first electrode line 210 is configured as the electrode group 21w that includes a group of a plurality of first sub-electrodes (electrode elements) 21z. The first sub-electrode 21z is a linear conductive member that extends in, for example, the Y-axis direction. The second electrode line 220 is configured as the electrode group 22w that includes a group of a plurality of second sub-electrodes (electrode elements) 22z. The second sub-electrode 22z is a linear conductive member (sub-electrode) that extends in, for example, the X-axis direction. The configuration of the first and second electrode lines 210 and 220 is not limited thereto, but one of the first electrode line 210 and the second electrode line 220 may be configured as a sub-electrode. When such a configuration is adopted, the plurality of first electrode lines 210 may be provided between the plurality of second electrode lines 220 and the metal films 12. Of the first and second electrode lines 210 and 220, the first electrode lines 210 may be configured to include a plurality of sub-electrodes 21z.

FIG. 10C is a schematic diagram describing the unit detection region 20r. The plurality of unit detection regions 20r are provided to correspond to respective intersecting sections between the first and second electrode lines 210 and 220. In the unit detection region 20r, the detection units 20s provided in the intersecting sections of the first and second electrode lines 210 and 220 are included. The plurality of unit detection regions 20r are two-dimensionally packed and arranged in, for example, the X-axis direction (first direction) and the Y-axis direction (second direction). The unit detection region 20r has, for example, a square shape or a rectangular shape that has a pair of sides extending in the X-axis direction and a pair of sides extending in the Y-axis direction. When the unit detection region 20r has the square shape or the rectangular shape, the packing arrangement of the plurality of unit detection regions 20r is a packing arrangement in a grid shape (matrix form).

The plurality of second structural bodies 410 are arranged, for example, between the adjacent unit detection regions 20r. That is, the plurality of second structural bodies 410 are arranged on, for example, the outer circumference (circumference) of the unit detection region 20r. In addition, the plurality of second structural bodies 410 are arranged, for example, symmetrically with respect to a center of the unit detection region 20r.

When the unit detection region 20r has a square shape or a rectangular shape, the arrangement position of the second structural body 410 can be, for example, a midpoint of each side forming the unit detection region 20r, each vertex (corner) of the unit detection region 20r, a vicinity of each vertex (corner) of the unit detection region 20r. Two or more of the arrangement positions may be combined. FIG. 10C illustrates an example in which the second structural body 410 is arranged at each vertex (corner) of the unit detection region 20r.

From the viewpoint of the improvement in the detection sensitivity of an input operation, the arrangement position of the second structural body 410 is preferably both positions of the midpoint of each side forming the unit detection region 20r and each vertex (corner) of the unit detection region 20r, more preferably the position of the midpoint of each side forming the unit detection region 20r, and most preferably the position of each vertex (corner) of the unit detection region 20r. From the viewpoint of improvement in an adhesive force of the second structural body 410 with the electrode substrate 20 and the surface of the conductor layer 50, the arrangement position of the second structural body 410 is preferably a combination of each vertex (corner) and the vicinity of each vertex (corner) of the unit detection region 20r. The arrangement position of the second structural body 410 is not limited to the above-described arrangement examples, but the second structural body 410 may instead be arranged on the outer circumference (circumference) of the unit detection region 20r.

Figure 48:
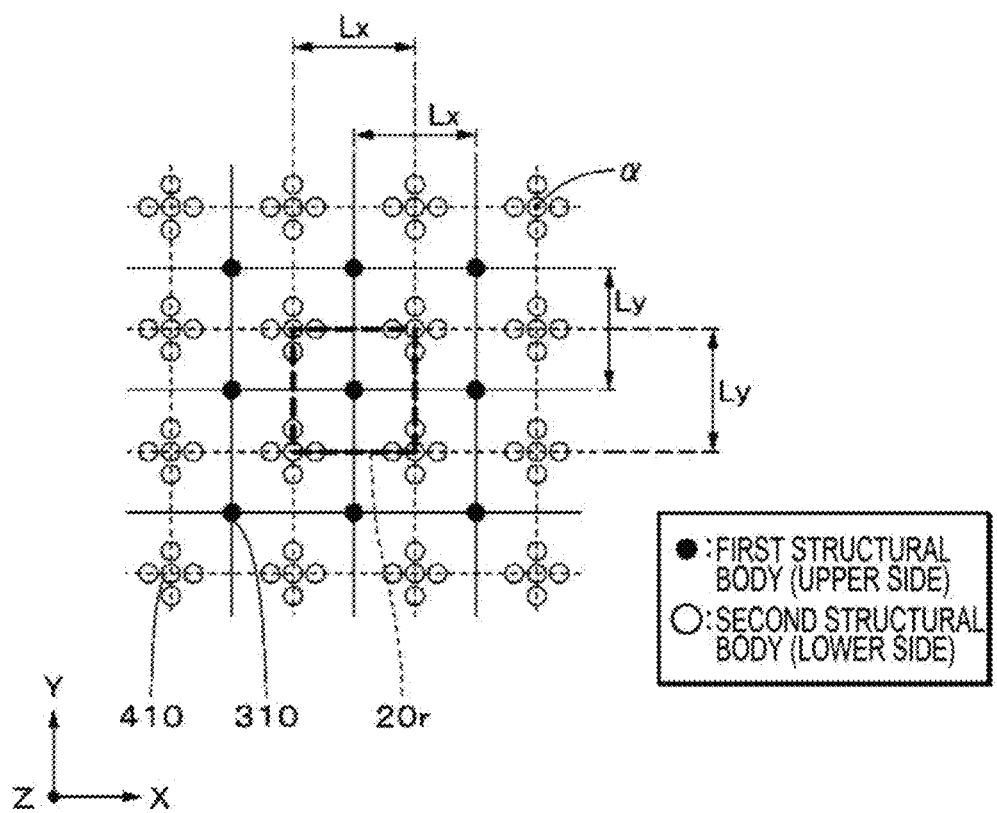
FIG. 48 is a plan view illustrating an arrangement example of a plurality of second structural bodies at the vertexes of the unit detection region and the vicinities of the vertexes.

FIG. 48 is a plan view illustrating an arrangement example of a plurality of second structural bodies at the vertexes (corners) of the unit detection region 20r and the vicinities of the vertexes (corners). The plurality of second structural bodies 410 are arranged in a cross form in which a position a is an intersecting point. Here, the position a is a position at which the vertexes of four adjacent unit detection regions 20r come in contact with each other. As an arrangement distance (an arrangement distance in the X-axis direction or the Y-axis direction) of the plurality of second structural bodies 410 arranged in the cross form, for example, an equal distance is selected.

(Arrangement Example of First and Second Structural Bodies)

FIGS. 11A and 11B are schematic plan views illustrating arrangement examples of the first and second structural bodies 310 and 410, the first electrode line (Y electrode) 210 and the second electrode line (X electrode) 220. FIGS. 11A and 11B illustrate examples in which the X electrodes 220 and the Y electrodes 210 have the electrode groups 21w and 22w, respectively. In addition, as described above, since the respective detection units 20s are formed in intersecting sections between the Y electrodes 210 and the X electrodes 220, for example, six detection units 20s are arranged in FIGS. 11A and 11B. Also, in FIGS. 11A and 11B, black circles indicate the first structural bodies 310 and white circles indicate the second structural bodies 410.

A region in which the detection unit 20s is formed is a region in which the first electrode line (Y electrode) 210 and the first electrode line (X electrode) 220 overlap with each other viewed in the Z-axis direction (the thickness direction of the input device 100). Specifically, a region in which the detection unit 20s is formed in the X-axis direction is in a range from the outside end surface of the first sub-electrode 21z forming one end of the first electrode line (Y electrode) 210 in the width direction to the outside end surface of the first sub-electrode 21z forming the other end. On the other hand, a region in which the detection unit 20s is formed in the Y-axis direction is in a range from the outside end surface of the second sub-electrode 22z forming one end of the second electrode line (X electrode) 220 in the width direction to the outside end surface of the second sub-electrode 22z forming the other end. Here, the outside end surface of the first sub-electrode 21z refers to a far end surface from the center of the detection unit 20s between both end surfaces of the first sub-electrode 21z in the x-axis direction. On the other hand, the outside end surface of the second sub-electrode 22z refers to a far end surface from the center of the detection unit 20s between both end surfaces of the second sub-electrode 22z in the y-axis direction.

The unit detection region (unit sensor region) 20r is provided to correspond to the intersecting section between the Y electrode 210 and the X electrode 220. The detection unit 20s is provided in the unit detection region 20r. The plurality of second structural bodies 410 are arranged on the outer circumference of the unit detection region 20r. The unit detection region 20r refers to a region obtained by equally dividing a principal surface of the input device 100 to correspond to the intersecting section between the Y electrode 210 and the X electrode 220. Typically, the unit detection region 20r is defined by the following (A) or (B).

(A) A region defined by the plurality of second structural bodies 410 that are provided to correspond to the intersecting sections between the Y electrodes 210 and the X electrodes 220.

Here, a position of each side (for example, a midpoint of each side) and/or each vertex (corner) of the unit detection region 20r is defined by the second structural body 410.

(B) A region satisfying the following two formulae when each intersecting point between a center line of the Y electrode 210 and a center line of the X electrode 220 is set as an origin point O $$-Lx/2 \leq X < +Lx/2$$

$$-Ly/2 \leq Y < +Ly/2$$

(where, in the formulae, Lx: a center-to-center interval of the Y electrodes 210, and Ly: a center-to-center interval of the X electrodes 220)

FIG. 11A illustrates an example in which the number of first structural bodies 310 is substantially the same as the number of the second structural bodies 410. That is, the first structural body 310 is arranged at substantially the center of the detection unit 20s. The pitches of the first structural bodies 310 in the X-axis direction and the Y-axis direction are the same as the pitches of the detection units 20s in the X-axis direction and the Y-axis direction, and are P1. The second structural bodies 410 are arranged at the same distance between the first structural bodies 310 and the detection units 20s mutually adjacent in each of the X-axis and Y-axis directions and a diagonal direction of about 45° at the same pitch P1 as the first structural bodies 310.

FIG. 11B illustrates an example in which the number of first structural bodies 310 is different from the number of second structural bodies 410. That is, the first structural bodies 310 are arranged at the pitch P1 at the substantial centers of the detection units 20s, as in the example illustrated in FIG. 11A. On the other hand, the arrangement and the number of second structural bodies 410 are different from in FIG. 11A and the second structural bodies 410 are arranged at a pitch P2 which is half of the pitch P1 of the first structural bodies 310. The second structural bodies 410 are arranged to surround the circumference of the first structural body 310 and the detection unit 20s when viewed in the Z-axis direction. By arranging the second structural bodies 410 so that the number of second structural bodies 410 is greater than the number of first structural bodies 310, it is possible to increase the strength of the entire input device 100.

When the number and the arrangement (pitch) of the first and second structural bodies 310 and 410 are adjusted, it is possible to adjust an amount of change in a distance of each of the metal film 12 and the conductor layer 50 from the detection unit 20s with respect to the pressing force such that a desired operation feeling or detection sensitivity is obtained.

As described above, the first and second supports 30 and 40 according to the embodiment have the characteristics of (1) the first and second structural bodies 310 and 410 and the first and second space portions 330 and 430 are included and (2) the first structural body 310 and the second structural body 410 do not overlap when viewed in the Z-axis direction and the first structural body 310 is arranged above the second space portion 430. Accordingly, as will be described below, it is possible to deform the metal film 12 and the conductor layer 50 with a minute pressing force of, for example, about several tens of g when an operation is performed.

(Operation of First and Second Supports)

Figure 12:
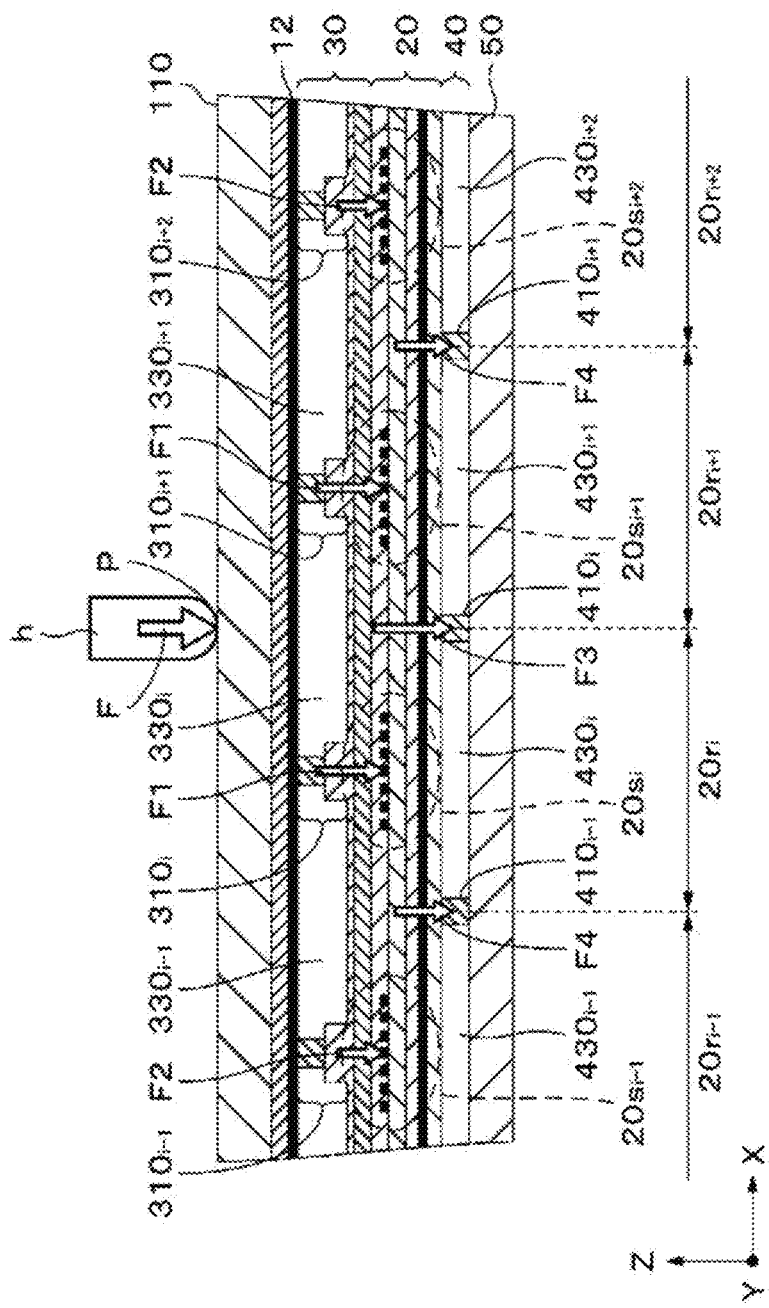
FIG. 12 is a schematic cross-sectional view illustrating a state of a force applied to first and second structural bodies when an operant presses a point at a first surface of an input device downward, i.e., in a Z-axis direction.

FIG. 12 is a schematic cross-sectional view illustrating a state of a force applied to the first and second structural bodies 310 and 410 when an operant h presses a point P on the first surface 110 downward, i.e., in a Z-axis direction. A white arrow in the drawing schematically indicates a magnitude of a downward force in the Z-axis direction (hereinafter simply referred to as "downward"). Aspects of deflection of the metal film 12 and the electrode substrate 20 and elastic deformation of the first and second structural bodies 310 and 410 are not illustrated in FIG. 12. Also, in the following description, even when the user performs a touch operation with no awareness that he or she is applying pressure, since a minute pressing force is actually applied, such input operations are collectively described as "pressing."

For example, a point P above the first space portion 330, is pressed downward with a force F, the metal film 12 directly below the point P is deflected downward. According to this deflection, the first structural bodies $310i$ and $310_{i+1}$ adjacent to the first space portion $330i$ receives a force F1 and is elastically deformed in the Z-axis direction, and the thickness thereof slightly decreases. In addition, according to the deflection of the metal film 12, the first structural bodies $310_{i-1}$ and $310_{i+2}$ adjacent to the first structural bodies $310_i$ and $310_{i+1}$ also receive a force F2 smaller than F1. Moreover, due to the forces F1 and F2, a force is also applied to the electrode substrate 20, and thus centers of regions directly below the first structural bodies $310_i$ and $310_{i+1}$ are bent downward. Accordingly, the second structural body 410, arranged between the first structural bodies $310_i$ and $310_{i+1}$ also receives a force F3 and is elastically deformed in the Z-axis direction, and the thickness thereof slightly decreases. In addition, the second structural body $410_{i-1}$ arranged between the first structural bodies $310_{i-1}$ and $310_i$ and the second structural body $410_{i+1}$ arranged between the first structural bodies $310_{i+1}$ and $310_{i+2}$ receive F4 that is smaller than F3.

In this manner, it is possible to transmit a force in a thickness direction with the first and second structural bodies 310 and 410, and easily deform the electrode substrate 20. In addition, when the metal film 12 and the electrode substrate 20 are deflected and an influence of the pressing force is provided in the planar direction (a direction parallel to the X-axis direction and the Y-axis direction), it is possible to apply a force to not only a region directly below the operant h but also the first and second structural bodies 310 and 410 in the vicinity thereof.

For the characteristic (1), the metal film 12 and the electrode substrate 20 can be easily deformed by the first and second space portions 330 and 430. Further, because the first and second structural bodies 310 and 410 have a columnar body or the like, it is possible to apply a high pressure to the electrode substrate 20 according to the pressing force of the operant h and efficiently deflect the electrode substrate 20.

For the characteristic (2), when the first and second structural bodies 310 and 410 are arranged such that they do not overlap when viewed in the Z-axis direction, the first structural body 310 can easily deflect the electrode substrate 20 toward the conductor layer 50 through the second space portion 430 therebelow.

(Advantages of Sub-Electrodes)

Hereinafter, advantages obtained by configuring the first and second electrode lines 210 and 220 as the first and second sub-electrodes 21z and 22z will be described.

FIGS. 13A and 13B schematically illustrate the configuration of the input device in which the first and second electrode lines 210 and 220 are configured as the first and second sub-electrodes 21z and 22z. FIGS. 14A and 14B schematically illustrate the configuration of the input device in which the first and second electrode lines 210 and 220 are configured as the first and second electrodes 21y and 22y with a planar shape of a single configuration. FIGS. 13A and 14A illustrate a state in which the metal film 12 is not pressed and FIGS. 13B and 14B illustrate a state in which the metal film 12 is pressed. In FIGS. 13A, 13B, 14A, and 14B, solid lines La and dashed lines Lb indicate electrode lines. Of the solid lines La and the dashed lines Lb, the dashed lines Lb correspond to a capacitance change caused when the first and second sub-electrodes 21z and 22z or the first and second electrodes 21y and 22y become closer to the conductor layer 50. In FIGS. 13A, 13B, 14A, and 14B, illustration of some of the members of the input device 100 is omitted in order to facilitate the description.

In a mutual capacitance type (capacitance decrease type), the capacitance change is decided according to an amount by which the metal film (GND) 12 and the conductor layer (GND) 50 absorb the electric field leaking from the end portions of the first and second electrode lines 210 and 220. That is, when there are more end portions of the first and second electrode lines 210 and 220, the capacitance change increases.

When the first and second electrode lines 210 and 220 are configured as the first and second sub-electrodes 21z and 22z, there are more end portions of the first and second electrode lines 210 and 220, and thus the capacitance change increases. On the other hand, when the first and second electrode lines 210 and 220 are configured as the first and second sub-electrodes 21z and 22z with the planar shape of the single configuration, there are fewer end portions of the first and second electrode lines 210 and 220 and coupling between the first and second electrode lines 210 and 220 is too strong, and thus the capacitance change is small.

Hereinafter, exemplary amounts of changes in electrostatic capacitance of the detection unit 20s when a specific operation is performed will be described.

(Output Example of Detection Unit)

Figure 16:
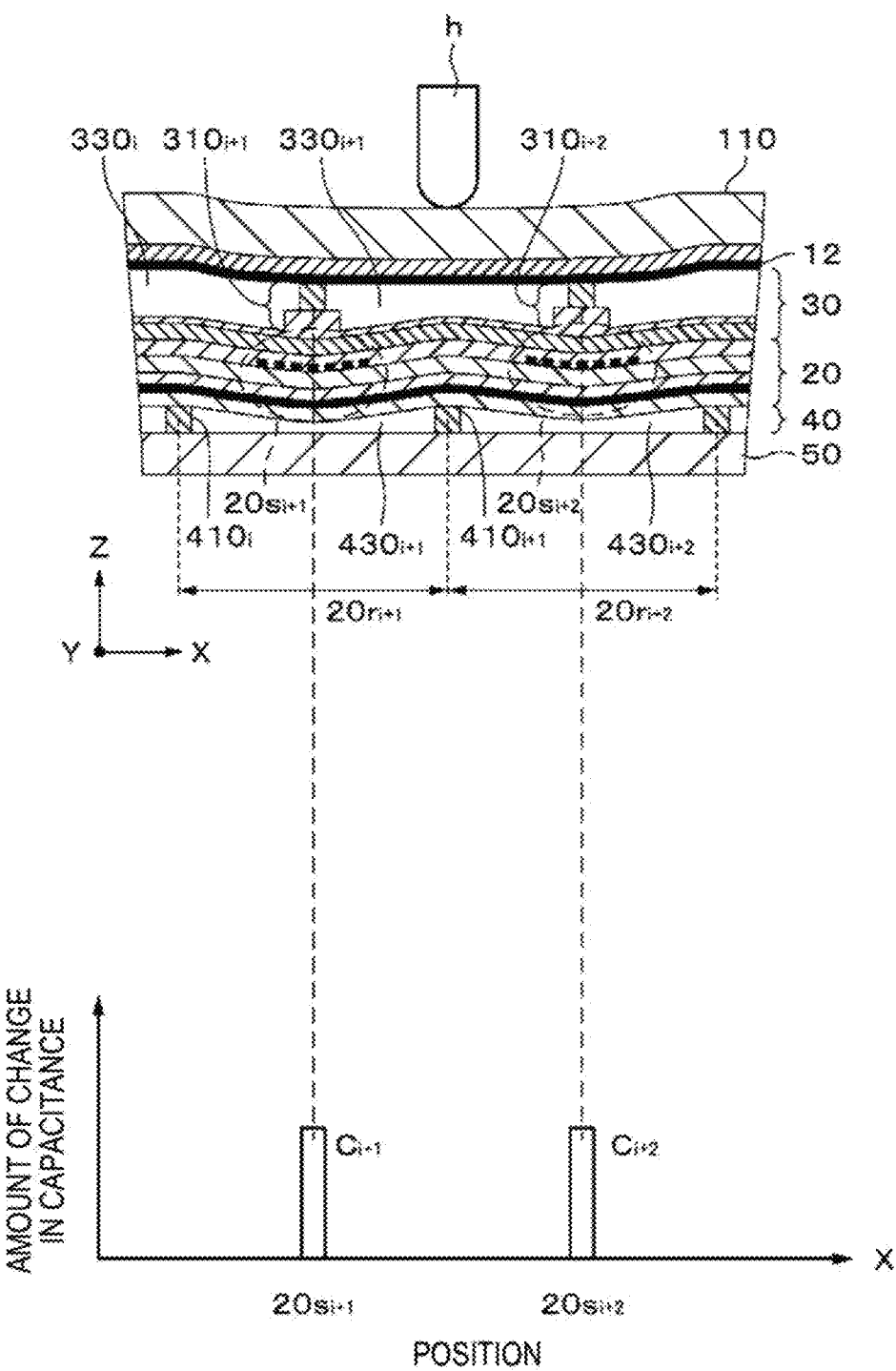
FIG. 16 is a schematic main part cross-sectional view illustrating an aspect of an input device when a point on a first space portion of a first surface receives an operation from an operant and is a diagram illustrating exemplary amounts of changes in capacitance of respective detection units at that time.

FIGS. 15 and 16 are schematic main part cross-sectional views illustrating aspects of the input device 100 when the first surface 110 receives an operation from the operant h, and are diagrams illustrating exemplary amounts of changes in capacitance of the respective detection units 20s at that time. Bar graphs illustrated along the X axis in FIGS. 15 and 16 schematically illustrate amounts of changes in electrostatic capacitance from a reference value in the respective detection units 20s. In addition, FIG. 15 illustrates an aspect when the operant h presses the center of the unit detection region 20r, that is, the first structure body 310 ($310_{i+1}$). FIG. 16 illustrates an aspect when the operant h presses a center point between the unit detection region 20r and the adjacent unit detection region 20r, that is, the first space portion 330 ($330_{i+1}$).

In FIG. 15, the first structural body $310_{i+1}$ directly below the operation position receives the greatest force, and the first structural body $310_{i+1}$ itself is elastically deformed and displaced downward. According to this displacement, the detection unit $20s_{i+1}$ directly below the first structural body $310_{i+1}$ is displaced downward. Accordingly, the detection unit $20s_{i+1}$ and the conductor layer 50 become closer or come in contact through the second space portion $430_{i+1}$. That is, a distance between the detection unit $20s_{i+1}$ and the metal film 12 is slightly changed, a distance between the detection unit $20s_{i+1}$ and the conductor layer 50 is greatly changed, and thus an amount of change in electrostatic capacitance $C_{i+1}$ is obtained. On the other hand, according to an influence of deflection of the metal film 12, the first structural bodies $310_i$ and $310_{i+2}$ are also slightly displaced downward, and amounts of changes in electrostatic capacitance in the detection units $20s_i$ and $20s_{i+2}$ are $C_i$ and $C_{i+2}$, respectively.

In the example illustrated in FIG. 15, $C_{i+1}$ is the greatest, and $C_i$ and $C_{i+2}$ are substantially the same and smaller than $C_{i+1}$. That is, as illustrated in FIG. 12, amounts of changes in electrostatic capacitances $C_i$, $C_{i+1}$, and $C_{i+2}$ illustrate a mountain-shaped distribution having $C_{i+1}$ as an apex. In this case, the arithmetic operation unit 61 can compute a center of gravity based on a ratio of $C_i$, $C_{i+1}$, and $C_{i+2}$, and compute XY coordinates on the detection unit $20s_{i+1}$ as the operation position.

On the other hand, in FIG. 16, according to deflection of the metal film 12, the first structural bodies $310_{i+1}$ and $310_{i+1}$ in the vicinity of the operation position are slightly elastically deformed and displaced downward. According to this displacement, the electrode substrate 20 is deflected, and the detection units $20s_{i+1}$ and $20s_{i+2}$ directly below the first structural bodies $310_{i+1}$ and $310_{i+2}$ are displaced downward. Accordingly, the detection units $20s_{i+1}$ and $20s_{i+2}$ and the conductor layer 50 become closer or come in contact through the second space portions $430_{i+1}$ and $430_{i+2}$. That is, a distance between the detection units $20s_{i+1}$ and $20s_{i+2}$ and the metal film 12 is slightly changed, a distance between the detection units $20s_{i+1}$ and $20s_{i+2}$ and the conductor layer 50 is relatively greatly changed, and thus amounts of changes in electrostatic capacitances $C_{i+1}$ and $C_{i+2}$ are obtained.

In the example illustrated in FIG. 16, $C_{i+1}$ and $C_{i+2}$ are substantially the same. Accordingly, the arithmetic operation unit 61 can compute XY coordinates between the detection units $20s_{i+1}$ and $20s_{i+2}$ as the operation position.

In this manner, according to the present embodiment, since both thicknesses of the detection unit 20s and the metal film 12, and the detection unit 20s and the conductor layer 50 are variable according to the pressing force, it is possible to further increase the amount of change in electrostatic capacitance in the detection unit 20s. Accordingly, it is possible to increase detection sensitivity of the input operation.

In addition, regardless of whether the operation position on the flexible display 11 is on the first structural body 310 or the first space portion 330, it is possible to compute XY coordinates of the operation position. That is, when the metal film 12 spreads an influence of the pressing force in the planar direction, it is possible to cause a change in electrostatic capacitance in not only the detection unit 20s directly below the operation position but also in the detection unit 20s in the vicinity of the operation position when viewed in the Z-axis direction. Accordingly, it is possible to suppress a variation of detection accuracy in the first surface 110 and maintain high detection accuracy in the entire surface of the first surface 110.

Here, as an object that is commonly used as the operant, a finger, a stylus and the like are exemplified. Both have the following characteristics. Since the finger has a larger contact area than the stylus, when the same load (the same pressing force) is applied, the finger has a smaller pressure (hereinafter referred to as an "operation pressure") with respect to the pressing force. On the other hand, the stylus has a smaller contact area and has a problem in that, for example, in an electrostatic capacitance sensor using a general mutual capacitance method, capacitive coupling with a sensor element decreases and detection sensitivity decreases. According to the present embodiment, regardless of which of these operants is used, it is possible to detect the input operation with high accuracy. Hereinafter, descriptions will be provided with reference to FIGS. 17 and 18.

Figure 17:
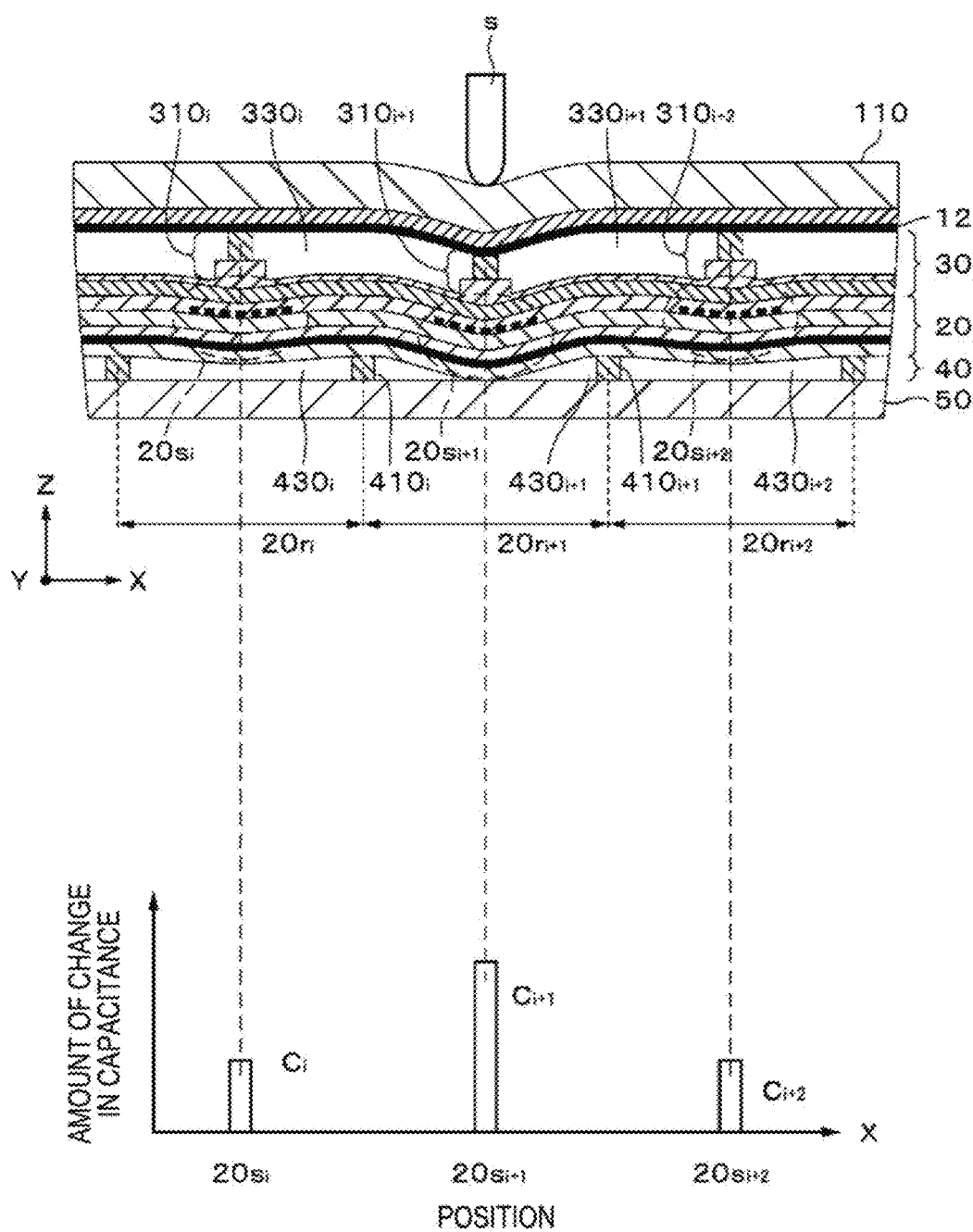
FIG. 17 is a schematic main part cross-sectional view illustrating an aspect of an input device when a first surface receives an operation from a stylus and is a diagram illustrating exemplary amounts of changes in capacitance of respective detection units at that time.
Figure 18:
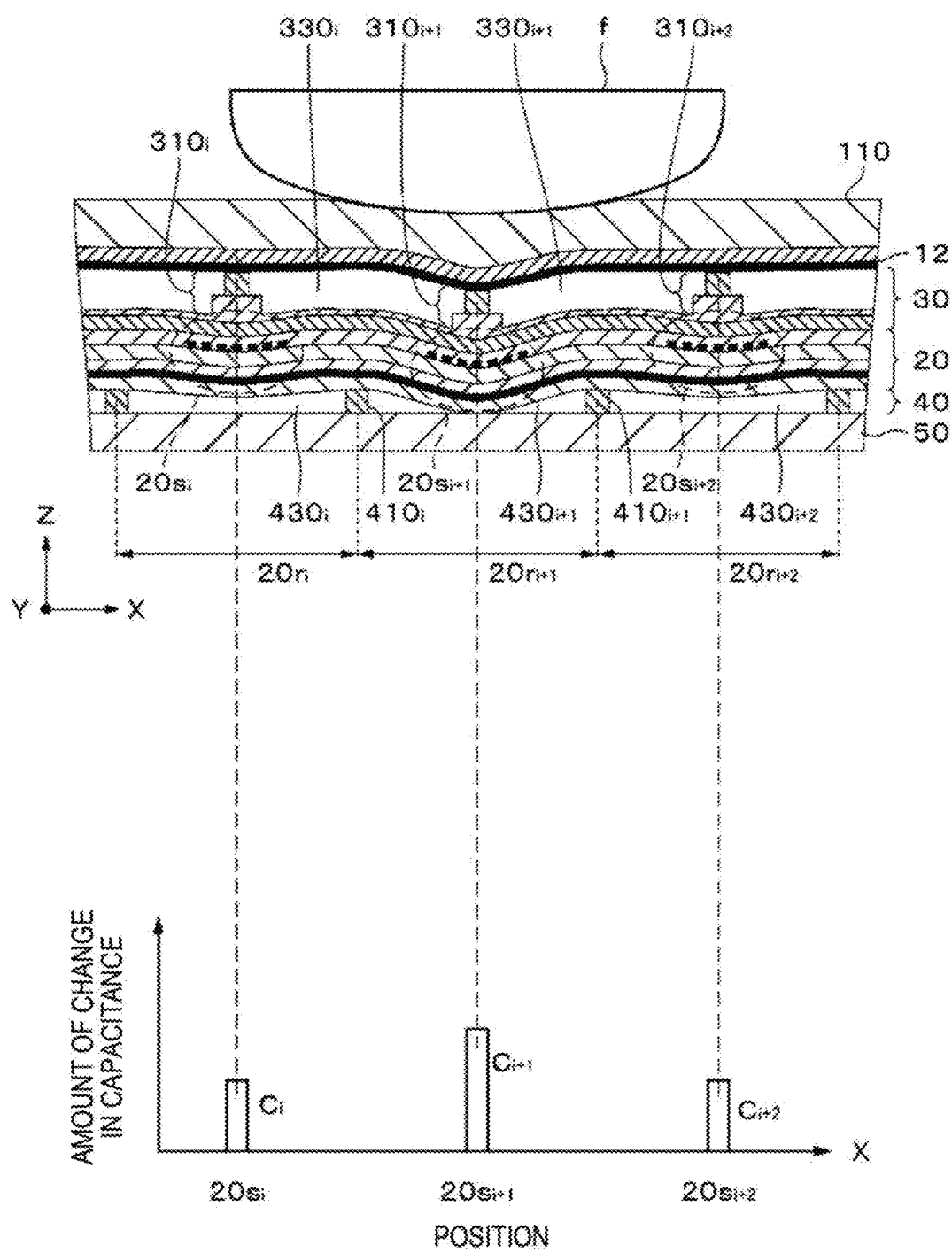
FIG. 18 is a schematic main part cross-sectional view illustrating an aspect of an input device when a first surface receives an operation from a finger and is a diagram illustrating exemplary amounts of changes in capacitance of respective detection units at that time.

FIGS. 17 and 18 are schematic main part cross-sectional views illustrating aspects of the input device 100 when the first surface 110 receives an operation from the stylus or the finger and are diagrams illustrating exemplary output signals output from the respective detection units 20s at that time. FIG. 17 illustrates a case in which the operant is the stylus s. FIG. 18 illustrates a case in which the operant is the finger f. In addition, similar to FIGS. 15 and 16, bar graphs illustrated along the X axis in FIGS. 17 and 18 schematically illustrate amounts of changes in electrostatic capacitance from a reference value in the respective detection units 20s.

As illustrated in FIG. 17, the stylus s deforms the metal film 12 and applies the pressing force to the first structural body $310_{i+1}$ directly below the operation position. Here, since the stylus s has a small contact area, it is possible to apply a high operation pressure to the metal film 12 and the first structural body $310_{i+1}$. Therefore, the metal film 12 can be greatly deformed. As a result, as illustrated in the amount of change in the electrostatic capacitance $C_{i+1}$ of the detection unit $20s_{i+1}$, it is possible to cause a great amount of change in electrostatic capacitance. Accordingly, amounts of changes in electrostatic capacitances $C_i$, $C_{i+1}$, and $C_{i+2}$ of the detection units $20s_i$, $20s_{i+1}$, and $20s_{i+2}$ form a mountain-shaped distribution having $C_{i+1}$ as an apex.

In this manner, the input device 100 according to the present embodiment can detect an amount of change in electrostatic capacitance based on a planar distribution of the operation pressure. This is because the input device 100 does not detect an amount of change in electrostatic capacitance by direct capacitive coupling with the operant but detects an amount of change in electrostatic capacitance through the deformable metal film 12 and the electrode substrate 20. Therefore, even when the operant such as the stylus s having a small contact area is used, it is possible to detect the operation position and the pressing force with high accuracy.

On the other hand, as illustrated in FIG. 15, since the finger f has a large contact area and thus the operation pressure decreases, the finger f can directly deform a wider range of the metal film 12 than the stylus s. Accordingly, the first structural bodies $310_i$, $310_{i+1}$, and $310_{i+2}$ are displaced downward, and amounts of changes in the electrostatic capacitances $C_i$, $C_{i+1}$ and $C_{i+2}$ of the detection units $20s_i$, $20s_{i+1}$, and $20s_{i+2}$ can be generated, respectively. $C_i$, $C_{i+1}$, and $C_{i+2}$ form a gentler mountain-shaped distribution than $C_i$, $C_{i+1}$, and $C_{i+2}$ in FIG. 17.

Since the input device 100 according to the present embodiment detects an amount of change in electrostatic capacitance based on both capacitive couplings between the detection unit 20s and each of the metal film 12 and the conductor layer 50 as described above, it is possible to cause a sufficient change in electrostatic capacitance even when an operant having a large contact area such as the finger f is used. In addition, when it is determined whether an operation is performed, it is possible to determine contact with high accuracy based on the pressing force of the entire first surface 110 even when the operation pressure is small, for example, using a total value of amounts of changes in electrostatic capacitance of all of the detection units $20s_i$, and $20s_{i+2}$ whose electrostatic capacitances are changed. Moreover, since the electrostatic capacitance is changed based on the operation pressure distribution in the first surface 110, it is possible to compute the operation position according to the user's intention based on a ratio of these change amounts or the like.

In addition, a general electrostatic capacitance sensor uses capacitive coupling between the operant and X and Y electrodes and detects the operation position or the like. That is, when a conductor was arranged between the operant and the X and Y electrodes, it was difficult to detect the input operation due to capacitive coupling between the conductor and the X and Y electrodes. In addition, a configuration in which a thickness between the operant and the X and Y electrodes is great has problems in that an amount of capacitive coupling therebetween decreases and detection sensitivity decreases. In view of these problems, there was a need to arrange a sensor device on a display surface of a display, and thus a problem of deterioration in display quality of the display was caused.

Here, since the input device 100 (the sensor device 1) according to the present embodiment uses capacitive coupling between the metal film 12 and the X electrodes 220 and between the conductor layer 50 and the Y electrodes 210, even when the conductor is arranged between the operant and the sensor device, there is no influence on detection sensitivity. In addition, when the metal film 12 is deformable under the pressing force of the operant, restriction of a thickness between the operant and the X and Y electrodes is small. Therefore, even when the sensor device 1 is arranged on a rear surface of the flexible display 11, it is possible to detect the operation position and the pressing force with high accuracy, and it is possible to suppress a display characteristic of the flexible display 11 from deteriorating.

Moreover, since restriction of a thickness of an insulator (dielectric material) provided between the operant and the X and Y electrodes is small, even when the user performs the operation while wearing, for example, an insulating glove, there is no decrease in detection sensitivity. Therefore, it can contribute to increasing user convenience.

(Occurrence of Deviation of Coordinate Calculation and Reason Therefor)

FIG. 19A is a diagram illustrating an ideal capacitance change rate distribution. In FIG. 19A, $C_i$, and $C_{i+1}$ indicate center positions of the unit detection regions $20r_i$ and $20r_{i+1}$ (the detection units $20s_i$ and $20s_{i+1}$), respectively. In addition, $L_i$ and $L_{i+1}$ indicate capacitance change rate distributions of the unit detection regions $20r_i$ and $20r_{i+1}$ (the detection units $20s_i$ and $20s_{i+1}$) in the X-axis direction, respectively.

As indicated by an arrow b of FIG. 19A, when a load applied to the first surface 110 of the input device 100 is moved from a center position $C_i$ to a center position $C_{i+1}$, the following tendency is ideal. That is, the tendency in which a capacitance change rate of the detection unit $20s_{i+1}$ monotonically increases as indicated by an arrow $a_{i+1}$ whereas a capacitance change rate of the detection unit $20s_i$ monotonically decreases as indicated by an arrow $a_i$ is ideal.

However, when the first and second sub-electrodes 21z and 22z are not gathered near the middle portion of the unit detection region 20r, the capacitance change rate distribution does not have the ideal distribution illustrated in FIG. 19A but tends to have a distribution illustrated in FIG. 19B. That is, in the center positions $C_i$ and $C_{i+1}$ of the unit detection regions $20r_i$ and $20r_{i+1}$, two split peaks tend to be shown around the center positions $C_i$ and $C_{i+1}$, rather than one peak shown in the capacitance change rate distribution. In this manner, regions $R_i$ and $R_{i+1}$ between two split peaks cause a deviation of coordinate calculation.

Here, a reason for which the above-described two peaks occur will be described below with reference to FIGS. 44A and 44B. As illustrated in FIG. 44A, when the position P1 corresponding to the center of the unit detection region $20r_{i+1}$ within the first surface 110 is pressed by the operant h, the metal film 12 and the electrode substrate 20 are deformed in substantially the same shape. Accordingly, even when pressed, a distance between the metal film 12 and the electrode substrate 20 is substantially constant. On the other hand, as illustrated in FIG. 44B, when the position P2 in the vicinity between the unit detection regions $20r_{i+1}$ and $20r_{i+2}$ within the first surface 110 is pressed by the operant h, only the metal film 12 in the vicinity of the pressed position P2 is greatly deformed. Accordingly, when pressed, only a distance between the metal film 12 and the electrode substrate 20 in the vicinity of the pressed position P2 is greatly changed. As a result, in the capacitance change rate distribution, as described above, one peak occurs at both sides of the center position $C_i$ of the detection unit 20s, (refer to FIG. 19B).

Next, the reason for which occurrence of the two peaks can be suppressed by using the configuration in which the first and second sub-electrodes 21r and 22z are gathered near the middle portion of the unit detection region 20r will be described with reference to FIGS. 25A and 25B. As illustrated in FIG. 25A, when the position P1 corresponding to the center of the unit detection region $20r_{i+1}$ within the first surface 110 is pressed by the operant h, the metal film 12 and the electrode substrate 20 are deformed in substantially the same shape. Accordingly, even when pressed, a distance between the metal film 12 and the electrode substrate 20 is substantially constantly maintained. On the other hand, as illustrated in FIG. 25B, when the position P2 in the vicinity between the unit detection regions $20r_{i+1}$ and $20r_{i+2}$ within the first surface 110 is pressed by the operant h, only the metal film 12 in the vicinity of the pressed position P2 is greatly deformed. However, at the position at which the metal film 12 in the vicinity of the pressed position P2 is deformed, accuracy of the number of intersecting points between the first and second sub-electrodes 21z and 22z is less than in the center of the unit detection region 20r (the detection unit 20s) or is 0. Accordingly, the capacitance change is rarely shown even when the distance between the metal film 12 and the electrode substrate 20 in the vicinity of the pressed position P2 is greatly change after being pressed. Therefore, from the viewpoint of suppressing the deviation of coordinate calculation, it is desirable to use the configuration in which the first and second sub-electrodes 21z and 22z are gathered in the vicinity of the middle portion of the unit detection region 20r. Even when a local distance is greatly changed in this way, by not sensitizing this portion in regard to the capacitance, it is possible to obtain the ideal capacitance change rate distribution monotonously decreasing from the center of the unit detection region 20r (see FIG. 19A).

The density of electrode intersecting points between the first and second sub-electrodes 21z and 22z (hereinafter appropriately referred to as "sub-electrode intersecting points") is preferably greater in the middle portion than in the peripheral portion of the intersecting region between the first and second electrode lines 210 and 220 (the peripheral portion of the detection unit 20s). Accordingly, it is possible to reduce the sizes of the two peaks occurring in the capacitance change rate distribution more than when the density of the sub-electrode intersecting points is constant.

The density of the sub-electrode intersecting points is preferably higher in a position or a region facing the first structural body 310 or a group of the first structural bodies 310 than in a position or a region facing the second structural body 410. Accordingly, it is possible to reduce the sizes of the two peaks occurring in the capacitance change rate distribution more than when the density of the sub-electrode intersecting points is constant. Here, "the position or the region facing the group of the first structural bodies 310" means "a position or a region facing the circumference (outer circumference) of a polygon that has a plurality of first structural bodies 310 forming a group as vertexes." As the shape of the polygon, for example, a square or a rectangle can be exemplified, but embodiments of the present disclosure are not limited thereto.

The sub-electrode intersecting point is preferably not provided in a position or a region facing the second structural body 410. Accordingly, it is possible to reduce the sizes of the two peaks occurring in the capacitance change rate distribution more than when the sub-electrode intersecting point is provided in a position or a region facing the second structural body 410.

The sub-electrode intersecting point is preferably provided in a region facing the first structural body 310 or the group of the first structural bodies 310, or inside the region.

By providing the sub-electrode intersecting point in a range less than ⅓ of the widths Lx and Ly of the unit detection region 20r, it is possible to suppress occurrence of two peaks in the capacitance change rate distribution substantially completely.

[Increase of Load Sensitivity]

In the input device 100 according to the present embodiment, the first and second sub-electrodes 21z and 22z are gathered near the middle portion of the unit detection regions 20r, and thus it is possible to improve load sensitivity.

Here, the reason for which the increase in the load sensitivity is possible when the first and second sub-electrodes 21z and 22z are gathered near the middle portion of the unit detection regions 20r will be described with reference to FIGS. 44A, 25A, and 26A.

FIG. 44A illustrates an example of the input device 100 in which the one first structural body 310 is included in the unit detection region 20r and the density of sub-electrode intersecting points is substantially constant in the unit detection region 20r. In the input device 100 illustrated in this example, when the position P1 corresponding to the center of the unit detection region $20r_{i+1}$ within the first surface 110 is pressed by the operant h, as illustrated in FIG. 44A, only the electrode substrate 20 directly below the first structural body 310 is locally deformed toward the conductor layer 50. At this time, the capacitance change at the sub-electrode intersecting point directly below the first structural body 310 is considerably large, but the capacitance change at the sub-electrode intersecting point in the vicinity of the unit detection region 20r is small. Accordingly, when the capacitance change rate in one entire detection unit 20s is considered, the capacitance change rate is averaged at all of the sub-electrode intersecting points in the detection unit 20s and the capacitance change rate decreases.

Here, the capacitance change rate was computed by the following formula.

(capacitance change rate)[%]=[(initial capacitance $C_0$)−(changed capacity $C_1$)]/(initial capacitance $C_0$)

In the formula, the terms "initial capacitance $C_0$" and "changed capacity $C_1$" specifically indicate the following values.

initial capacitance $C_0$: an electrostatic capacitance of the input device when no weight is applied to a surface of the operation member.

changed capacity $C_1$: an electrostatic capacitance of the input device after a weight is applied to a surface of the operation member.

FIG. 25A illustrates an example of the input device 100 in which the one first structural body 310 is included in the unit detection region 20r and first and second sub-electrodes 21z and 22z are gathered near the middle portion of the unit detection regions 20r. In the input device 100 illustrated in this example, when the position P1 corresponding to the center of the unit detection region $20r_{i+1}$ within the first surface 110 is pressed by the operant h, as illustrated in FIG. 25A, only the electrode substrate 20 directly below the first structural body 310 is locally deformed toward the conductor layer 50. At this time, the capacitance change at the sub-electrode intersecting point directly below the first structural body 310 is considerably large and the sub-electrode intersecting points are dense at the positions directly below the first structural bodies 310. Therefore, when the capacitance change rate in one entire detection unit 20s is considered, the capacitance change rate is larger than when the density of the sub-electrode intersecting points is substantially constant in the unit detection region 20r. As a result, the amount of change in the capacitance increases when the position P2 corresponding to the center of the unit detection region $20r_{i+1}$ is pressed by the operant h.

When the density of the sub-electrode intersecting points is higher in the middle portion than in the peripheral portion of the intersecting region between the first and second electrodes, a maximum capacitance change rate and sensitivity can be improved more than when the density of the sub-electrode intersecting points is constant. Here, the sensitivity (load sensitivity) refers to a slope of a curved line of the capacitance change rate distribution in the vicinity of the load "0 gf."

By not providing the sub-electrode intersecting point at the position facing the second structural body, it is possible to further improve the maximum capacitance change rate and the sensitivity.

By not providing the sub-electrode intersecting point at the position facing the second structural body, it is possible to further improve the maximum capacitance change rate and the sensitivity.

By providing the sub-electrode intersecting point in the range less than ⅓ of the widths Lx and Ly of the unit detection region, it is possible to further improve the maximum capacitance change rate and the sensitivity.

FIG. 26A illustrates an example of the input device 100 in which two or more first structural bodies 310 are included in the unit detection region 20r and the first and second sub-electrodes 21z and 22z are gathered in a region facing a group of the plurality of first structural bodies or inside the region. In the input device 100 illustrated in the example, as illustrated in FIG. 26A, when the position P2 corresponding to the center of the unit detection region $20r_{i+1}$ within the first surface 110 is pressed by the operant h, as illustrated in FIG. 26A, a wide range of the electrode substrate 20 surrounded by the first structural bodies 310 near the center of the unit detection region $20r_{i+1}$ is deformed toward the conductor layer 50. At this time, a capacitance change of the wider range surrounded by the first structural body 310 near the center of the unit detection region $20r_{i+1}$ is considerably larger and the sub-electrode intersecting points are dense within this range. Therefore, when the capacitance change rate in one entire detection unit 20s is considered, the capacitance change rate is larger than when the density of the sub-electrode intersecting points is substantially constant in the unit detection region 20r. As a result, the amount of change in the capacitance increases when the position P2 corresponding to the center of the unit detection region $20r_{i+1}$ is pressed by the operant h. Further, since the electrode substrate 20 is deformed in a wider range than in the case of FIG. 25A, a region in which the density of the sub-electrode intersecting points is large is broadened. Therefore, it is possible to increase the numbers of first and second sub-electrodes 21z and 22z. As a result, the initial capacitance $C_0$ can be increased while increasing the capacitance change rate, and thus S/N is improved.

[Electronic Apparatus (Rear Surface Non-Sensitivity)]

Figure 20:
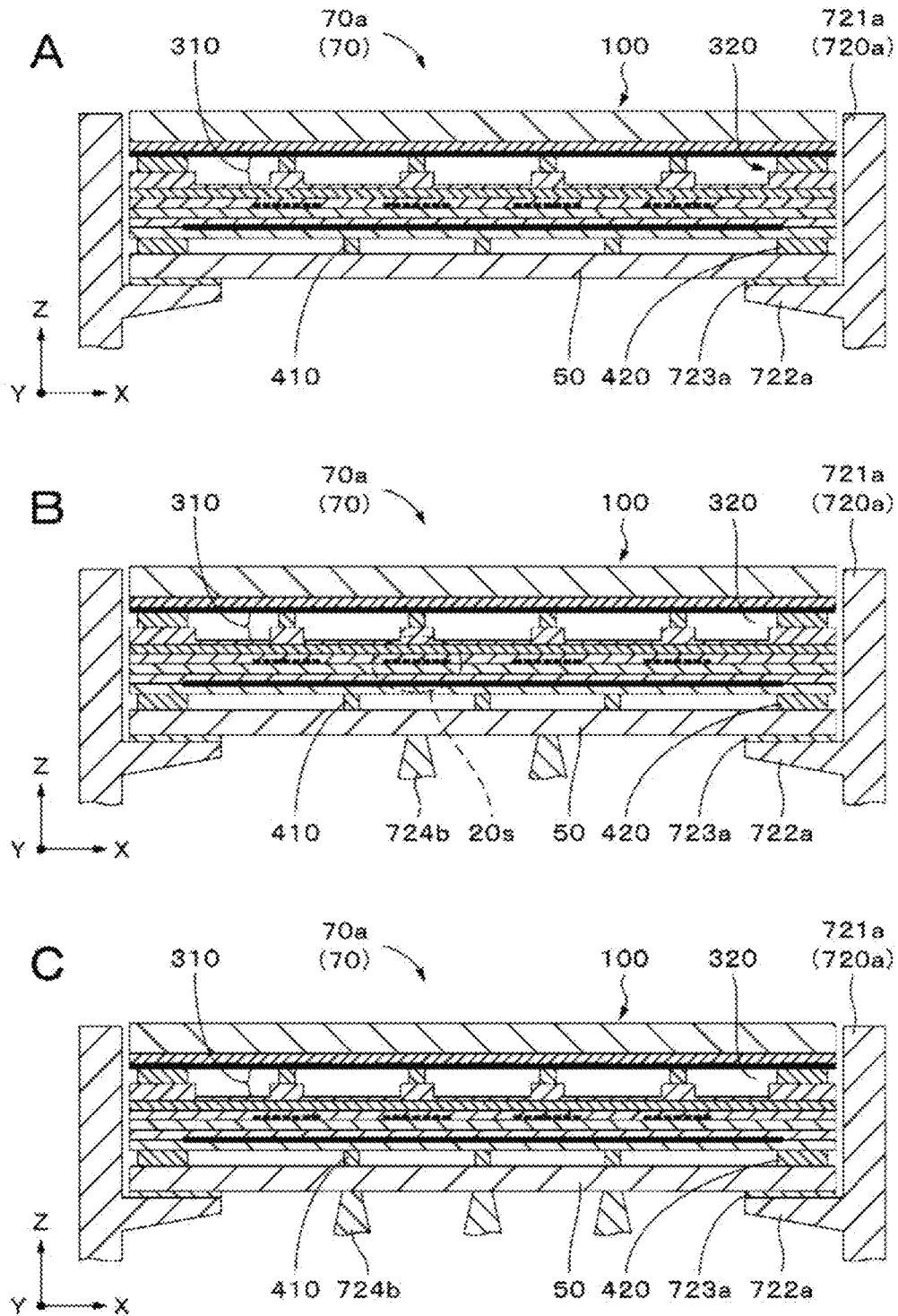
FIG. 20A is a schematic cross-sectional view illustrating an example in which the input device according to the first embodiment of the present disclosure is implemented in an electronic apparatus.
FIG. 20B is a schematic cross-sectional view illustrating a first modification of the example in which the input device according to the first embodiment of the present disclosure is implemented in an electronic apparatus.
FIG. 20C is a schematic cross-sectional view illustrating a second modification of the example in which the input device according to the first embodiment of the present disclosure is implemented in an electronic apparatus.

FIG. 20A, FIGS. 20B, and 20C are diagrams illustrating examples in which the input device 100 according to the present embodiment is implemented in the electronic apparatus 70. The electronic apparatus 70a according to FIG. 20A has a case 720a including an opening portion 721a in which the input device 100 is arranged. In addition, a support portion 722a is formed in the opening portion 721a, and supports a circumference portion of the conductor layer 50 through a bonding unit 723a such as a pressure sensitive adhesive tape. In addition, a method of bonding the conductor layer 50 and the support portion 722a is not limited thereto. For example, a screw may be used for fixation.

In addition, in the input device 100 according to the present embodiment, since the first and second frames 320 and 420 are formed along a circumference, it is possible to maintain strength stably even when implementation is performed.

The electronic apparatus 70b according to FIG. 20B has substantially the same configuration as the electronic apparatus 70a, and has a case 720b including the opening portion 721a and the support portion 722a. A difference is that at least one auxiliary support portion 724b supporting a rear surface of the conductor layer 50 is provided. For example, the auxiliary support portion 724b supports the input device 100 in the peripheral portion of the detection unit 20s from the rear surface of the conductor layer 50 or at a position facing the first structural body 310 from the rear surface of the conductor layer 50. According to the configuration, it is possible to support the input device 100 more stably. The auxiliary support portion 724b may be bonded with the conductor layer 50 by a pressure sensitive adhesive tape or the like or may not be bonded.

The electronic apparatus 70b according to FIG. 20C has substantially the same configuration as the electronic apparatus 70b, and has a case 720b including the opening portion 721a and the support portion 722a. A difference is that the auxiliary support portion 724b supporting the rear surface of the conductor layer 50 is provided below the second structural body 410. The auxiliary support portion 724b may be bonded with the conductor layer 50 by a pressure sensitive adhesive tape or the like or may not be bonded. The input device 100 receives a load from the auxiliary support portion 724b, the load is delivered mainly to the second structural body 410 located directly thereabove, and the second structural body 410 deforms the electrode substrate. However, since the first and second sub-electrodes 21z and 22z are gathered near the middle portion of the unit detection region 20r, the density of the sub-electrode intersecting points in the portion deformed by the second structural body 410 decreases, and thus the amount of change in the capacitance decreases. In comparison to this, when the auxiliary support portion 724b is near the center of the unit detection unit $20r_{i+1}$ as in FIG. 20B, the conductor layer 50 receives a load from the auxiliary support portion 724b and is deformed. This deformation is detected at the sub-electrode intersecting point near the middle portion of the unit detection region 20r. According to the configuration in which the auxiliary support portion 724b supporting the rear surface of the conductor layer 50 is disposed below the second structural body 410, it is possible to support the input device 100 more stably.

[Effects]

Since the input device 100 according to the present embodiment detects an amount of change in electrostatic capacitance based on both capacitive couplings between the detection unit 20s and each of the metal film 12 and the conductor layer 50 as described above, it is possible to cause a sufficient change in electrostatic capacitance even when an operant having a large contact area such as the finger f is used. In addition, when it is determined whether an operation is performed, it is possible to determine contact with high accuracy based on the pressing force of the entire first surface 110 even when the operation pressure is small, for example, using a total value of amounts of changes in electrostatic capacitance of all of the detection units $20s_i$, $20s_{i+1}$, and $20s_{i+2}$ whose electrostatic capacitances are changed. Moreover, since the electrostatic capacitance is changed based on the operation pressure distribution in the first surface 110, it is possible to compute the operation position according to the user's intention based on a ratio of these change amounts or the like.

Since at least one of the first and second electrode lines 210 and 220 includes the plurality of sub-electrodes, it is possible to increase the initial capacitance and the capacitance change rate. By increasing the initial capacitance in this way, it is possible to improve a signal-to noise ratio (SN ratio) of the input device 100. By increasing the capacitance change rate in this way, it is possible to improve operation sensitivity of the input device.

In addition, a general electrostatic capacitance sensor uses capacitive coupling between the operant and X and Y electrodes and detects the operation position or the like. That is, when a conductor was arranged between the operant and the X and Y electrodes, it was difficult to detect the input operation due to capacitive coupling between the conductor and the X and Y electrodes. In addition, a configuration in which a thickness between the operant and the X and Y electrodes is great has problems in that an amount of capacitive coupling therebetween decreases and detection sensitivity decreases. In view of these problems, there was a need to arrange a sensor device on a display surface of a display, and thus a problem of deterioration in display quality of the display was caused.

Here, since the input device 100 (the sensor device 1) according to the present embodiment uses capacitive coupling between the metal film 12 and the X electrodes 210 and between the conductor layer 50 and the Y electrodes 220, even when the conductor is arranged between the operant and the sensor device, there is no influence on detection sensitivity. In addition, when the metal film 12 is deformable under the pressing force of the operant, restriction of a thickness between the operant and the X and Y electrodes is small. Therefore, even when the sensor device 1 is arranged on a rear surface of the flexible display 11, it is possible to detect the operation position and the pressing force with high accuracy, and it is possible to suppress a display characteristic of the flexible display 11 from deteriorating.

Moreover, since restriction of a thickness of an insulator (dielectric material) provided between the operant and the X and Y electrodes is small, even when the user performs the operation while wearing, for example, an insulating glove, there is no decrease in detection sensitivity. Therefore, it can contribute to increasing user convenience.
(Modification 1)

While the above-described first embodiment has been described as an example in which the first and second electrode lines 210 and 220 are configured as the plurality of linear electrode groups 21w and 22w (refer to FIG. 10B), the configuration of the first and second electrode lines 210 and 220 is not limited to this example.

FIG. 37A is a plan view illustrating a modification of the first electrode line 210. The first electrode line 210 includes a plurality of unit electrode bodies 210m and a plurality of connecting portions 210n that connect the plurality of unit electrode bodies 210m to each other. The unit electrode body 210m is configured as an electrode group that includes a group of a plurality of sub-electrodes (electrode elements). These sub-electrodes have a regular or irregular pattern. In the example illustrated in FIG. 37A, the unit electrode body 210m is configured as an aggregate of a plurality of linear electrode patterns that radially extend from a center portion. The connecting portion 210n extends in the Y-axis direction and connects the adjacent unit electrode bodies 210m to each other.

FIG. 21B is a plan view illustrating a modification of the second electrode line 220. The second electrode line 220 includes a plurality of unit electrode bodies 220m and a plurality of connecting portions 220n that connect the plurality of unit electrode bodies 220m to each other. The unit electrode body 220m is configured as an electrode group that includes a group of a plurality of sub-electrodes (electrode elements). These sub-electrodes have a regular or irregular pattern. In the example illustrated in FIG. 37B, the unit electrode body 220m is configured as an aggregate of a plurality of linear electrode patterns that radially extend from a center portion. The connecting portion 220n extends in the X-axis direction and connects the adjacent unit electrode bodies 220m to each other.

The first and second electrode lines 210 and 220 are arranged to cross each other and overlap the unit electrode body 210m and the unit electrode body 220m when viewed in the Z-axis direction.

Figure 22:
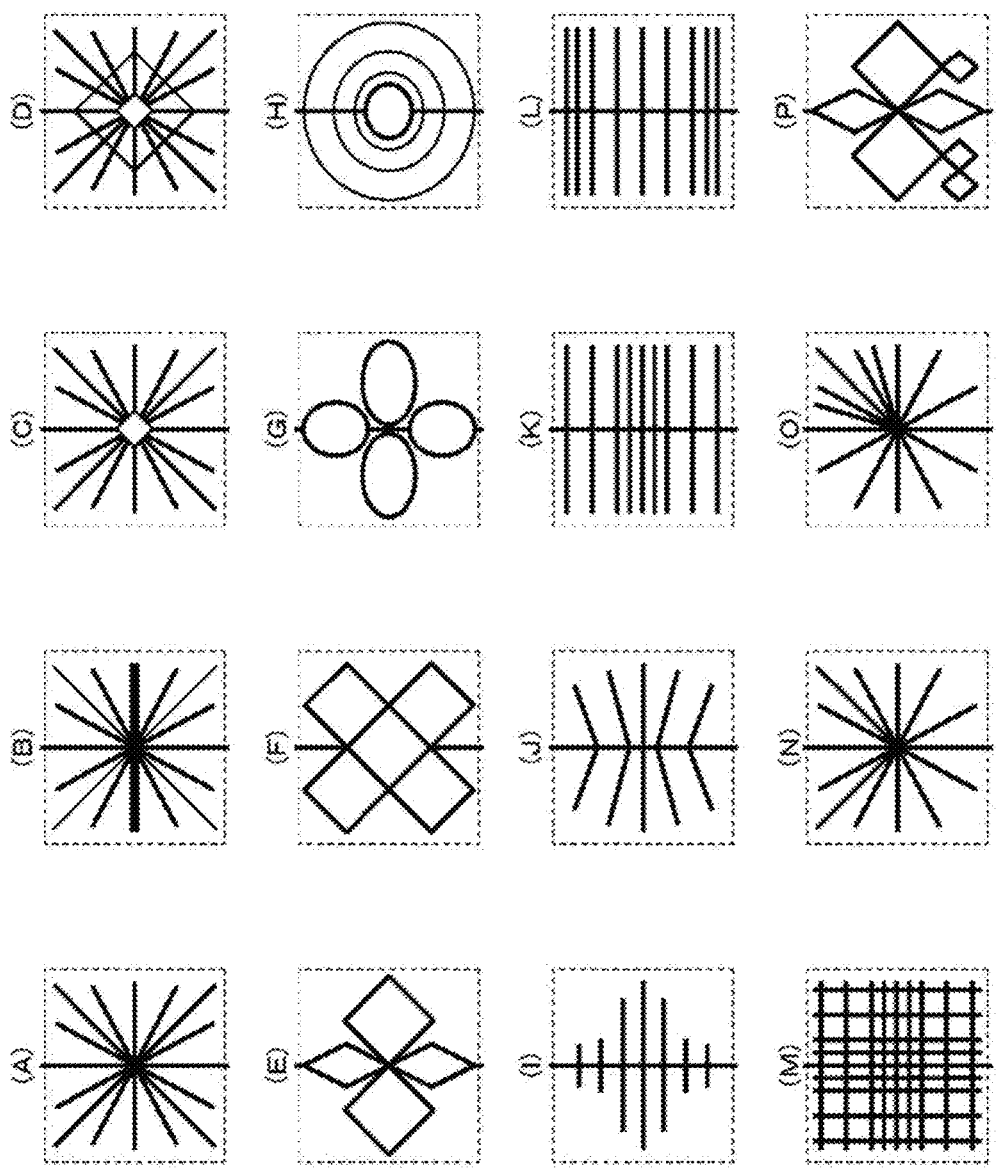
FIGS. 22(A) to 22(P) are schematic diagrams illustrating exemplary shapes of a unit electrode body.

FIGS. 22(A) to 22(P) are schematic diagrams illustrating exemplary shapes of the unit electrode bodies 210m and 220m. Also, FIGS. 22(A) to 22(P) illustrate shapes in the intersecting section between the first and second electrode lines 210 and 220. Shapes of parts other than the intersecting section are not particularly limited, and may be, for example, linear. In addition, a combination of shapes of the unit electrode bodies 210m and 220m of the first and second electrode lines 210 and 220 may be FIG. 10(B) or two sets of the same shape or different shapes among FIGS. 22(A) to 22(P).

FIG. 22(A) corresponds to the unit electrode bodies 210m and 220m of FIGS. 21A and 21B. FIG. 22(B) illustrates an example in which one of radial line electrodes exemplified in FIG. 21(A) is formed to be greater than the other line electrodes. Accordingly, an amount of change in electrostatic capacitance on the greater line electrode can be greater than that on the other line electrodes. Moreover, FIGS. 22(C) and 22(D) illustrate examples in which a circular line electrode is arranged at substantially the center, and line electrodes are radially formed therefrom. Accordingly, concentration of the line electrodes at a center portion can be suppressed and generation of a region in which sensitivity decreases can be prevented.

FIGS. 22(E) to 22(H) illustrate examples in which all of a plurality of line electrodes formed in a circular or rectangular ring shape are combined to form an aggregate. Accordingly, it is possible to adjust a density of the electrodes, and suppress the region in which sensitivity decreases from being formed. In addition, FIG. 22(I) to FIG. 22(L) illustrate examples in which all of a plurality of line electrodes arranged in the X-axis direction or the Y-axis direction are combined to form an aggregate. When a shape, a length, a pitch or the like of the line electrode is adjusted, it is possible to obtain a desired electrode density. Moreover, FIGS. 22(M) to 22(P) illustrate examples in which line electrodes are asymmetrically arranged in the X-axis direction or the Y-axis direction.
(Modification 2)

Figure 23:
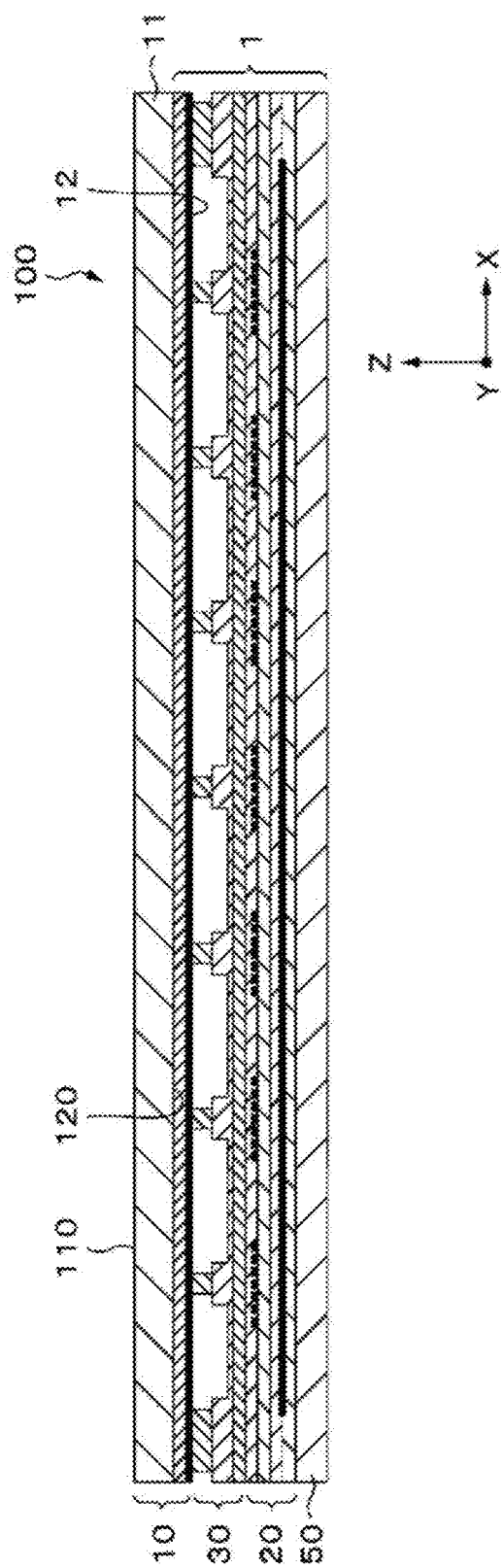
FIG. 23 is a schematic cross-sectional view illustrating a modification of the input device according to the first embodiment of the present disclosure.

FIG. 23 is a schematic cross-sectional view illustrating a modification of the input device 100 according to the first embodiment of the present disclosure. In the input device 100, the plurality of second supports 40 are not provided between the electrode substrate 20 and the conductor layer 50, but the electrode substrate 20 and the conductor layer 50 are provided adjacent to each other. Other details are the same as the above-described first embodiment. In FIG. 23, the first structural body 310 is arranged in the middle of the detection unit 20s, but may be arranged between the adjacent detection units 20s.
(Modification 3)

Figure 50:
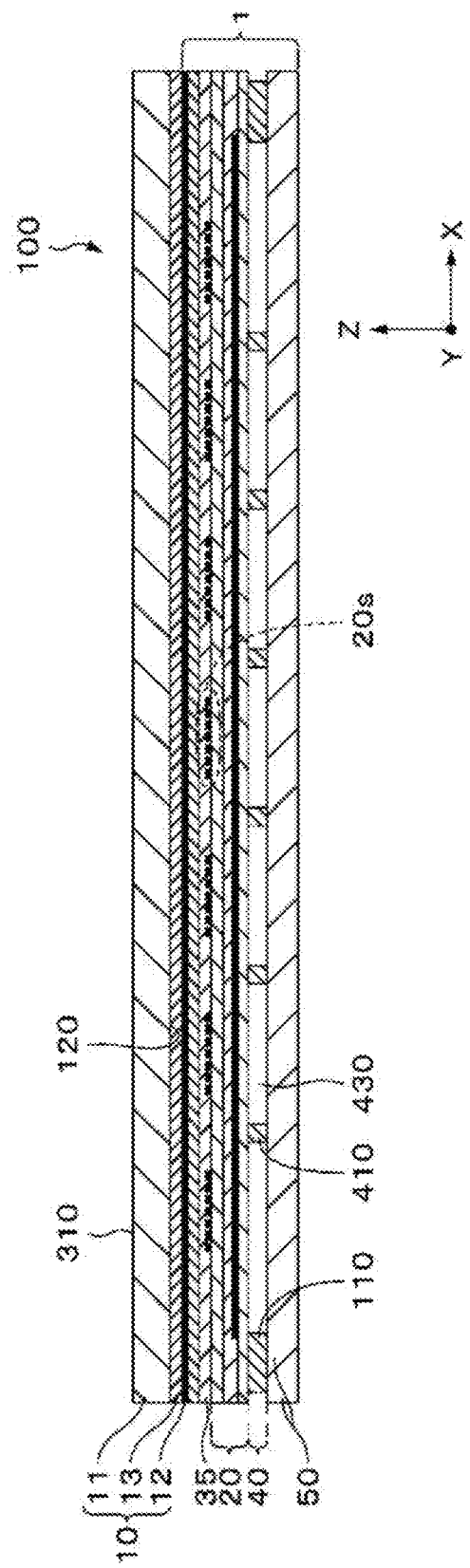
FIG. 50 is a schematic cross-sectional view illustrating a modification of the input device according to the first embodiment of the present disclosure.

FIG. 50 is a schematic cross-sectional view illustrating a modification of the input device 100 according to the first embodiment of the present disclosure. In the input device 100, the plurality of first supports 30 are not provided between the electrode substrate 20 and the metal film 12, but the electrode substrate 20 and the metal film 12 are provided adjacent to each other. Other details are the same as the above-described first embodiment. In FIG. 50, the second structural body 410 is arranged in the adjacent detection units 20s, but may be arranged in the middle of the adjacent detection unit 20s.

(Modification 4)

Interlayer arrangement positions (an arrangement position between the metal film 12 and the electrode substrate 20 and an arrangement position between the conductor layer 50 and the electrode substrate 20) of the first and second structural bodies 310 and 410 in the first embodiment may be interchanged. Hereinafter, the input device 100 having such an interchanged configuration will be described.

FIG. 45A is a schematic cross-sectional view illustrating a modification of the input device 100 according to the first embodiment of the present disclosure. The first structural body 310a is the same as the second structural body 410 in the first embodiment (that is, an arrangement position in the planar direction, a configuration, a material, a forming method and the like) except that the second structural body 410 in the first embodiment is provided between the metal film 12 and the electrode substrate 20. The second structural body 410a is the same as the first structural body 310 in the first embodiment (that is, an arrangement position in the planar direction, a configuration, a material, a forming method and the like) except that the first structural body 310 in the first embodiment is provided between the conductor layer 50 and the electrode substrate 20. In the input device 100 having such a configuration, the detection unit 20s may be arranged to face a group including the second structural body 410a or the second structural body 410 in the Z-axis direction.

FIG. 45B is a schematic main part cross-sectional view illustrating an aspect of the input device 100 when the first surface 110 receives an operation from the finger f. In FIG. 45B, the operation member 10 (the metal film 12) directly below the operation position receives the greatest force, and the operation member 10 (the metal film 12) directly below the operation position or in the vicinity thereof is deformed toward the electrode substrate 20, and becomes closer to or comes in contact with the electrode substrate 20. In addition, according to the deformation of the operation member 10, a force is applied to a portion corresponding to a gap between the unit detection regions $20r_i$ and $20r_{i+1}$ and a gap between the unit detection regions $20r_{i+1}$ and $20r_{i+2}$ within the electrode substrate 20 through the first structural bodies $310a_i$ and $310a_{i+1}$. The portion is deformed toward the conductor layer 50, and becomes closer to the conductor layer 50.

The density of the sub-electrode intersecting points is preferably higher at the position or the region facing the second structural body 410 or the group of the second structural bodies 410 than at the position or the region facing the first structural body 310. Accordingly, it is possible to reduce the sizes of the two peaks occurring in the capacity change rate distribution more than when the density of sub-electrode intersecting points is constant. Here, "the position or the region facing the group of the second structural bodies 410" means "a position or a region facing the circumference (outer circumference) of a polygon that has a plurality of second structural bodies 410 forming a group as vertexes." As the shape of the polygon, for example, a square or a rectangle can be exemplified, but embodiments of the present disclosure are not limited thereto.

The sub-electrode intersecting point is preferably not provided in a position or a region facing the first structural body 310. Accordingly, it is possible to reduce the sizes of the two peaks occurring in the capacitance change rate distribution more than when the sub-electrode intersecting point is provided in a position or a region facing the first structural body 310.

The sub-electrode intersecting point is preferably provided in a region facing the second structural body 410 or the group of the second structural bodies 410, or inside the region.

(Modification 5)

While the first embodiment has been described as an example in which the input device 100 has a planar shape, the shape of the input device 100 is not limited thereto. The input device 100 may have, for example, a cylindrical shape, a curved shape, a belt shape, or an irregular shape. As the curved shape, a curved surface having a cross section that has, for example, an arc shape, an elliptical arc shape, or a parabolic shape is exemplified. In addition, the entire input device 100 may have rigidity or flexibility. When the entire input device 100 has flexibility, the input device 100 may also be a wearable device.

FIG. 51A is a perspective view illustrating an exemplary shape of the input device 100 having a cylindrical shape. FIG. 51B is a cross-sectional view taken along the line A-A of FIG. 51A. Also, in FIG. 51B, in order to facilitate understanding of a layer configuration of the input device 100, the thickness of the input device 100 is shown to be greater than that of FIG. 51A. The flexible display 11 is provided at an outer circumferential surface side of the input device 100, and the conductor layer 50 is provided at an inner circumferential surface side. Therefore, the outer circumferential surface side of the input device 100 functions as an input operation surface and a display surface. The input device 100 may be fitted to a columnar support 100j or a part of human body such as a wrist when used. In addition, the input device 100 having a belt shape may be wound on the columnar support 100j or a part of human body such as a wrist when used.

FIG. 52A is a perspective view illustrating an exemplary shape of the input device 100 having a curved shape. FIG. 52B is a cross-sectional view taken along the line A-A of FIG. 52A. Also, in FIG. 52B, in order to facilitate understanding of a layer configuration of the input device 100, the thickness of the input device 100 is shown to be greater than that of FIG. 52A. FIG. 52B illustrates an example in which, when the flexible display 11 is provided at a convex curved surface side and the conductor layer 50 is provided at a concave curved surface side, the convex curved surface side functions as an input operation surface and a display surface. Also, unlike this example, when the flexible display 11 is provided at the concave curved surface side and the conductor layer 50 is provided at the convex curved surface side, the concave curved surface side may function as an input operation surface and a display surface. The input device 100 may be fitted to a support 100k having a convex curved surface or a part of human body such as a wrist when used. In addition, the input device 100 having a belt shape may be put along the support 100k having a convex curved surface or a part of human body such as a wrist when used.

2 Second Embodiment

Figure 24:
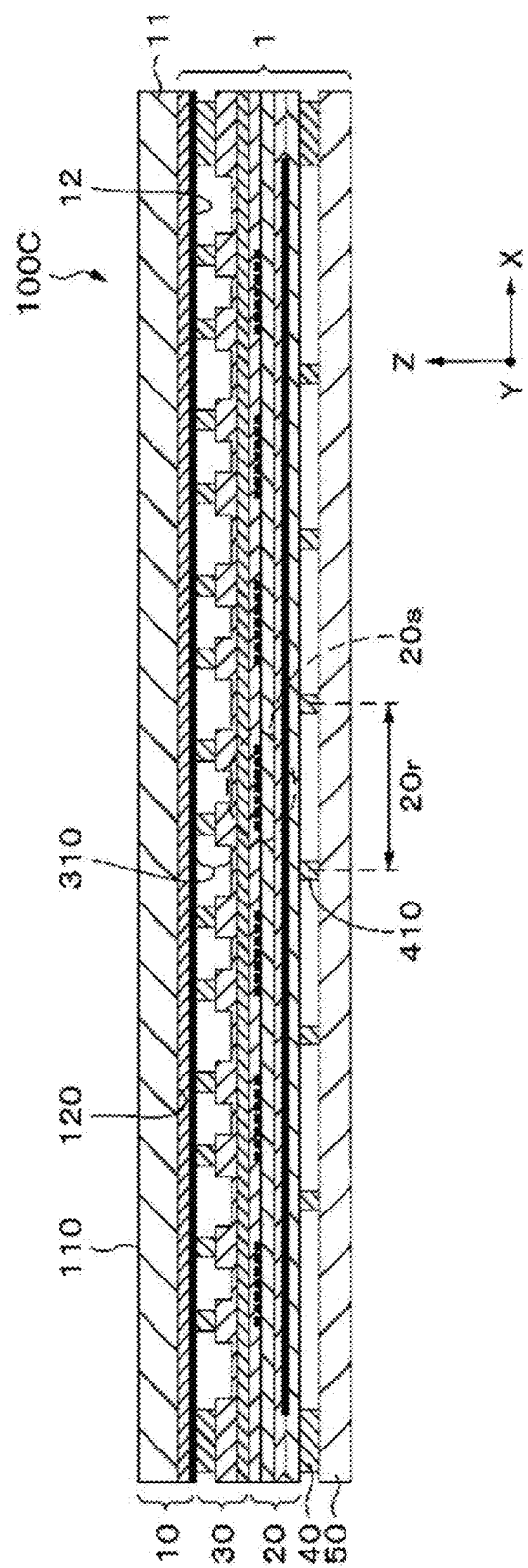
FIG. 24 is a schematic cross-sectional view illustrating one exemplary configuration of an input device according to a second embodiment of the present disclosure.

FIG. 24 is a schematic cross-sectional view illustrating one exemplary configuration of an input device according to a second embodiment of the present disclosure. An input device 100C according to the second embodiment is different from the input device 100 according to the first embodiment in that two or more first structural bodies 310 are included in the unit detection region 20r.

Here, when the first structural body 310 is arranged on the outer circumference of the unit detection region 20r, a part of the single first structural body 310 inside the focusing unit detection region 20r with respect to the outer circumference as a boundary is counted as the number of first structural bodies 310. Specifically, for example, when the first structural bodies 310 are arranged to be divided into two on a side of the unit detection region 20r, the number of first structural bodies 310 is defined as "½." In addition, when the first structural body 310 is arranged in a vertex (corner) of the unit detection region 20r having a square shape or a rectangular shape, the number of first structural bodies 310 is defined as "¼."

Thus, since the input device 100 includes two or more first structural bodies in the unit detection region, it is possible to suppress occurrence of two peaks in the capacitance change rate distribution (see FIG. 19B) and to increase accuracy of coordinate calculation of the input device 100.

Here, a reason for which the above-described two peaks occur will be described below with reference to FIGS. 44A and 44B. As illustrated in FIG. 44A, when the position P1 corresponding to the center of the unit detection region $20r_{i+1}$ within the first surface 110 is pressed by the operant h, the metal film 12 and the electrode substrate 20 are deformed in substantially the same shape. Accordingly, even when pressed, a distance between the metal film 12 and the electrode substrate 20 is substantially constant. On the other hand, as illustrated in FIG. 44B, when the position P2 in the vicinity between the unit detection regions $20r_{i+1}$ and $20r_{i+2}$ within the first surface 110 is pressed by the operant h, only the metal film 12 in the vicinity of the pressed position P2 is greatly deformed. Accordingly, when pressed, only a distance between the metal film 12 and the electrode substrate 20 in the vicinity of the pressed position P2 is greatly changed. As a result, in the capacitance change rate distribution, as described above, one peak occurs at both sides of the center position C, of the detection unit 20s, (refer to FIG. 19B).

Next, the reason for which it is possible to suppress the occurrence of the two peaks by including two or more first structural bodies 310 in the unit detection region 20r will be described with reference to FIGS. 26A and 26B. As illustrated in FIG. 26A, when the position P1 corresponding to the center of the unit detection region $20r_{i+1}$ within the first surface 110 is pressed by the operant h, the metal film 12 and the electrode substrate 20 are deformed in substantially the same shape. Accordingly, even when pressed, a distance between the metal film 12 and the electrode substrate 20 is substantially constant. On the other hand, as illustrated in FIG. 26B, when the position P2 in the vicinity between the unit detection regions $20r_{i+1}$ and $20r_{i+2}$ within the first surface 110 is pressed by the operant h, the metal film 12 in the vicinity of the pressed position P2 is deformed only slightly downward. Accordingly, even when pressed, a great amount of change in only a distance between the metal film 12 and the electrode substrate 20 in the vicinity of the pressed position P2 is suppressed. This is because deformation of the metal film 12 in the vicinity of the pressed position P2 is suppressed due to an influence of the two or more first structural bodies $310_{i+1}$ arranged in the unit detection regions $20r_{i+1}$ and $20r_{i+2}$. A great amount of change in a local distance is suppressed in this manner. As a result, an ideal capacitance change rate distribution in which the rate monotonically decreases from the center of the unit detection region 20r is obtained (refer to FIG. 19A).
(Arrangement Example of First and Second Structural Bodies)

FIGS. 46A and 46B are schematic plan views illustrating arrangement examples of the first and second structural bodies 310 and 410, the first electrode line (Y electrode) 210 and the second electrode line (X electrode) 220. The two or more first structural bodies 310 are included in the unit detection region 20r. Accordingly, it is possible to increase accuracy of coordinate calculation of the input device 100. In addition, it is possible to increase weighted sensitivity of the input device 100.

In the present disclosure, the description that "the first structural body 310 is included" is not limited to a case in which the entire first structural body 310 is included but also includes partial inclusion of the first structural body 310. For example, when the first structural body 310 is arranged on the outer circumference (circumference) of the unit detection region 20r, a part (for example, halves or quarters) of the single first structural body 310 arranged on the outer circumference inside the focusing unit detection region 20r with respect to the outer circumference as a boundary is counted as the number of first structural bodies 310. Also, descriptions such as "including the first structural body 310" are used with the same meaning.

As a positional relation among an outer circumference Cr of the unit detection region 20r, an outer circumference Cs of the detection unit (intersecting section) 20s, and an arrangement position of the first structural body 310 included in the unit detection region 20r, for example, the following positional relations (a) and (b) are exemplified. The positional relation (b) is preferable from the viewpoint of increasing characteristics such as a capacitance change rate. However, these positional relations refer to a positional relation when the input device 100 is viewed in the Z-axis direction (that is, a direction perpendicular to the first surface 110).

(a) The outer circumference Cs of the detection unit 20s is inside the outer circumference Cr of the unit detection region 20r and the first structural body 310 is arranged inside the outer circumference Cs of the detection unit 20s (refer to FIG. 46A).

(b) The outer circumference Cs of the detection unit 20s is inside the outer circumference Cr of the unit detection region 20r, and the first structural body 310 is arranged between the outer circumference Cs of the detection unit 20s and the outer circumference Cr of the unit detection region 20r (refer to FIG. 46B).

The first and second structural bodies 310 and 410 are preferably arranged symmetrically (in linear symmetry with respect to lines parallel to two arrangement directions of the unit detection region 20r that pass the center of the unit detection region 20r) with respect to the center of the unit detection region 20r. However, configurations such as the plurality of first structural bodies 310, the plurality of second structural bodies 410, the plurality of first electrode elements 21z, and the plurality of second electrode elements 22z inside the unit detection region 20r in the outermost circumference or in the vicinity of the outermost circumference of the detection unit 20s may be asymmetrical with respect to the center of the unit detection region 20r.

Hereinafter, symmetrical arrangement position examples of the first and second structural bodies 310 and 410 at the center of the unit detection region 20r will be described with reference to FIGS. 27A to 27B.
(First Arrangement Example)

FIG. 27A is a plan view illustrating a first example of a symmetrical arrangement. The first example is a symmetrical arrangement example in which a total of two of the first structural bodies 310 are included in the unit detection region 20r, and a total of one of the second structural bodies 410 is included in the unit detection region 20r.

The second structural body 410 is arranged at a position of each vertex (each grid point) of a tetragonal unit cell (tetragonal grid) Uc having a rectangular shape whose side in the X-axis direction has a length Lx and whose side in the Y-axis direction has a length Ly, which is equal to the length Lx. That is, the second structural body 410 is arranged in the X-axis direction at an arrangement pitch (period) of the length Lx and arranged in the Y-axis direction at an arrangement pitch (period) of the length Ly (=Lx). Here, the unit cell Uc is virtually set in order to describe the arrangement of the first structural body 310 and the second structural body 410.

A region of the unit cell Uc matches the unit detection region 20r. In addition, the center position of the unit detection region 20r matches a center position of the intersecting section between the Y electrode 210 and the X electrode 220. Here, an example in which the unit cell Uc is a tetragonal grid is described, but the unit cell Uc is not limited to this example. For example, a tetragonal grid, a rhombic grid, a diamond grid, a rectangular grid, an isosceles triangular grid, an oblong grid, a hexagonal grid or an equilateral triangular grid may be used.

The unit cell Uc includes (¼) units of the second structural body 410 arranged in respective vertices. In addition, the region of the unit cell Uc matches the unit detection region 20r, and thus a total of one unit (=(¼) [units]×4) of the second structural body 410 is included in the one unit detection region 20r.

The first structural body 310 is arranged at a midpoint of each side of the unit cell Uc. In a diagonal direction of the unit cell Uc, a distance (an arrangement pitch) between the first structural bodies 310 is (½)×√(Lx²+Ly²) refers to the square root of (Lx²+Ly²).

The unit cell Uc includes (½) units of the first structural body 310 arranged at a midpoint of each side. In addition, the region of the unit cell Uc matches the unit detection region 20r, and thus a total of 2 units (=(½) [units]×4) of the first structural body 310 are included in the one unit detection region 20r.

(Second Arrangement Example)

FIG. 27B is a plan view illustrating the second example of the symmetrical arrangement. The second example is a symmetrical arrangement example in which a total of three of the first structural bodies 310 are included in the unit detection region 20r and a total of one of the second structural bodies 410 is included in the unit detection region 20r. The second example is different from the first example in that the one first structural body 310 is further arranged at a center of the unit cell Uc.

The unit cell Uc includes (½) units of the first structural body 310 arranged at a midpoint of each side, and includes the one first structural body 310 arranged at the center. In addition, the region of the unit cell Uc matches the unit detection region 20r, and thus a total of 3 units (=(½) [units]×4+1 [unit]) of the first structural bodies 310 are included in the one unit detection region 20r.

(Third Arrangement Example)

FIG. 28A is a plan view illustrating a third example of a symmetrical arrangement. The third example is a symmetrical arrangement example in which a total of four of the first structural bodies 310 are included in the unit detection region 20r, and a total of one of the second structural bodies 410 is included in the unit detection region 20r. Since the arrangement of the second structural bodies 410 is the same as the first example of the symmetrical arrangement, explanation is omitted.

The first structural bodies 310 are arranged one by one at a position between the center position of the unit cell Uc and each vertex. Here, the position between the center position of the unit cell Uc and each vertex is, for example, a midpoint between the center position of the unit cell Uc and each vertex. A distance (an arrangement pitch) between the first structural bodies 310 in the X-axis direction is Lx/2, and a distance (an arrangement pitch) between the first structural bodies 310 in the Y-axis direction is Ly/2.

(Fourth Arrangement Example)

FIG. 28B is a plan view illustrating the fourth example of the symmetrical arrangement. The fourth example is a symmetrical arrangement example in which a total of four of the first structural bodies 310 are included in the unit detection region 20r and a total of one of the second structural bodies 410 is included in the unit detection region 20r. The fourth example is different from the second example in that the first structural bodies 310 are further arranged at a position of each vertex (each grid point) of the unit cell Uc.

The unit cell Uc includes (¼) units of the first structural body 310 arranged in each vertex and (½) units of the first structural body 310 arranged at a midpoint of each side, and also includes the one first structural body 310 arranged at the center. In addition, the region of the unit cell Uc matches the unit detection region 20r, and thus a total of 4 units (=(¼) [units]×4+(½) [units]×4+1 [unit]) of the first structural body 310 are included in the one unit detection region 20r.

(Fifth Arrangement Example)

FIG. 29A is a plan view illustrating a fifth example of a symmetrical arrangement. The fifth example is a symmetrical arrangement example in which a total of four of the first structural bodies 310 are included in the unit detection region 20r, and a total of one of the second structural bodies 410 is included in the unit detection region 20r. Since the arrangement of the second structural bodies 410 is the same as the first example of the symmetrical arrangement, explanation is omitted.

The first structural bodies 310 are arranged one by one at a position between the center position of the unit cell Uc and a midpoint of each side. Here, the position between the center position of the unit cell Uc and a midpoint of each side is, for example, a midpoint between the center position of the unit cell Uc and a midpoint of each side. A distance (an arrangement pitch) between the first structural bodies 310 in the X-axis direction is Lx/2, and a distance (an arrangement pitch) between the first structural bodies 310 in the Y-axis direction is Ly/2.

(Second Arrangement Example)

FIG. 29B is a plan view illustrating the sixth example of the symmetrical arrangement. The sixth example is a symmetrical arrangement example in which a total of five of the first structural bodies 310 are included in the unit detection region 20r and a total of one of the second structural bodies 410 is included in the unit detection region 20r. The sixth example is different from the third example in that the one first structural body 310 is further arranged at a center of the unit cell Uc.

When the number and the arrangement (pitch) of the first and second structural bodies 310 and 410 are adjusted, it is possible to adjust an amount of change in a distance of each of the metal film 12 and the conductor layer 50 from the detection unit 20s with respect to the pressing force such that a desired operation feeling or detection sensitivity is obtained. Deformation of the operation member 10 decreases by a square of a distance between the adjacent first structural bodies 310. When the four first structural bodies 310 are arranged in the unit detection region 20r, deformation of the operation member 10 is ¼.

2. Second Embodiment

Figure 53:
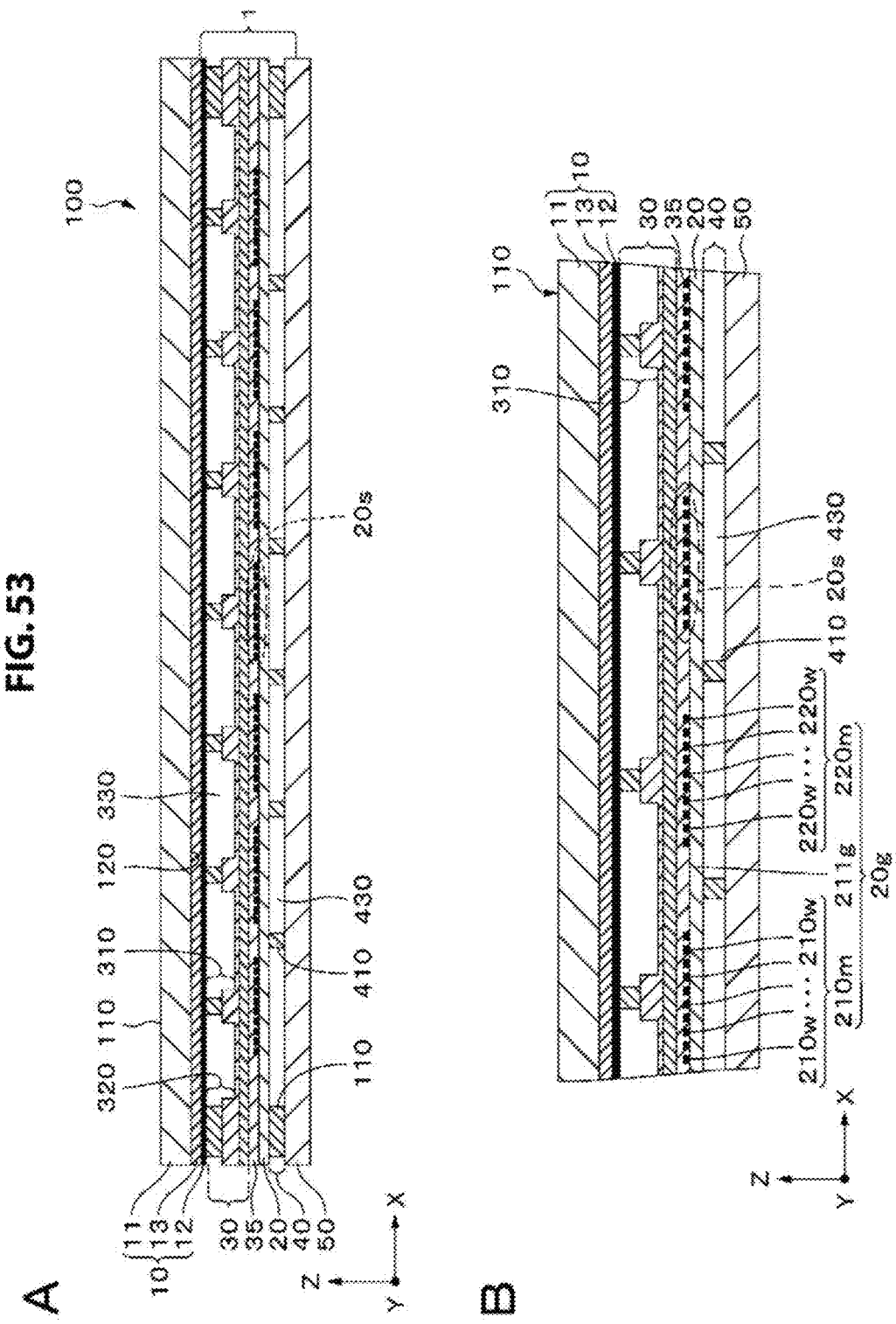
FIG. 53A is a cross-sectional view illustrating an exemplary configuration of an input device according to a second embodiment of the present disclosure.
FIG. 53B is a cross-sectional view illustrating an enlarged part of FIG. 53A.

FIG. 53A is a cross-sectional view illustrating an exemplary configuration of the input device 100 according to the third embodiment of the present disclosure. FIG. 53B is a cross-sectional view illustrating an enlarged part of FIG. 53A. The third embodiment is different from the first embodiment in that the electrode substrate 20 includes a wiring substrate 20g. The wiring substrate 20g includes a base material 211g, and a plurality of first electrode lines (Y electrodes) 210s and a plurality of second electrode lines (X electrodes) 220s, which are provided on the same principal surface of the base material 211g.

Here, an exemplary configuration of the first electrode line 210s and the second electrode line 220s will be described with reference to FIGS. 54A and 54B. As illustrated in FIG. 54A, the first electrode line 210s includes an electrode line portion 210p, the plurality of unit electrode bodies 210m, and a plurality of connecting portions 210z. The electrode line portion 210p extends in the Y-axis direction. The plurality of unit electrode bodies 210m are arranged in the Y-axis direction at constant intervals. The electrode line portion 210p and the unit electrode body 210m are arranged with a predetermined interval therebetween, and are connected by the connecting portion 210z. Alternatively, a configuration in which no connecting portion 210z is provided and the unit electrode body 210m is directly provided in the electrode line portion 210p may be used.

The unit electrode body 210m has a comb shape as a whole. Specifically, the unit electrode body 210m includes a plurality of sub-electrodes 210w and a coupling unit 210v. The plurality of sub-electrodes 210w extend in the Y-axis direction. The adjacent sub-electrodes 210w are provided with a predetermined interval therebetween. One end of the plurality of sub-electrodes 210w is connected to the coupling unit 210v that extends in the X-axis direction.

As illustrated in FIG. 54B, the second electrode line 220s includes an electrode line portion 220p, the plurality of unit electrode bodies 220m, and a plurality of connecting portions 220z. The electrode line portion 220p extends in the X-axis direction. The plurality of unit electrode bodies 220m are arranged in the X-axis direction at constant intervals. The electrode line portion 220p and the unit electrode body 220m are arranged with a predetermined interval therebetween, and are connected by the connecting portion 220z.

The unit electrode body 220m has a comb shape as a whole. Specifically, the unit electrode body 220m includes a plurality of sub-electrodes 220w and a coupling unit 220v. The plurality of sub-electrodes 210w extend in the Y-axis direction. The adjacent sub-electrodes 220w are provided with a predetermined interval therebetween. One end of the plurality of sub-electrodes 220w is connected to the coupling unit 220v that extends in the X-axis direction.

As illustrated in FIG. 55A, the unit electrode bodies 210m and 220m having a comb shape are arranged to face each other such that the sub-electrodes 210w and 220w corresponding to these comb parts are engaged. The plurality of sub-electrodes 210w of the unit electrode body 210m and the plurality of sub-electrodes 220w of the unit electrode body 220m are alternately arranged in the X-axis direction. The sub-electrodes 210w and 220w are provided with a predetermined interval therebetween.

As illustrated in FIG. 55B, an insulating layer 210r is provided on the electrode line portion 220p of the second electrode line 220s. Therefore, a jumper wire 210q is provided to jump the insulating layer 210r. The electrode line portion 210p is connected by the jumper wire 210q.
(Modification)

Figure 56:
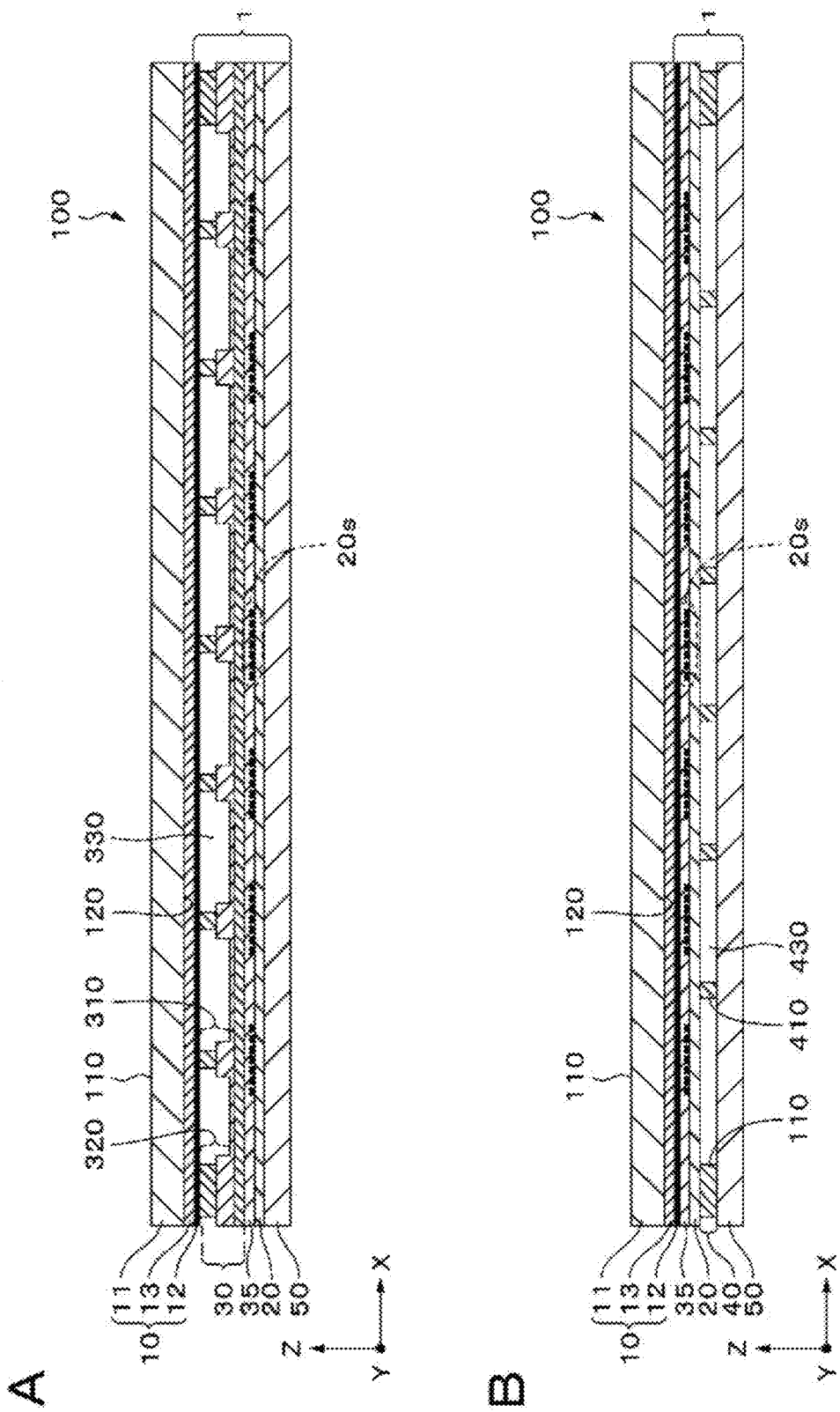
FIG. 56A is a cross-sectional view illustrating a first example of a configuration of an input device according to a modification of the second embodiment of the present disclosure.
FIG. 56B is a cross-sectional view illustrating a second example of the configuration of the input device according to the modification of the second embodiment of the present disclosure.

In the above-described third embodiment, the example in which the second support 40 is provided between the electrode substrate 20 and the conductor layer 50 has been described (see FIGS. 53A and 53B). As illustrated in FIG. 56A, however, the second support 40 may be omitted and the electrode substrate 20 and the conductor layer 50 may be adjacent. In FIG. 56A, the first structural body 310 is disposed in the middle of the detection unit 20s, but may be disposed in a middle point of the adjacent detection units 20s.

In the above-described third embodiment, the example in which the first support 30 is provided between the metal film 12 and the electrode substrate 20 has been described (see FIGS. 53A and 53B). As illustrated in FIG. 56B, however, the first support 30 may be omitted and the metal film 12 and the electrode substrate 20 may be adjacent. In FIG. 56B, the second structural body 410 is disposed in a middle point of the adjacent detection units 20s, but may be disposed in the middle of the detection unit 20s.

4. Fourth Embodiment

The fourth embodiment is the same as Modification 1 of the first embodiment except that a unit electrode body of one of the first electrode line 210 and the second electrode line 220 is configured as a sub-electrode, and the other unit electrode body is configured as a planar electrode in the input device 100 according to the fourth embodiment of the present disclosure.
(First Exemplary Configuration)

As illustrated in FIG. 57A, the unit electrode body 210m of the first electrode line 210 is configured as the plurality of sub-electrodes 210w. On the other hand, as illustrated in FIG. 57B, the unit electrode body 220m of the second electrode line 220 is configured as a planar electrode.

Figure 59:
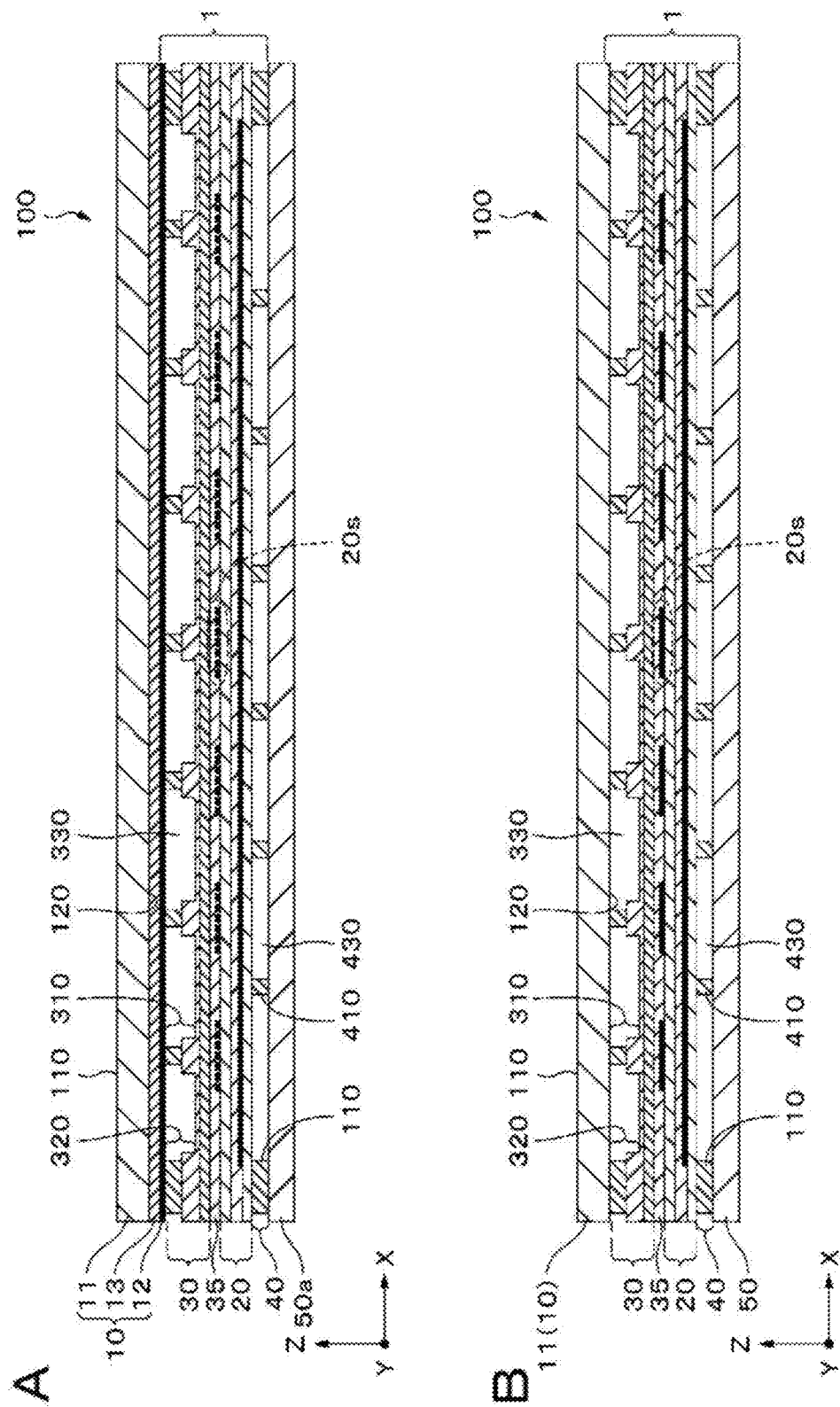
FIG. 59A is a cross-sectional view illustrating a first example of a configuration of an input device according to a third embodiment of the present disclosure.
FIG. 59B is a cross-sectional view illustrating a second example of the configuration of the input device according to the third embodiment of the present disclosure.

When the first exemplary configuration is used as the configuration of the first and second electrode lines 210 and 220, as illustrated in FIG. 59A, the conductor layer 50 (refer to FIG. 1) facing the second electrode line 220 through the second support 40 is omitted. Alternatively, a polymer resin layer 50a may be used in place of the conductor layer 50. The conductor layer 50 can be omitted in this manner so that the planar electrode (the unit electrode body 220m) included in the second electrode line 220 has an effect of shielding external noise (external electric field). On the other hand, when the conductor layer 50 is used in combination therewith, it is possible to provide a strong shielding effect and the detection unit 20s can be stable against external noise.
(Second Exemplary Configuration)

As illustrated in FIG. 58A, the unit electrode body 210m of the first electrode line 210 is configured as a planar electrode. On the other hand, as illustrated in FIG. 58B, the unit electrode body 220m of the second electrode line 220 is configured as the plurality of sub-electrodes 220w.

When the second exemplary configuration is used as the configuration of the first and second electrode lines 210 and 220, as illustrated in FIG. 59B, the metal film 12 (refer to FIG. 1) facing the first electrode line 210 through the first support 30 may be omitted. The metal film 12 can be omitted in this manner so that the planar electrode (the unit electrode body 210m) included in the first electrode line 210 has an effect of shielding external noise (external electric field). On the other hand, when the metal film 12 is used in combination therewith, it is possible to provide a strong shielding effect and the detection unit 20s can be stable against external noise.

Also, the configuration of the first and second electrode lines 210 and 220 is not limited to the above example. Both the unit electrode body 210m of the first electrode line 210 and the unit electrode body 42m of the second electrode line 220 may also be configured as the planar electrode.

(Modification 1)

Figure 60:
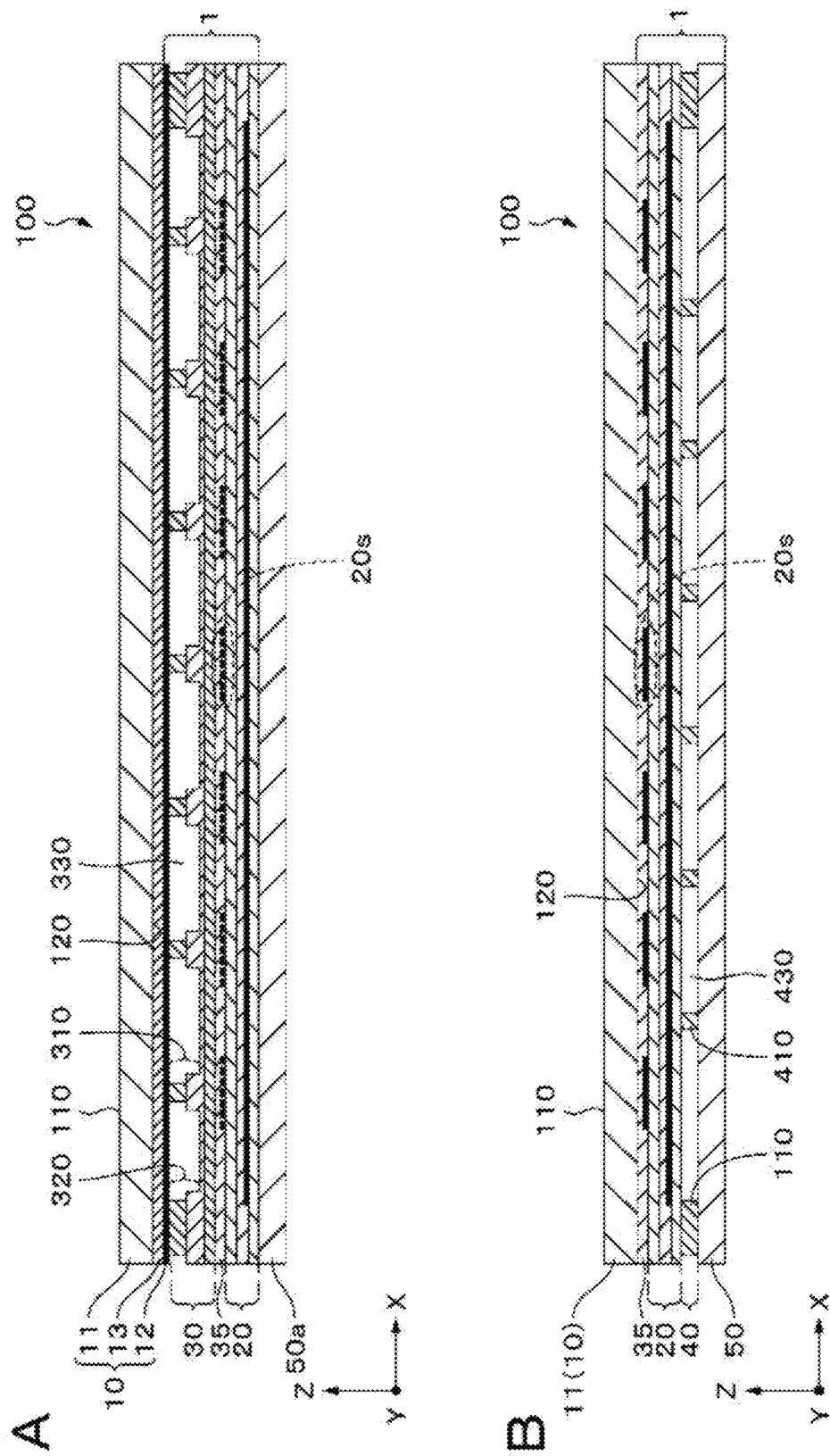
FIG. 60A is a cross-sectional view illustrating a first example of a configuration of an input device according to a modification 1 of the third embodiment of the present disclosure.
FIG. 60B is a cross-sectional view illustrating a second example of the configuration of the input device according to the modification 1 of the third embodiment of the present disclosure.

In the above-described first configuration example, the example in which the second support 40 is provided between the electrode substrate 20 and the conductor layer 50 has been described (see FIG. 59A). However, as illustrated in FIG. 60A, the second support 40 may be omitted and the electrode substrate 20 and the conductor layer 50 may be adjacent.

In the above-described second configuration example, the example in which the first support 30 is provided between the flexible display 11 and the electrode substrate 20 has been described (see FIG. 59B). However, as illustrated in FIG. 60B, the first support 30 may be omitted and the flexible display 11 and the electrode substrate 20 may be adjacent.

(Second Modification)

In the above-described fourth embodiment, one of the first electrode line 210 and the second electrode line 220 is configured as a plurality of sub-electrodes, and the other may be configured as one planar electrode.

(First Exemplary Configuration)

As illustrated in FIG. 61A, the first electrode line 210 is configured as a plurality of sub-electrodes 210w, and the second electrode line 220 is configured as a planar electrode. When such a configuration is used as the configuration of the first and second electrode lines 210 and 220, similar to the first exemplary configuration of the fourth embodiment, the conductor layer 50 (refer to FIG. 1) facing the second electrode line 220 through the second support 40 is omitted. Alternatively, the polymer resin layer 50a may be used in place of the conductor layer 50.

(Second Exemplary Configuration)

As illustrated in FIG. 61B, the first electrode line 210 is configured as a planar electrode, and the second electrode line 220 is configured as the plurality of sub-electrodes 220w. When such a configuration is used as the configuration of the first and second electrode lines 210 and 220, similar to the second exemplary configuration of the fourth embodiment, the metal film 12 (refer to FIG. 1) facing the first electrode line 210 through the first support 30 may be omitted.

Also, the configuration of the first and second electrode lines 210 and 220 is not limited to the above example. Both the first and second electrode lines 210 and 220 may be configured as one electrode having a planar shape.

5 Fifth Embodiment

Figure 30:
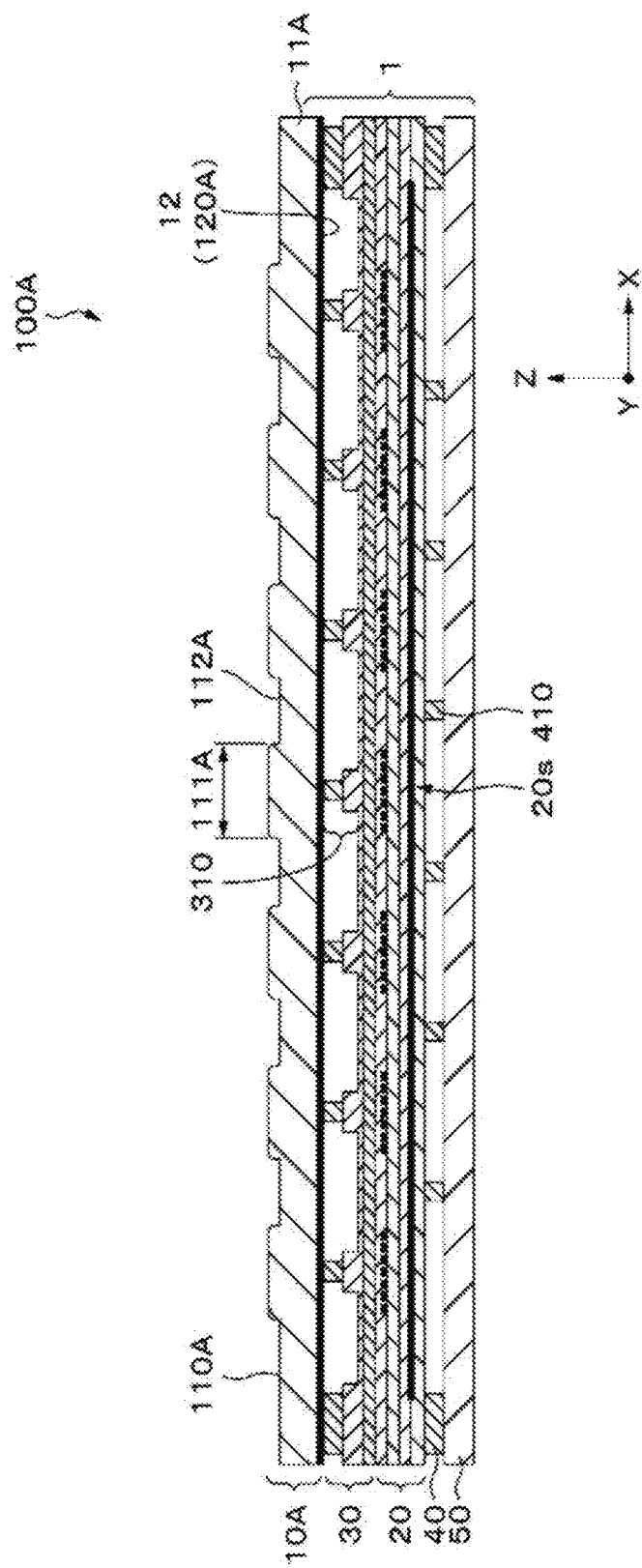
FIG. 30 is a schematic cross-sectional view illustrating one exemplary configuration of an input device according to a fifth embodiment of the present disclosure.

FIG. 30 is a schematic cross-sectional view illustrating one exemplary configuration of the input device 100A according to the fifth embodiment of the present disclosure. A configuration other than the operation member 10A of the input device 100A according to the present embodiment is similar to that of the first embodiment, and descriptions thereof will be appropriately omitted. FIG. 30 is a diagram corresponding to FIG. 1 according to the first embodiment.

(Entire Configuration)

The input device 100A according to the present embodiment includes a flexible sheet 11A in place of the flexible display and the same sensor device 1 as in the first embodiment. As will be described below, a plurality of key regions 111A are arranged in the flexible sheet 11A, and the entire input device 100A is used as a keyboard device.

(Input Device)

The flexible sheet 11A is configured as an insulating plastic sheet having flexibility, for example, polyethylene terephthalate (PET), polyethylene naphthalate (PEN), polymethylmethacrylate (PMMA), polycarbonate (PC), or polyimide (PI). A thickness of the flexible sheet 11A is not particularly limited, and is, for example, 0.1 mm to 1 mm.

Also, the flexible sheet 11A is not limited to a single layer structure, but may be configured as a lamination of sheets of two or more layers. In this case, in addition to the plastic sheet, for example, an insulating plastic sheet having flexibility such as PET, PEN, PMMA, PC, or PI may be laminated as a base material.

The flexible sheet 11A includes the first surface 110A serving as an operation surface and the second surface 120A that is a rear surface of the first surface 110A. The plurality of key regions 111A are arranged in the first surface 110A. On the other hand, the metal film 12 may be laminated on the second surface 120A.

The flexible sheet 11A and the metal film 12 may be configured as a composite sheet in which a metallic foil is attached to a surface of a resin sheet in advance, or may be configured as a vapor deposited film or a sputtering film formed on a surface of the second surface 120A. Alternatively, a coating film such as a conductive paste printed on the second surface 120A may be used.

Each of the key regions 111A corresponds to a keytop that is pressed by the user, and has a shape and a size according to a type of key. A key display may be appropriately performed on each of the key regions 111A. The key display may include either or both of display of a type of key and display of a position (outline) of an individual key. An appropriate printing method, for example, screen printing, flexographic printing, or gravure printing, may be used for display.

The first surface 110A has a form in which a groove portion 112A is formed in the periphery of the key region 111A. An appropriate processing technique such as press molding, etching or laser processing can be used to form an uneven surface corresponding to the key region 111A. Alternatively, the flexible sheet 11A having an uneven surface may be formed by a molding technique such as injection molding.

In addition, the configuration of the flexible sheet 11A is not limited to the above example. For example, FIGS. 31A and 31B are diagrams schematically illustrating modifications of the flexible sheet 11A. The flexible sheet 11Aa illustrated in FIG. 31A shows an example in which the first surface 110A is configured as a flat surface. In this case, each of the key regions (not illustrated) may be indicated by printing or the like or the surface may be used as a touch sensor with no key regions. In addition, in the flexible sheet 11Ab illustrated in FIG. 31B, respective key regions 111Ab formed by press molding the flexible sheet 11A are independently and deformably formed in a vertical direction (a sheet thickness direction).

Further, the flexible sheet 11A may be made of a material having conductivity such as a metal. Accordingly, the metal film 12 is unnecessary, and a thickness of the operation member 10A can decrease. In this case, the flexible sheet 11A also functions as the metal film 12, and is connected to, for example, a ground potential.

As illustrated in FIG. 10B, the first electrode line 210 may be configured as the electrode group 21w that includes a group of the plurality of first electrode elements 21z. The first electrode element 21z is, for example, a linear conductive member that extends in the Y-axis direction. As illustrated in FIG. 10B, the second electrode line 220 may be configured as the electrode group 22w that includes a group of the plurality of second electrode elements 22z. The second electrode element 22z is, for example, a linear conductive member that extends in the X-axis direction. When the flexible sheet 11A has no metal film 12, the plurality of first electrode lines 210 may be configured as a single electrode element (that is, one thick electrode that is not included in a group of the plurality of first electrode elements 21z). Therefore, electrical noise from the outside (external) of the flexible sheet 11A is shielded.

In the present embodiment, the user presses a middle portion of the key region 111A in order to perform a key input operation. Here, the first and second structural bodies 310 and 410 and the detection unit 20s can be arranged as follows.

(Arrangement Example 1)

For example, as illustrated in FIG. 30, the first structural body 310 of the first support 30 may be arranged below the groove portion 112A. In this case, the detection unit 20s is arranged at a position that the first structural body 310 overlaps when viewed in the Z-axis direction. The second structural body 310 is arranged between the adjacent first structural bodies 310.

In Arrangement Example 1, as described in FIG. 16, when a key input operation is performed, a position on the first space portion 330 is pressed, and the metal film 12 and the detection unit 20s become closer. Further, the first structural bodies 310 adjacent to the first space portion 330 directly below the operation position are displaced downward and the electrode substrate 20 is deflected. Therefore, the second structural body 410 is also slightly elastically deformed. Accordingly, each of the metal film 12 and the conductor layer 50 becomes closer to the detection unit 20s and it is possible to obtain a change in electrostatic capacitance of the detection unit 20s.

In addition, the shape of the first structural body 310 is not limited to the cylindrical body illustrated in FIGS. 11A and 11B, and may be arranged, for example, in a wall shape along the groove portion 112A. In this case, the respective first structural bodies 310 are arranged along a boundary between the plurality of key regions 111A.

(Arrangement Example 2)

The second structural bodies 410 may be arranged below the groove portion 112A. In this case, the first structural bodies 310 are arranged between the adjacent second structural bodies 410. For example, the detection unit 20s is arranged at a position overlapping the first structural body 310 when viewed in the Z-axis direction.

In Arrangement Example 2, when a key input operation is performed, the position on the first structural body 310 is pressed. Accordingly, as described in FIG. 15, each of the metal film 12 and the conductor layer 50 becomes closer to the detection unit 20s and it is possible to obtain a change in electrostatic capacitance of the detection unit 20s.

Also, the arrangement of the detection unit 20s is not limited to the above example. For example, the detection unit 20s may be arranged to overlap the second structural body 410.

Figure 62:
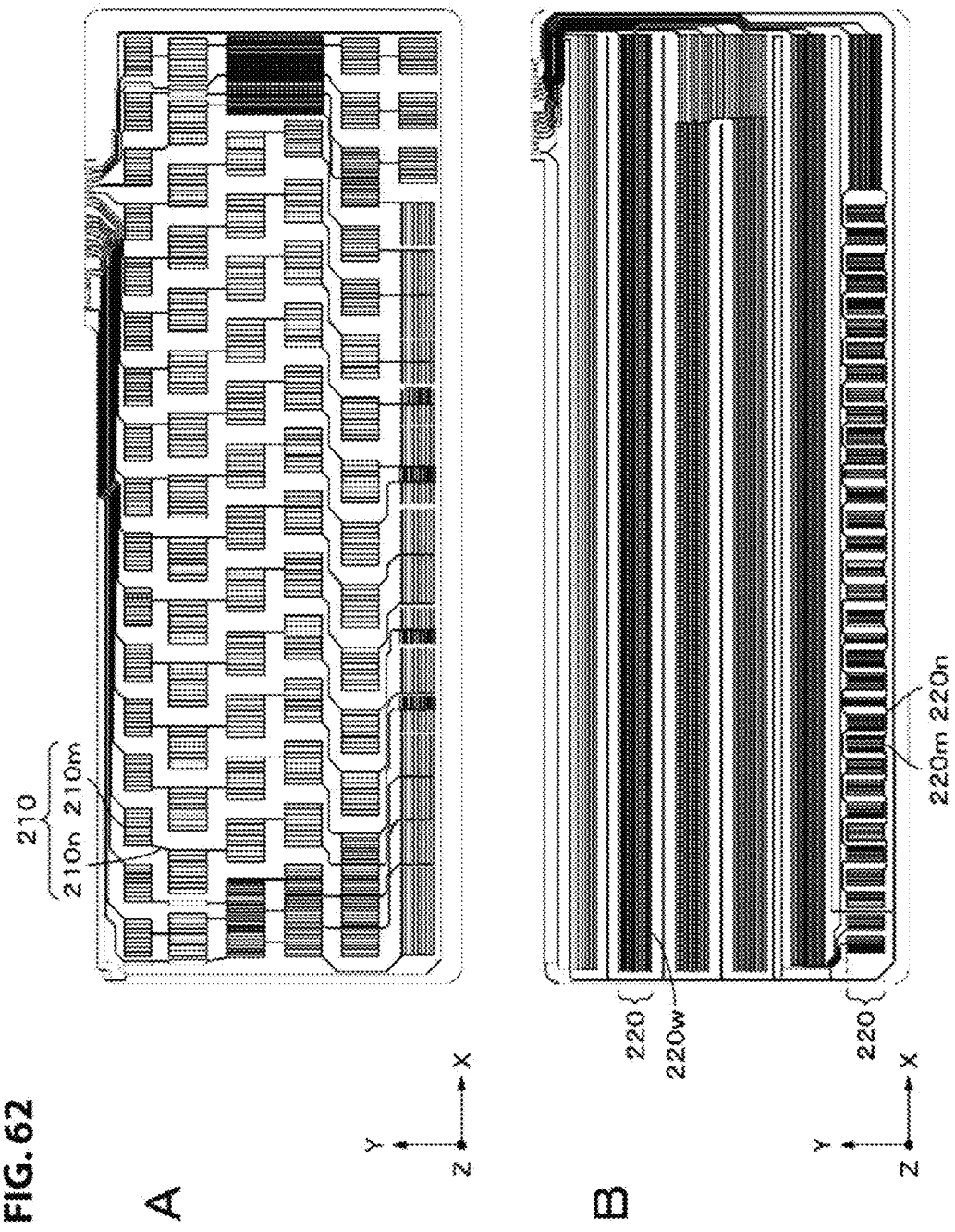
FIG. 62A is a plan view illustrating an arrangement example of first electrode lines (Y electrodes).
FIG. 62B is a plan view illustrating an arrangement example of second electrode lines (X electrodes).

FIG. 62A is a plan view illustrating an arrangement example of the first electrode lines (Y electrodes) 210. The first electrode line 210 includes the plurality of unit electrode bodies 210m and the plurality of connecting portions 210n that connect the plurality of unit electrode bodies 210m to each other. The unit electrode body 210m is configured as an electrode group that includes a group of the plurality of sub-electrodes (electrode elements) 210w. The plurality of sub-electrodes 210w have a regular or irregular pattern corresponding to the key layout. FIG. 62A illustrates an example in which the plurality of sub-electrodes 210w have an irregular pattern corresponding to the key layout. In this example, specifically, the plurality of sub-electrodes 210w are linear conductive members that extend in the Y-axis direction, and these conductive members are arranged in a stripe shape.

FIG. 62B is a plan view illustrating an arrangement example of the second electrode lines (X electrodes) 220. The second electrode line (X electrode) 220 is an elongated rectangular electrode that extends in the X-axis direction and has a substantially constant width. The rectangular electrode is configured as an electrode group that includes a group of the plurality of sub-electrodes (electrode elements) 220w. The sub-electrode 220w is, for example, a linear conductive member that extends in the X-axis direction.

In addition, as illustrated in FIG. 62B, some of the plurality of second electrode lines (X electrode) 220 may include the plurality of unit electrode bodies 220m and the plurality of connecting portions 220n that connect the plurality of unit electrode bodies 220m to each other.

Here, while the example in which the first electrode line (Y electrode) 210 is provided at a side (upper side) of the metal film 12 and the second electrode line (X electrode) 220 is provided at a side (lower side) of the conductor layer 50 has been described, the second electrode line 220 may be provided at a side (upper side) of the metal film 12 and the first electrode line 210 may be provided at a side of the conductor layer 50.

Figure 63:
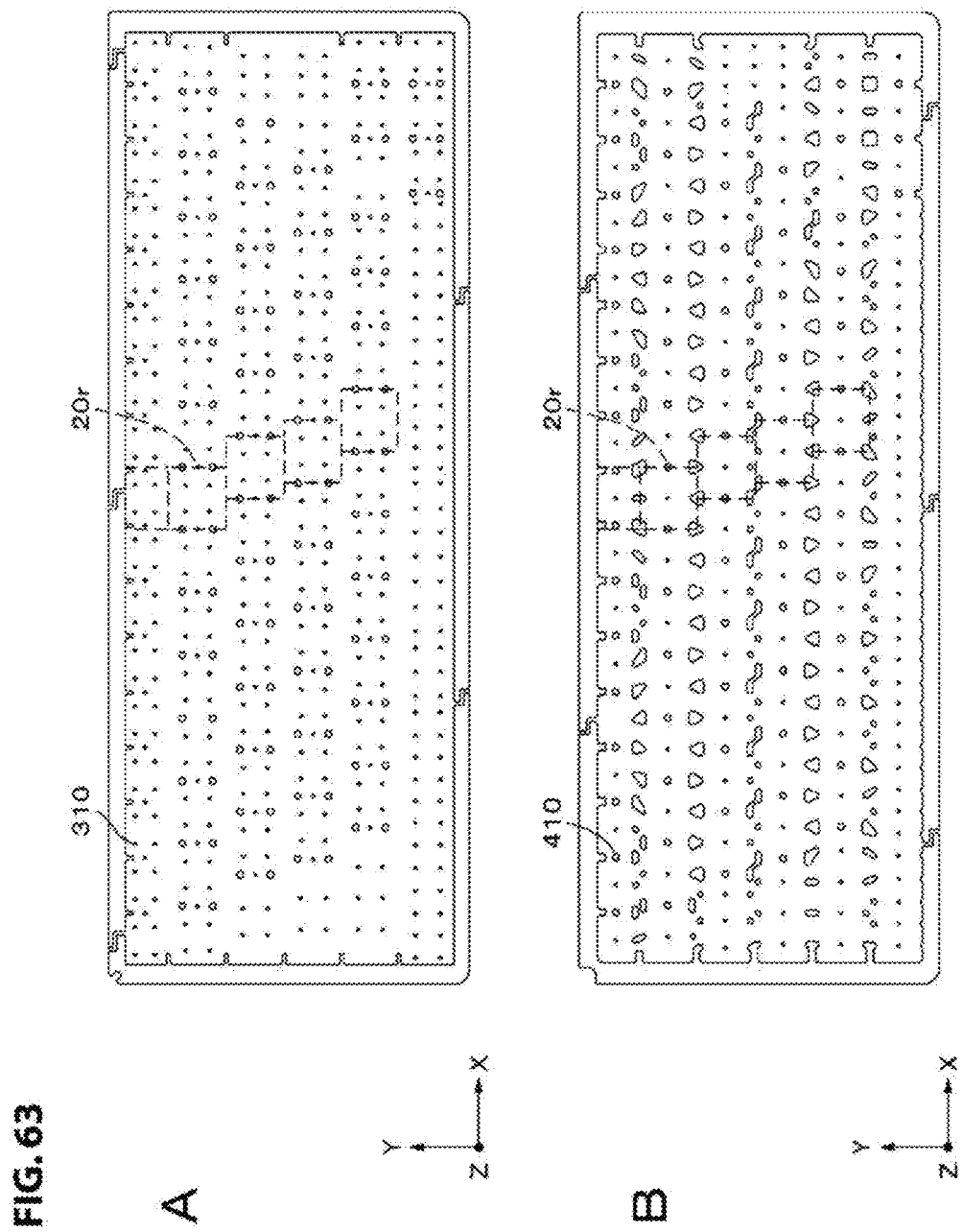
FIG. 63A is a plan view illustrating an arrangement example of first structural bodies.
FIG. 63B is a plan view illustrating an arrangement example of second structural bodies.

FIG. 63A is a plan view illustrating an arrangement example of the first structural bodies 310. FIG. 63B is a plan view illustrating an arrangement example of the second structural bodies 410. The plurality of first and second structural bodies 310 and 410 are two-dimensionally arranged in a predetermined pattern corresponding to the key layout. The first structural body 310 has a size, a shape or the like that may be changed according to an arrangement position. The size, the shape or the like may be changed according to the arrangement position, similar to the second structural body 410.

Figure 64:
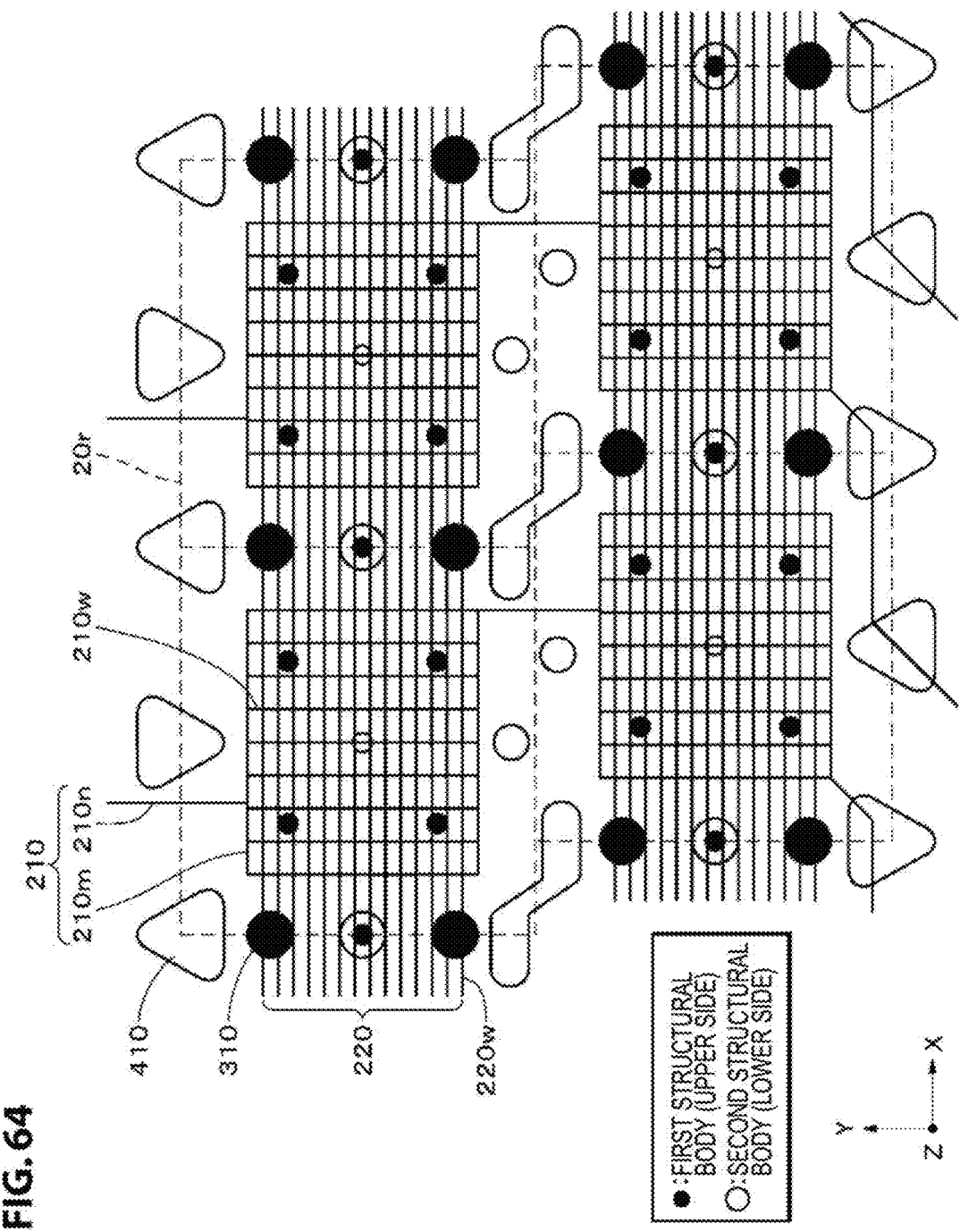
FIG. 64 is a plan view illustrating an arrangement relation between first and second electrode lines and first and second structural bodies.

FIG. 64 is a plan view illustrating an arrangement relation between the first and second electrode lines 210 and 220 and the first and second structural bodies 310 and 410. The plurality of unit electrode bodies 210m of the first electrode line (Y electrode) 210 are provided to overlap the rectangular second electrode line (X electrode) 220 when viewed in the Z-axis direction.

Figure 65:
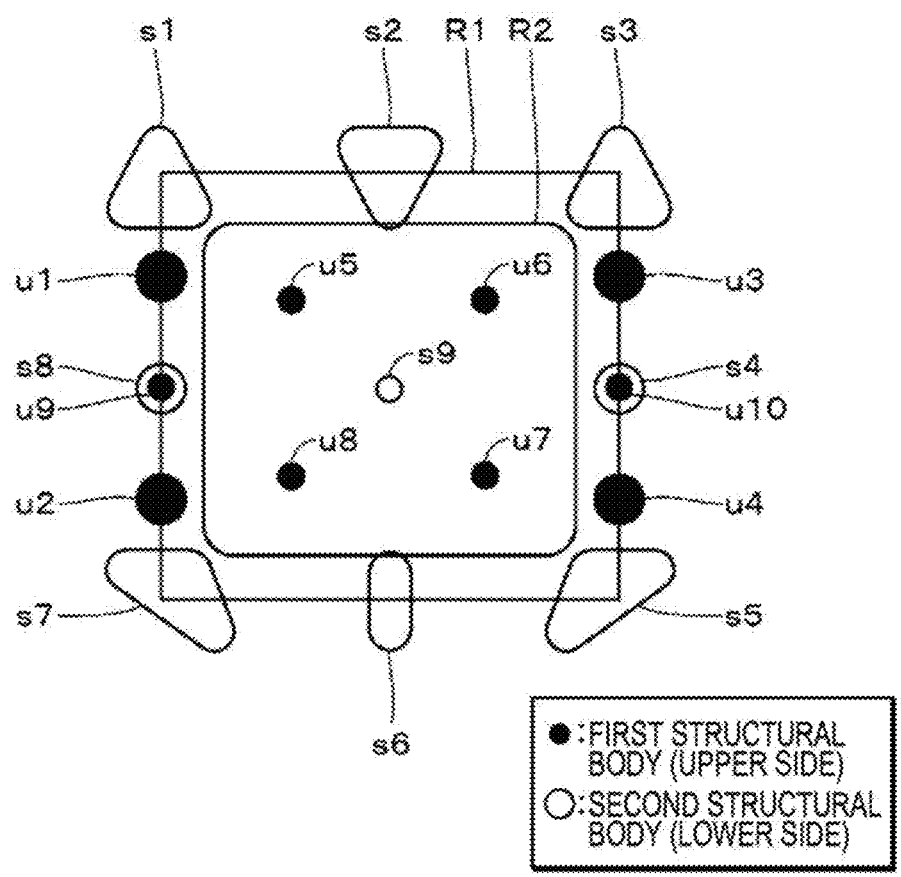
FIG. 65 is a plan view illustrating an arrangement example of first and second structural bodies.

Hereinafter, an arrangement example of the first and second structural bodies 310 and 410 will be described in detail with reference to FIG. 65. Unlike drawing by the operant such as a stylus, when the keyboard device is used, it is preferable that deformation of the metal film 12 and the electrode substrate 20 when the key region 111A is pressed not spread to the adjacent key region 111A.

It is preferable that first and second structural bodies s4 and u10 and first and second structural bodies s8 and u9 be provided to overlap when viewed in the Z-axis direction in a part (that is, the groove portion 112A) between the key regions 111A in the X-axis direction (lateral direction). Therefore, in the parts in which the first and second structural bodies s4 and u10 and the first and second structural bodies s8 and u9 overlap, sensitivity decreases, and spread of deformation in the X-axis direction (lateral direction) decreases.

Also, in a part between the key regions 111A in the Y-axis direction (upper limit direction), a first structural body may be provided on second structural bodies s2 and s6 to overlap when viewed in the Z-axis direction. In this case, spread of deformation in the Y-axis direction (upper limit direction) also decreases.

Also, in a part between the key regions 111A in a direction (diagonal direction) between the X-axis direction and the Y-axis direction, a first structural body may be provided on second structural bodies s1, s3, s5, and s7 to overlap when viewed in the Z-axis direction. In this case, spread of deformation in a direction (diagonal direction) between the X-axis direction and the Y-axis direction also decreases.

It is preferable that a plurality of first structural bodies u5 to u8 be provided in the unit detection region 20r. Accordingly, since a portion corresponding to the unit detection region 20r within the electrode substrate 20 is deformed by the plurality of first structural bodies u5 to u8, sensitivity when the key region 111A is pressed increases. Therefore, a difference between sensitivities when the key region 111A is pressed by a finger and when the key region 111A is pressed by a nail decreases.

It is preferable that intersecting points between the sub-electrodes 210w and 220w be collected in a vicinity of a middle portion of the unit detection region 20r and be inside a region defined by the first structural bodies u5 to u8. Therefore, it is possible to increase load sensitivity.

When the keyboard device is used, it is preferable that a difference between sensitivities when a center of the key region 111A is pressed and when an end of the key region 111A is pressed be small. When first structural bodies u1 to u4, u9, and u10 and second structural bodies s1 to s8 are arranged in a peripheral part of the unit detection region 20r, an amount of deformation of a middle portion of the unit detection region 20r increases and sensitivity tends to increase. In this case, when a second structural body s9 is arranged in a middle portion of the unit detection region 20r, sensitivity in the middle portion of the unit detection region 20r relatively decreases, and a difference between sensitivities of the center of the key region 111A and the end of the key region 111A preferably decreases. Moreover, it is preferable that the intersecting point between the sub-electrodes 210w and 220w be outside of the key region 111A such that sufficient sensitivity is also obtained in the end of the key region 111A.

It is preferable that the first structural bodies u1 to u4, u9, and u10 and the second structural bodies s1 to s8 provided in the peripheral part of the unit detection region 20r be greater than the first structural bodies u4 to u7 and the second structural body s9 provided in the middle portion of the unit detection region 20r. Therefore, it is possible to increase an adhesive force between the metal film 12 and the electrode substrate 20 and between the conductor layer 50 and the electrode substrate 20.

It is preferable that the respective key regions 111A (the unit detection region 20r) not be isolated and that air be able to sufficiently flow between the respective key regions 111A without resistance. Therefore, an internal pressure of the input device 100A in the respective key regions 111A increases, and it is possible to suppress a decrease in sensitivity or occurrence of a return delay.

As described above, the control unit 60 includes the arithmetic operation unit 61 and the signal generating unit 62 and is electrically connected to the electrode substrate 20. In addition, in the present embodiment, the control unit 60 is able to generate information on the input operation with respect to each of the plurality of key regions 111A based on outputs of the plurality of detection units 20s. That is, the arithmetic operation unit 61 computes the operation position in an XY coordinate system on the first surface 110 based on an electrical signal (input signal) output from each of the first and second electrode lines 210 and 220 of the electrode substrate 20, and determines the key region 111A assigned to the operation position. The signal generating unit 62 generates an operation signal corresponding to the key region 111A in which the pressing is detected.

When the input device 100A is embedded in the electronic apparatus such as a notebook personal computer or a cellular phone, it can be applied as the keyboard device as described above. In addition, the input device 100A includes a communication unit (not illustrated), is electrically connected to other electronic apparatuses such as a personal computer through wired or wireless communication, and is able to perform an input operation for controlling the electronic apparatus.

Moreover, as described in the first embodiment, the input device 100A can also be used as a pointing device. That is, when two or more threshold values are set with respect to an output of each detection unit 20s and the arithmetic operation unit 61 determines a touch operation and a push operation, it is possible to provide the input device in which the pointing device and the keyboard are integrated.

6 Sixth Embodiment

Figure 32:
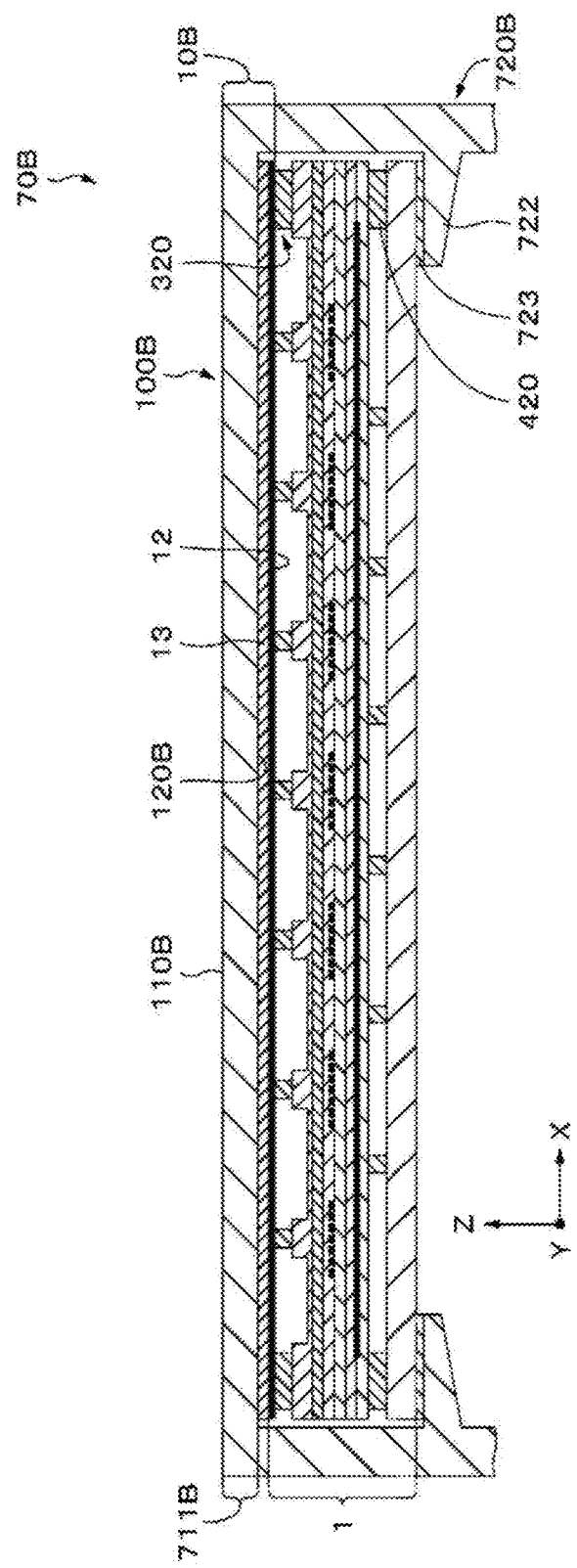
FIG. 32 is a schematic cross-sectional view illustrating one exemplary configuration of an electronic apparatus in which an input device according to a sixth embodiment of the present disclosure is included.

FIG. 32 is a schematic cross-sectional view illustrating one exemplary configuration of the electronic apparatus 70B in which the input device 100B according to the sixth embodiment of the present disclosure is embedded. A configuration other than the operation member 10B of the input device 100B according to the present embodiment is similar to that of the first embodiment, and descriptions thereof will be appropriately omitted.

In the input device 100B according to the present embodiment, a part of a case 720B of the electronic apparatus 70B forms a part of the operation member 10B. That is, the input device 100B includes an operation region 721B forming a part of the case 720B and the same sensor device 1 as in the first embodiment. As the electronic apparatus 70B, for example, a personal computer in which a touch sensor is mounted is applicable.

The operation member 10B has a structure in which the deformable operation region 721B including the first surface 110B and the second surface 120B, and the metal film 12 are laminated. That is, the first surface 110B is one surface of the case 720B, and the second surface 120B is a rear surface (inner surface) of the one surface.

The operation region 721B may be made of, for example, the same material as other regions of the case 720B, for example, a conductor material such as an aluminum alloy or a magnesium alloy, or a plastic material, and has a thickness that is deformable when the user performs a touch operation or a push operation in this case. Alternatively, the operation region 721B may be made of a different material from other regions of the case 720B. In this case, it is possible to use a material having less rigidity than that of the other regions.

In addition, the metal film 12 such as a metallic foil formed in the adhesive layer 13 such as a pressure sensitive adhesive resin film is formed on the second surface 120B. Also, when the operation region 721B is made of a conductor material, the metal film 12 is unnecessary, and a thickness of the operation member 10B can decrease. In this case, the operation region 721B also functions as the metal film 12, and is connected to, for example, a ground potential.

As described above, a part of the case 720B made of a conductor material or the like is used, and thereby the input device 100B according to the present embodiment may be configured. This is because, as described above, the input device 100B detects the input operation using capacitive coupling between the detection unit 20s and each of the metal film 12 pressed by the operant and the conductor layer 50 facing it rather than using capacitive coupling between the operant and the X and Y electrodes. Therefore, according to the input device 100B, it is possible to decrease the number of components of the electronic apparatus 70B and further increase productivity.

In addition, since the input device 100B according to the present embodiment includes the same sensor device 1 as in the above-described first embodiment, it is possible to detect the operation position and the pressing force with high accuracy even with a minute pressing force. Therefore, according to the present embodiment, a limitation on a material of the operation region 711B decreases, and it is possible to provide the input device 100B with high detection sensitivity.

EXAMPLE

Hereinafter, the present disclosure will be described in detail with reference to test examples, but the present disclosure is not limited to these test examples.

In the following simulations, stress analysis and electrostatic analysis were performed using a finite element method. As a specific program, FEMTET (product name, commercially available from Murata Software Co., Ltd.) was used.

Table 1 shows the configurations of the first and second electrodes in test examples 1-1-1 to 1-1-7 and test examples 1-3-1 to 1-3-6.

TABLE 1

| | First and second electrodes | | | |
|---|---|---|---|---|
| | Configuration | Width w of sub-electrode [mm] | Distance d between centers of sub-electrodes [mm] | Number of intersecting points per unit detection region |
| Test example 1-1-1 | Sub-electrode | 0.1 | 0.1 | — |
| Test example 1-1-2 | | | 0.2 | 625 |
| Test example 1-1-3 | | | 0.3 | 256 |
| Test example 1-1-4 | | | 0.4 | 144 |
| Test example 1-1-5 | | | 0.5 | 100 |
| Test example 1-1-6 | | | 0.6 | 64 |
| Test example 1-1-7 | | | 0.7 | 49 |
| Test example 1-3-1 | | 0.2 | 0.2 | — |
| Test example 1-3-2 | | | 0.3 | — |
| Test example 1-3-3 | | | 0.4 | — |
| Test example 1-3-4 | | | 0.5 | — |
| Test example 1-3-5 | | | 0.6 | — |
| Test example 1-3-6 | | | 0.7 | — |

Table 2 shows the configurations of the first and second electrodes in test examples 1-5-1 to 1-5-4.

TABLE 2

| | First electrode | | | Second electrode | |
|---|---|---|---|---|---|
| | Configuration | Width w of sub-electrode [mm] | Distance d between centers of sub-electrodes [mm] | Configuration | Width of electrode [mm] |
| Test example 1-5-1 | Sub-electrode | 0.1 | 0.1 | Single electrode | 2.2 |
| Test example 1-5-2 | | | 0.2 | | |
| Test example 1-5-3 | | | 0.3 | | |
| Test example 1-5-4 | | | 0.4 | | |

Figure 38:
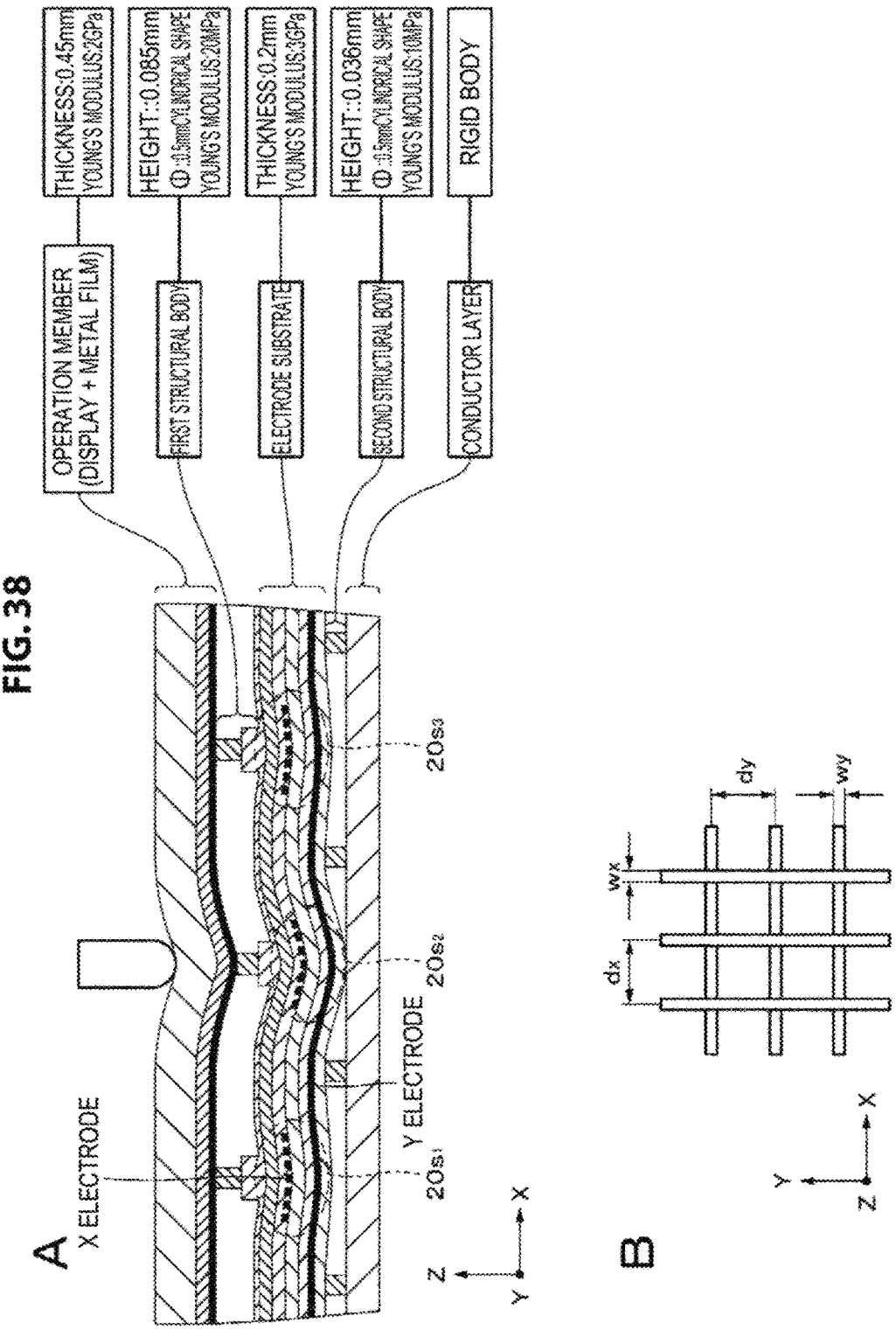
FIG. 38A is a schematic diagram illustrating simulation conditions in test example 2-1.
FIG. 38B is a schematic diagram illustrating the simulation conditions in test example 2-1.

Table 3 shows the configurations of the detections units in test examples 2-1 to 2-5. In Table 3, corresponding portions of widths $W_x$ and $W_y$ of the sub-electrodes, the distances $d_x$, and $d_y$ between the sub-electrodes, and electrode widths $E_x$ and $E_y$ are as shown in FIGS. 10A, 10B, and 38B. Here, the distances $d_x$ and $d_y$ between the sub-electrodes are a center distance (a centerline distance) between of the sub-electrodes.

<1 Electrode Including Sub-Electrodes>
<1.1 Combination of First Electrode Configured by Sub-Electrodes and Second Electrode Configured by Sub-Electrodes>

First, characteristics of the input device in which the first electrode configured by the sub-electrodes and the second electrode configured by the sub-electrodes are combined were examined through simulations.

TABLE 3

|  |  | Detection unit 1 | Detection unit 2 | Detection unit 3 | Detection unit 4 | Detection unit 5 |
|---|---|---|---|---|---|---|
|  | Configuration | Two-layer type vertical and horizontal mesh | Two-layer type vertical and horizontal mesh | Two-layer type vertical and horizontal mesh | Two-layer type vertical and horizontal mesh | Two-layer type vertical and horizontal mesh |
|  | Size [mm] of unit detection region | Lx = 5.6 mm Ly = 5.8 mm | Lx = 5.6 mm Ly = 5.8 mm | Lx = 5.6 mm Ly = 5.8 mm | Lx = 5.6 mm Ly = 5.8 mm | Lx = 5.6 mm Ly = 5.8 mm |
|  | Distance [mm] between XY electrodes (distance in Z-axis direction) | 0.125 | 0.125 | 0.125 | 0.125 | 0.125 |
| Configuration of X electrode | Number [units] of sub-electrodes | 13 | 13 | 12 | 10 | 5 |
|  | Distance [mm] $d_x$ between sub-electrodes | 0.431 | Irregular distances 0.3~0.6 | 0.3 | 0.3 | Irregular distances 0.3~0.32 |
|  | Width $W_x$ [mm] of sub-electrodes | 0.1 | 0.1 | 0.1 | 0.1 | 0.1 |
|  | Width $E_x$ [mm] of electrode | 5.07 | 5.14 | 3.4 | 2.8 | 1.34 |
| Configuration of Y electrode | Number [units] of sub-electrodes | 14 | 14 | 12 | 10 | 6 |
|  | Distance [mm] $d_y$ between sub-electrodes | 0.414 | Irregular distances 0.28~0.6 | 0.31 | 0.32 | Irregular distances 0.28~0.32 |
|  | Width $W_y$ [mm] of sub-electrodes | 0.1 | 0.1 | 0.1 | 0.1 | 0.1 |
|  | Width $E_y$ [mm] of electrode | 5.48 | 5.28 | 3.51 | 2.98 | 1.6 |
| Configuration 1 of intersecting point (Density in middle portion > density in peripheral portion) | | X | ○ | ○ | ○ | ○ |
| Configuration 2 of intersecting point (Density near first structural body > density near second structural body) | | X | ○ | ○ | ○ | ○ |
| Configuration 3 of intersecting point (Intersecting point is not present near second structural body) | | X | X | ○ | ○ | ○ |
| Configuration 4 of intersecting point (Intersecting points are present only inside four second structural bodies) | | X | X | X | ○ | ○ |
| Configuration 5 of intersecting point (Intersecting point is present only when $E_x$, $E_y$ is less than ⅓ of $L_x$, $L_y$) | | X | X | X | X | ○ |

In Table 3, marks "o" indicate that detection units 1 to 5 satisfy configurations 1 to 5 of the intersecting points, whereas marks "x" indicate that the detection units 1 to 5 do not satisfy the configurations 1 to 5 of the intersecting points.

Embodiments of the present disclosure will be described in the following order.

1 Electrode including sub-electrodes 1.1 Combination of first electrode configured by sub-electrodes and second electrode configured by sub-electrodes 1.2 Combination of first electrode configured by sub-electrodes and second electrode with single configuration 2. Density at sub-electrode intersecting point 3. Combination of electrode configured by sub-electrodes and arrangement position of structural body Test Examples 1-1-1 to 1-1-7

FIGS. 33A and 33B are schematic diagrams illustrating simulation conditions in Test Examples 1-1 to 1-7. As illustrated in FIG. 33A, the first conductor layer, the first structural bodies, the electrode substrate, the second structural bodies, and the second conductor layer included in the input device were first set. As shown in FIG. 33B and Table 1, the first and second electrodes included in the electrode substrate were formed by the first and second sub-electrodes, and the electrodes were set to intersect in a 3×3 mesh shape.

Next, an electrostatic capacitance (hereinafter referred to as "initial capacitance") $C_0$ of the input device set under the above-described conditions was obtained. The result is illustrated in FIG. 34A.

Test Examples 1-2-1 to 1-2-7

In the same conditions as Test Examples 1-1-1 to 1-1-7 described above except that the distance (the width of the first space) between the first conductor layer and the electrode substrate was changed to 40 µm and the distance (the width of the second space) between the second conductor layer and the electrode substrate was changed to 2 µm, the capacitance (hereinafter appropriately referred to as "changed capacitance") $C_1$ was obtained.

Next, the capacitance change rate was obtained by the following expression. The result is illustrated in FIG. 34B. In FIG. 34B, the capacitance change rate of the vertical axis is an electrostatic capacitance change rate per sub-electrode intersecting point.

(Capacitance change rate) [%]=[(Initial Capacitance $C_0$)−(Changed capacitance $C_1$)]/(Initial Capacitance $C_0$)

(Simulation Results)

FIG. 34A is a diagram illustrating simulation results of Test Examples 1-1-1 to 1-1-7. FIG. 34B is a diagram illustrating simulation results of Test Examples 1-2-1 to 1-2-7. In FIG. 34A, the initial capacitance of the vertical axis is initial capacitance per sub-electrode intersecting point.

The following can be understood from FIGS. 34A and 34B.

It can be seen that by configuring the first and second electrodes by the first and second sub-electrodes and intersecting the sub-electrodes in a mesh shape at the intersections, the initial capacitance and the capacitance change rate are increased.

When the distance between the first and second sub-electrodes is 0.1 mm, the distance is the same as the width of the first sub-electrode and the width of the second sub-electrode. This means that the first and second electrodes are configured by the electrodes with the planar shape of the single configuration. In the present specification, this means that the distance between the first and second sub-electrodes is the distance between the centers of the first and second sub-electrodes.

When the distance between the first and second sub-electrode is 0.2 mm or more, the initial capacitance and the capacitance change rate can be improved more greatly than when the first and second electrodes are configured by the electrodes with the planar shape of the signal configuration. In particular, when the distance between the first and second sub-electrodes is 0.3 mm or more, the degree of the improvement in the initial capacitance and the capacitance change rate is large. By increasing the initial capacitance in this way, it is possible to improve the signal-to-noise ratio (SN ratio) of the input device. Further, by increasing the capacitance change rate in this way, it is possible to improve the sensitivity of the input device.

The results illustrated in FIGS. 34A and 34B suggest that it is preferable for the characteristics of the input device for the distance between the first and second sub-electrodes to simply be broad. This is because the results illustrated in FIGS. 34A and 34B are the initial capacitance per sub-electrode intersecting point. Practically, when the distance between the first and the second sub-electrodes is broad, the numbers of first and second sub-electrodes per unit detection region decrease. Therefore, it is not necessarily good for the distance between the first and second sub-electrodes to be broad.

When the numbers of first and second sub-electrodes decrease, there is a relation in which the initial capacitance per unit detection region decreases at the square of the distance between the first and second sub-electrodes and the capacitance change rate per unit detection region does not change. When the unit detection region is shaped in a 6 mm×6 mm square, the distance (the horizontal axes of FIGS. 34A and 34B) between the first and second sub-electrodes and the number of intersecting points of the sub-electrodes per unit detection region have the relation shown in Table 1.

In consideration of the initial capacitance per unit detection region (=(initial capacitance per intersecting point)×(the number of intersecting points)) and the capacitance change rate, the distance between the first and second sub-electrodes is preferably in the range equal to or greater than 0.2 mm and equal to or less than 0.4 mm and is most preferably about 0.3 mm.

Test Examples 1-3-1 to 1-3-6

In the same conditions as Test Examples 1-1-2 to 1-1-7 except that the widths of the first and second sub-electrodes were changed to 0.2 mm, the initial capacitance $C_0$ of the input device was obtained. The result is illustrated in FIG. 35A.

Test Examples 1-4-1 to 1-4-6

In the same conditions as Test Examples 1-2-2 to 1-2-7 except that the widths of the first and second sub-electrodes were changed to 0.2 mm, the capacitance change rate of the input device was obtained. The result is illustrated in FIG. 35B.

(Simulation Results)

FIG. 35A is a diagram illustrating simulation results of Test Examples 1-3-1 to 1-3-6. FIG. 35B is a diagram illustrating simulation results of Test Examples 1-4-1 to 1-4-6. In FIG. 35A, the initial capacitance of the vertical axis is initial capacitance per sub-electrode intersecting point. In FIG. 35B, the capacitance change rate of the vertical axis is capacitance change rate per sub-electrode intersecting point.

The following can be understood from FIGS. 35A and 35B.

It can be seen that by configuring the first and second electrodes by the first and second sub-electrodes and intersecting the sub-electrodes in a mesh shape at the intersections, the initial capacitance and the capacitance change rate are increased.

When the distance between the first and second sub-electrodes is 0.2 mm, the distance is the same as the width of the first sub-electrode and the width of the second sub-electrode. This means that the first and second electrodes are configured by the electrodes with the planar shape of the single configuration.

When the distance between the first and second sub-electrode is 0.3 mm or more, the initial capacitance and the capacitance change rate can be improved more greatly than when the first and second electrodes are configured by the electrodes with the planar shape of the signal configuration. In particular, when the distance between the first and second sub-electrode is 0.4 mm or more, the degree of the improvement in the initial capacitance and the capacitance change rate is large.

The following conclusions can be drawn from the above-described results. That is, when the widths of the first and second sub-electrodes are 0.1 mm, the distance between the first and second sub-electrodes is preferably 0.3 mm or more. Further, when the widths of the first and second sub-electrodes are 0.2 mm, the distance between the first and second sub-electrodes is preferably 0.4 mm or more. In consideration of such results, the width of the space between the first and second sub-electrodes (=(the distance between the first or second sub-electrodes)–(the width of the first or second sub-electrode)) is preferably 0.2 mm or more.

<1.2 Combination of First Electrode Configured by Sub-Electrodes and Second Electrode with Single Configuration>

Next, characteristics of the input device in which the first electrode configured by the sub-electrodes and the second electrode with a single configuration are combined were examined through simulations.

Test Examples 1-5-1 to 1-5-4

FIGS. 36A and 36B are schematic diagrams illustrating simulation conditions in Test Examples 1-5-1 to 1-5-4. As illustrated in FIG. 36A, the first conductor layer, the first structural bodies, the electrode substrate, and the second conductor layer included in the input device were first set. As shown in FIG. 36B and Table 2, the first electrodes included in the electrode substrate were formed by the first sub-electrodes, and the second electrodes were set as electrodes with a planar shape of the signal configuration.

Next, an initial capacitance $C_0$ of the input device set under the above-described conditions was obtained. The result is illustrated in FIG. 37A.

Test Examples 1-6-1 to 1-6-4

In the same conditions as Test Examples 1-5-1 to 1-5-4 described above except that the distance (the width of the first space) between the first conductor layer and the electrode substrate was changed to 6 μm, the changed capacitance $C_1$ was obtained.

Next, the capacitance change rate was obtained as in Test Examples 1-1-1 to 1-1-7. The result is illustrated in FIG. 37B.

(Simulation Results)

FIG. 37A is a diagram illustrating simulation results of Test Examples 1-5-1 to 1-5-4. FIG. 37B is a diagram illustrating simulation results of Test Examples 1-6-1 to 1-6-4. In FIG. 37A, the initial capacitance of the vertical axis is the electrostatic capacitance per sub-electrode intersecting point. In FIG. 37B, the capacitance change rate of the vertical axis is the capacitance change rate per sub-electrode intersecting point.

The following can be understood from FIGS. 37A and 37B.

It can be seen that by configuring the first electrodes by the first sub-electrodes and configuring the second electrodes by the electrodes with the planar shape of the single configuration, the initial capacitance and the capacitance change rate are increased.

When the distance between the first and second sub-electrodes is 0.1 mm, the distance is the same as the width of the first sub-electrode and the width of the second sub-electrode. This means that the first and second electrodes are configured by the electrodes with the planar shape of the single configuration.

When the distance between the first and second sub-electrodes is 0.2 mm or more, the initial capacitance and the capacitance change rate can be improved more greatly than when the first and second electrodes are configured by the electrodes with the planar shape of the signal configuration. In particular, when the distance between the first and second sub-electrode is 0.3 mm or more, the degree of the improvement in the initial capacitance and the capacitance change rate is large.

<2 Density at Sub-Electrode Intersecting Point>

Next, the characteristics of the input device were examined through simulations by variously changing the density of the sub-electrode intersecting points.

Test Example 2-1

FIGS. 38A, 38B, and 39A are a schematic diagram illustrating simulation conditions in Test Example 2-1. Values of an operation member, a first structural body, an electrode substrate, a second structural body, and a conductor layer which constitute the input device were set as illustrated in FIG. 38A. As a configuration of the detection unit included in the electrode substrate, the configuration of the detection unit 1 shown in FIG. 38B and Table 3 was used. The first structural body and the second structural body were arranged as illustrated in FIG. 39A.

The following (1) to (3) analyses of the input devices in which the above-described conditions were set were performed through simulations. Results thereof are shown in FIGS. 40A, 40B, 41 and 42.

(1) A deformation position of the operation member and the electrode substrate when a weight is applied to a position corresponding to a center of the unit detection region within a surface of the operation member (FIG. 38A: a deformation position in an XZ cross section)

A deformation position of the operation member and the electrode substrate when a weight is applied to a position corresponding to a gap between adjacent unit detection regions within a surface of the operation member (FIG. 38A: a deformation position in an XZ cross section)

(2) A change in capacitance change rate distribution of the detection units $20s_1$, $20s_2$, and $20s_3$ corresponding to the weighted position.

(3) Load dependency on the capacitance change rate (maximum capacitance change rate) when a weight is applied to a position corresponding to a center of the unit detection region within a surface of the operation member.

Here, the capacitance change rate was computed by the following formula.

(capacitance change rate)[%]=[(initial capacitance $C_0$)–(changed capacity $C_1$)]/(initial capacitance $C_0$)

In the formula, the terms "initial capacitance $C_0$" and "changed capacity $C_1$" specifically indicate the following values.

initial capacitance $C_0$: an electrostatic capacitance of the input device when no weight is applied to a surface of the operation member.

changed capacity $C_1$: an electrostatic capacitance of the input device after a weight is applied to a surface of the operation member.

Test Example 2-2

Figure 41:
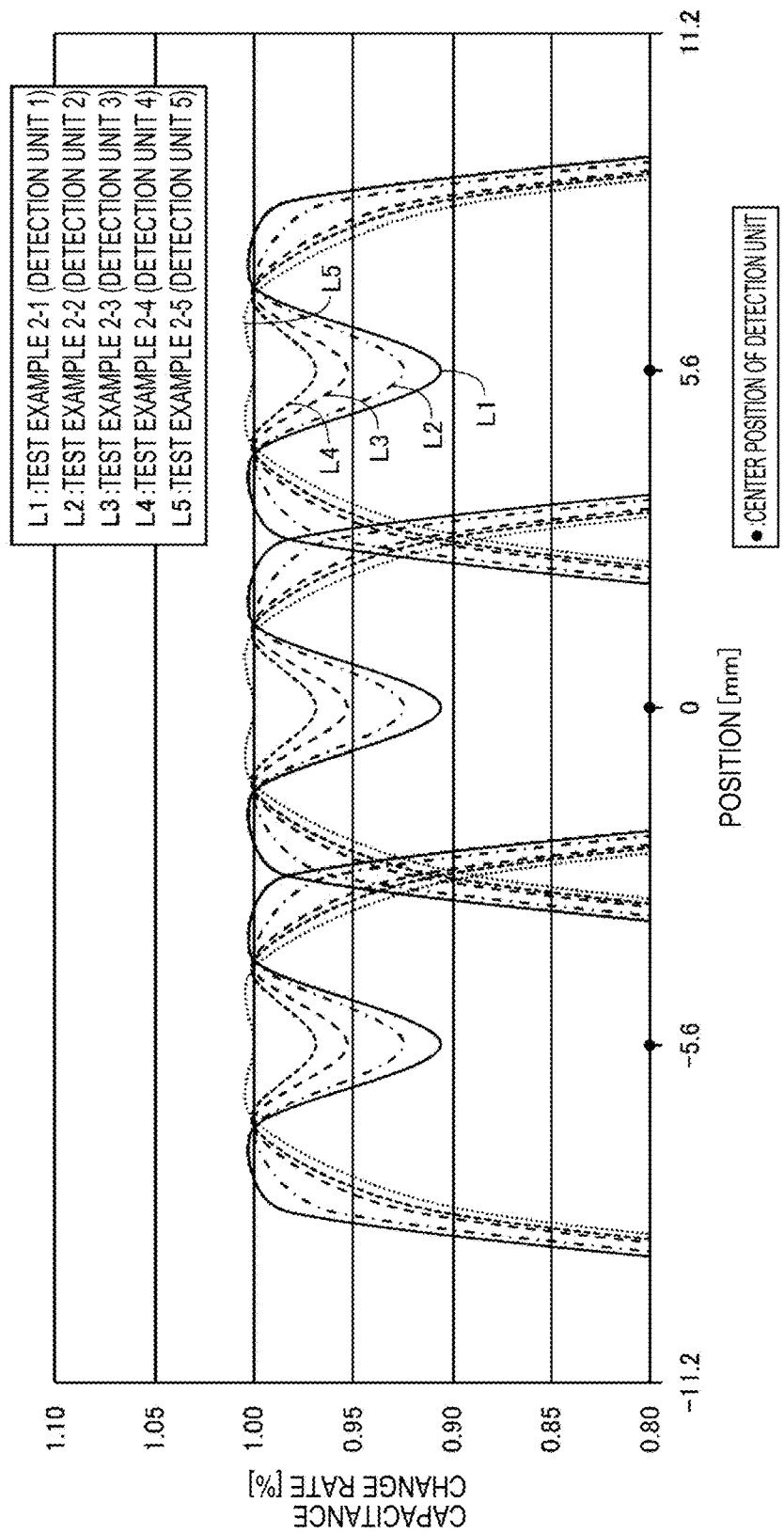
FIG. 41 is a diagram illustrating an expanded part of FIG. 40B.
Figure 42:
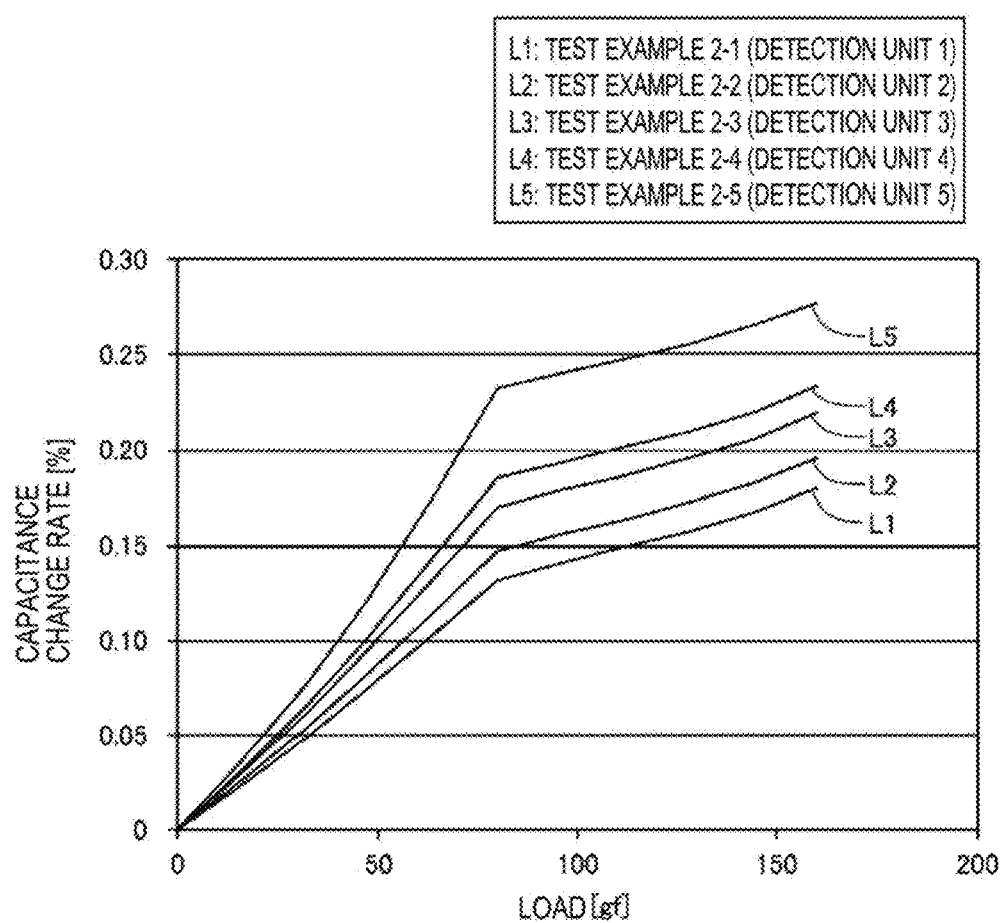
FIG. 42 is a diagram illustrating simulation results of Test Examples 2-1 to 2-5.

As a configuration of the detection unit included in the electrode substrate, the configuration of the detection unit 2 shown in FIG. 38B and Table 3 was used. Conditions other than the configuration were the same as those of Test Example 2-1 and the above-described (2) analysis was performed through simulations. Results thereof are shown in FIGS. 40B, 41 and 42.

Test Example 2-3

As a configuration of the detection unit included in the electrode substrate, the configuration of the detection unit 3 shown in FIG. 38B and Table 3 was used. Conditions other than the configuration were the same as those of Test Example 2-1 and the above-described (2) and (3) analysis was performed through simulations. Results thereof are shown in FIGS. 40B, 41 and 42.

Test Example 2-4

As a configuration of the detection unit included in the electrode substrate, the configuration of the detection unit 4 shown in FIG. 38B and Table 3 was used. Conditions other than the configuration were the same as those of Test Example 2-1 and the above-described (2) and (3) analysis was performed through simulations. Results thereof are shown in FIGS. 40B, 41 and 42.

Test Example 2-5

As a configuration of the detection unit included in the electrode substrate, the configuration of the detection unit 5 shown in FIG. 38B and Table 3 was used. Conditions other than the configuration were the same as those of Test Example 2-1 and the above-described (2) and (3) analysis was performed through simulations. Results thereof are shown in FIGS. 40B, 41 and 42.

Specific configurations of the sub-electrode intersecting points in Test Examples 2-1 to 2-5 are as follows.

Test Example 2-1 (Table 3: Configuration 1 of intersecting points): The density of the sub-electrode intersecting points is constant irrespective of the positions of the intersecting regions of the first and second electrodes.

Test Example 2-2 (Table 3: Configuration 2 of intersecting points): The density of the sub-electrode intersecting points is higher in the middle portion than in the peripheral portion of the intersection regions of the first and second electrodes.

Test Example 2-3 (Table 3: Configuration 3 of intersecting points): The sub-electrode intersecting points are not present at positions facing the second structural bodies. That is, the density of the sub-electrode intersecting points is "0" at the positions facing the second structural bodies. Specifically, the sub-electrode intersecting points are present only in regions in which the widths $E_x$ and $E_y$ of the first and second electrodes are less than ⅔ of the sizes $L_x$ and $L_y$ of the unit region.

Test Example 2-4 (Table 3: Configuration 4 of intersecting points): The sub-electrode intersecting points are not present at the positions facing the second structural bodies. That is, the density of the sub-electrode intersecting points is "0" at the positions facing the second structural bodies. Specifically, the sub-electrode intersecting points are present only in regions in which the widths $E_x$ and $E_y$ of the first and second electrodes are less than ⅔ of the sizes $L_x$ and $L_y$ of the unit region.

Test Example 2-5 (Table 3: Configuration 5 of intersecting points): The sub-electrode intersecting points (that is, the widths $E_x$ and $E_y$ of the first and second electrodes) are present only in the range equal to or less than ⅓ of the widths $L_x$ and $L_y$ of the unit detection region.

(Simulation Results)

FIG. 40A is a diagram illustrating a simulation result of Test Example 2-1. In FIG. 41A, a curved line denoted by reference numeral L11 indicates a deformed position of the operation member when a load is applied to the center of the unit detection region and a curved line denoted by reference numeral L12 indicates a deformed position of the operation member when a load is applied between the adjacent unit detection regions. In FIG. 41A, a curved line denoted by reference numeral L21 indicates a deformed position of the electrode substrate when a load is applied to the center of the unit detection region and a curved line denoted by reference numeral L22 indicates a deformed position of the electrode substrate when a load is applied between the adjacent unit detection regions.

Figure 43:
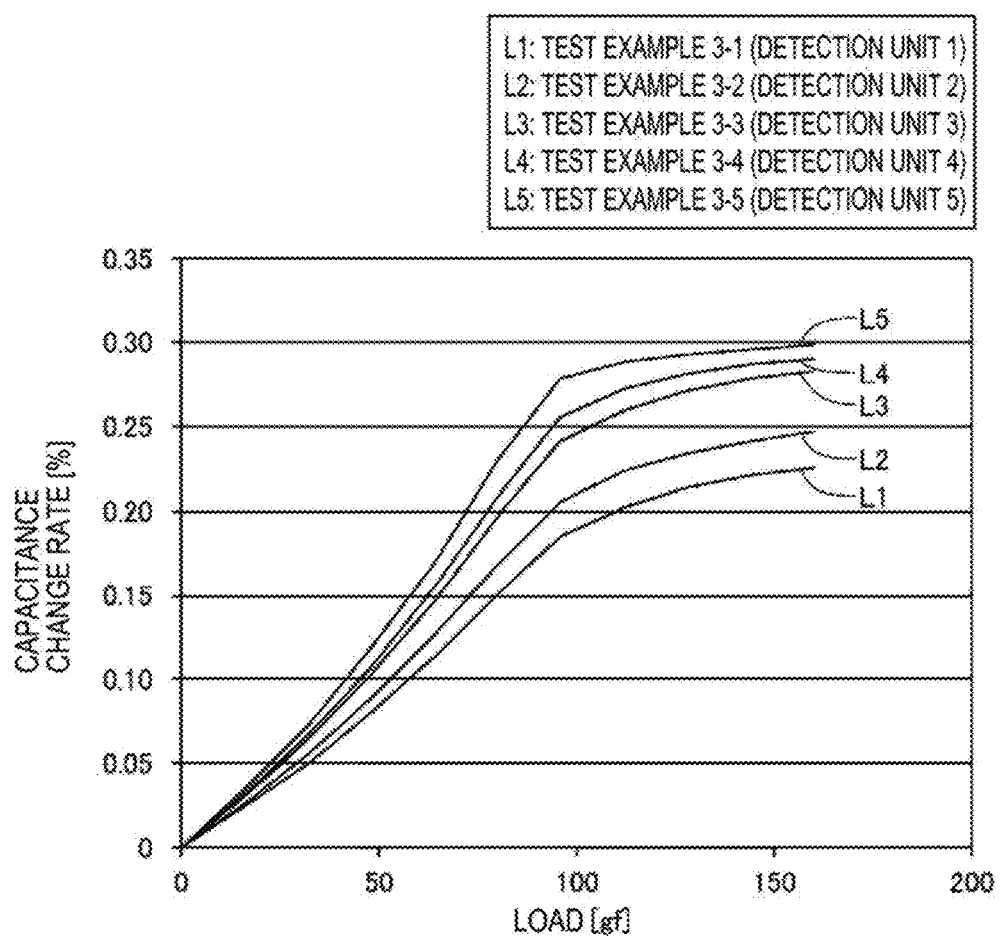
FIG. 43 is a diagram illustrating simulation results of Test Examples 3-1 to 3-5.

FIGS. 41B and 43 are diagrams illustrating simulation results of Test Examples 2-1 to 2-5. FIG. 42 is an expanded diagram illustrating a part of FIG. 41B. In FIGS. 42 and 43, curved lines denoted by reference numerals L1, L2, L3, L4, and L5 indicate the simulation results of Test Examples 2-1, 2-2, 2-3, 2-4, and 2-5, respectively.

The following can be understood based on comparison of FIG. 41A.

When one first structural body is arranged in the unit detection region and a load is applied to a center of the unit detection region, only a portion corresponding to the center of the unit detection region within the electrode substrate is locally deformed downward.

When one first structural body is arranged in the unit detection region and a load is applied between adjacent unit detection regions, a part of the operation member to which the load is applied is locally greatly deformed.

The following can be understood from FIGS. 41B, 42, and 43.

Test Example 2-1 (see the curved line L1): When the density of the sub-electrode intersecting points is constant, two peaks occur in the capacitance change rate distribution.

Test Example 2-2 (see the curved line L2): When the density of the sub-electrode intersecting points is higher in the middle portion than in the peripheral portion of the intersecting region between the first and second electrodes, it is possible to reduce the sizes of the two peaks occurring in the capacitance change rate distribution more than when the density of the sub-electrode intersecting points is constant. Further, it is possible to improve the maximum capacitance change rate and the sensitivity more than when the density of the sub-electrode intersecting points is constant. Here, the sensitivity (load sensitivity) refers to a slope of a curved line of the capacitance change rate distribution in the vicinity of the load "0 gf."

Test Example 2-3 (see the curved line L3): By not providing the sub-electrode intersecting point at the position facing the second structural body, it is possible to reduce the sizes of the two peaks occurring in the capacitance change rate distribution more than when the density of the sub-electrode intersecting points is constant. Further, it is possible to improve the maximum capacitance change rate and the sensitivity more than when the density of the sub-electrode intersecting points is constant.

Test Example 2-4 (see the curved line L4): By not providing the sub-electrode intersecting point at the position facing the second structural body, it is possible to reduce the sizes of the two peaks occurring in the capacitance change rate distribution more than when the density of the sub-electrode intersecting points is constant. Further, it is possible to improve the maximum capacitance change rate and the sensitivity more than when the density of the sub-electrode intersecting points is constant.

Test Example 2-5 (see the curved line L5): By providing the sub-electrode intersecting point in the range less than ⅓ of the widths Lx and Ly of the unit detection region, it is possible to suppress the occurrence of the two peaks in the capacitance change rate distribution substantially completely. Further, it is possible to improve the maximum capacitance change rate and the sensitivity more than when the density of the sub-electrode intersecting points is constant.

The degree of the advantageous effect of suppressing the occurrence of the two peaks in the capacitance change rate distribution increases in the order of Test Examples 2-1, 2-2, 2-3, 2-4, and 2-5.

The degree of the advantageous effect of improving the maximum capacitance change rate and the sensitivity also increases in the order of Test Examples 2-1, 2-2, 2-3, 2-4, and 2-5.

<3. Combination of Electrode Configured by Sub-Electrodes and Arrangement Position of Structural Body>

Next, the characteristics of the input device were examined through simulations by variously changing the relation between the electrodes configured by the sub-electrodes and the arrangement position of the structural body.

Test Examples 3-1 to 3-5

The first structural bodies and the second structural bodies were arranged as illustrated in FIG. 39B. Conditions other than the arrangement were the same as those of Test Examples 2-1 to 2-5 and the above-described (3) analysis was performed through simulations. Results thereof are shown in FIG. 43.

Specific configurations of the sub-electrode intersecting points in Test Examples 3-1 to 3-5 are as follows.

Test Example 3-1: The density of the sub-electrode intersecting points is constant irrespective of the positions of the intersecting regions of the first and second electrodes.

Test Example 3-2: The density of the sub-electrode intersecting points is higher in the middle portion than in the peripheral portion of the intersection regions of the first and second electrodes. Specifically, the density of the sub-electrode intersecting points near the position facing the first structural body is higher than the density of the sub-electrode intersecting points near the position facing the second structural body.

Test Example 3-3: The sub-electrode intersecting points are not present at positions facing the second structural bodies. Specifically, the sub-electrode intersecting points are present within ⅔ of the widths $L_x$ and $L_y$ of the unit detection region. That is, the widths $E_x$ and $E_y$ of the first and second electrodes are equal to or less than ⅔ of the widths $L_x$ and $L_y$ of the unit detection region.

Test Example 3-4: The sub-electrode intersecting points are gathered in the regions facing the group of the plurality of first structural bodies or inside the regions.

Test Example 3-5: The sub-electrode intersecting points are present in the range equal to or less than ⅓ of the widths $L_x$ and $L_y$ of the unit detection region. That is, the widths $E_x$ and $E_y$ of the first and second electrodes are equal to or less than ⅓ of the widths $L_x$ and $L_y$ of the unit detection region.

(Simulation Results)

FIG. 43 is a diagram illustrating the simulation results of Test Examples 3-1 to 3-5. In FIG. 43, curved lines denoted by reference numerals L1, L2, L3, L4, and L5 indicate the simulation results of Test Examples 3-1, 3-2, 3-3, 3-4, and 3-5, respectively.

The following can be understood from FIG. 43

Test Example 3-2 (see the curved line L2): When the density of the sub-electrode intersecting points is higher in the middle portion than in the peripheral portion of the intersecting region between the first and second electrodes, it is possible to improve the maximum capacitance change rate and the sensitivity more than when the density of the sub-electrode intersecting points is constant.

Test Example 3-3 (see the curved line L3): By not providing the sub-electrode intersecting point at the position facing the second structural body, it is possible to improve the maximum capacitance change rate and the sensitivity more than when the density of the sub-electrode intersecting points is constant.

Test Example 3-5 (see the curved line L4): By gathering the sub-electrode intersecting points in the regions facing the group of the plurality of first structural bodies or inside the regions, it is possible to improve the maximum capacitance change rate and the sensitivity.

Test Example 3-4 (see the curved line L5): By providing the sub-electrode intersecting point in the range less than ⅓ of the widths Lx and Ly of the unit detection region, it is possible to improve the maximum capacitance change rate and the sensitivity more than when the density of the sub-electrode intersecting points is constant.

The degree of the advantageous effect of improving the maximum capacitance change range and the sensitivity increases in the order of Test Examples 3-1, 3-2, 3-3, 3-4, and 3-5. When FIGS. 42 and 43 are compared, it can be understood that the maximum capacitance change rate and the sensitivity are higher when two or more first structural bodies 310 are included in the unit detection region 20r than when one first structural body is arranged in the unit detection region.

While the embodiments of the present disclosure have been described above in detail, the present disclosure is not limited to the above-described embodiments, and various modifications are possible based on technical concepts of the present disclosure.

For example, configurations, methods, processes, shapes, materials and numeric values exemplified in the above-described embodiments are only examples. Different configurations, methods, processes, shapes, materials and numeric values may be used as necessary.

In addition, it is possible to combine configurations, methods, processes, shapes, materials and numeric values of the above-described embodiments with one another without departing from the spirit and scope of the present disclosure.

In addition, the input device may have no metal film, and a change in electrostatic capacitance of the detection unit may be detected by capacitive coupling between the operant and the X electrodes and between the conductor layer and the Y electrodes. In this case, a flexible sheet (refer to the second embodiment) made of an insulating material can be used as the operation member. Even in such a configuration, it is possible to obtain the input device in which first and second supports change distances of the operant and the conductor layer from the detection unit and the operation position and the pressing force are detected with high accuracy.

While it has been described in the above-described embodiments that the detection unit includes the capacity element using the mutual capacitance method, a capacity element using a self-capacitance method may be used. In this case, it is possible to detect the input operation based on an amount of change in electrostatic capacitance of each of the metal film and the conductor layer and an electrode layer included in the detection unit.

In addition, the configuration of the input device is not limited to a planar shape configuration. For example, the input device may be embedded in the electronic apparatus such that the first surface becomes a curved surface. That is, the sensor device of the present disclosure has a flexible configuration as a whole and thus an implementation method with a high degree of freedom is possible.

Additionally, the present technology may also be configured as below.

(1)

A sensor device including:

a first conductor layer that has flexibility;

an electrode substrate; and a plurality of first structural bodies configured to separate the first conductor layer from the electrode substrate, wherein the electrode substrate includes a plurality of first electrodes and a plurality of second electrodes intersecting the plurality of first electrodes, and wherein at least one of the first and second electrodes includes a plurality of sub-electrodes.

(2)

The sensor device according to (1), further including:

a second conductor layer provided to face the first conductor layer; and a plurality of second structural bodies configured to separate the electrode substrate from the second conductor layer, wherein the electrode substrate has flexibility.

(3)

The sensor device according to any of (1) to (2), wherein both the first and second electrodes include the plurality of sub-electrodes, and wherein the plurality of sub-electrodes included in the first and second electrodes intersect in a mesh form at intersections between the first and second electrodes.

(4)

The sensor device according to (2), wherein the electrode substrate is capable of electrostatically detecting a change in a distance to each of the first conductor layer and the second conductor layer.

(5)

The sensor device according to any of (1) to (4), wherein the electrode substrate includes a plurality of detection units formed at intersections between the plurality of first electrodes and the plurality of second electrodes.

(6)

The sensor device according to (5), wherein a unit region is provided to correspond to each of the intersections between the plurality of first electrodes and the plurality of second electrodes, and wherein the detection unit is provided to face the first structural body or a group of the first structural bodies and is included in the unit region.

(7)

The sensor device according to (5), wherein a unit region is provided to correspond to each of the intersections between the plurality of first electrodes and the plurality of second electrodes, and wherein the detection unit is provided to face the second structural body or a group of the second structural bodies and is included in the unit region.

(8)

The sensor device according to (2), further including:

a first frame provided along a circumference of the electrode substrate between the first conductor layer and the electrode substrate; and a second frame provided along the circumference of the electrode substrate between the second conductor layer and the electrode substrate.

(9)

The sensor device according to (2), wherein the second conductor layer includes a step portion.

(10)

The sensor device according to (2), wherein the second conductor layer includes a plurality of openings, and wherein the openings are arranged at a region not facing the second structural body or a region facing none of the second structural bodies forming a group.

(11)

The sensor device according to (5), wherein the second conductor layer includes a plurality of openings, and wherein the openings are arranged at a region not facing the detection unit.

(12)

The sensor device according to (5), wherein a density of intersecting points formed by intersection of the plurality of sub-electrodes is higher in a center portion of the detection unit than in a peripheral portion of the detection unit.

(13)

The sensor device according to (6), wherein a density of intersecting points formed by intersection of the plurality of sub-electrodes is higher in a region facing the first structural body or the group of the first structural bodies than in a region facing the second structural body.

(14)

The sensor device according to (7), wherein a density of intersecting points formed by intersection of the plurality of sub-electrodes is higher in a region facing the second structural body or the group of the second structural bodies than in a region facing the first structural body.

(15)

The sensor device according to (13), wherein the intersecting points formed by the intersection of the plurality of sub-electrodes are not provided in the region facing the second structural body.

(16)

The sensor device according to (14), wherein the intersecting points formed by the intersection of the plurality of sub-electrodes are not provided in the region facing the first structural body.

(17)

The sensor device according to (13), wherein the intersecting points formed by the intersection of the plurality of sub-electrodes are provided in the region facing the first structural body or the group of the first structural bodies, or inside of the region.

(18)

The sensor device according to (14), wherein the intersecting points formed by the intersection of the plurality of sub-electrodes are provided in the region facing the second structural body or the group of the second structural bodies, or inside of the region.

(19)

The sensor device according to (12), wherein the sensor device is supported by the peripheral portion of the detection unit from a rear surface of the second conductor layer.

(20)

The sensor device according to (13), wherein the sensor device is supported at a position facing the second structural body from a rear surface of the second conductor layer.

(21)
The sensor device according to (14),
wherein the sensor device is supported at a position facing the first structural body from a rear surface of the second conductor layer.

(22)
The sensor device according to any of (1) to (21),
wherein the plurality of first electrodes are provided between the plurality of second electrodes and the first conductor layer, and
wherein, of the first and second electrodes, the first electrodes include a plurality of sub-electrodes.

(23)
An input device including:
an operation member that has flexibility;
an electrode substrate; and
a plurality of first structural bodies configured to separate the operation member from the electrode substrate,
wherein the electrode substrate includes a plurality of first electrodes and a plurality of second electrodes intersecting the plurality of first electrodes, and
wherein at least one of the first and second electrodes includes a plurality of sub-electrodes.

(24)
The input device according to (23),
wherein the operation member includes a metal film provided on a surface facing the electrode substrate.

(25)
The input device according to (23),
wherein the operation member includes a display unit.

(26)
The input device according to (23),
wherein the operation member includes a plurality of key regions.

(27)
The input device according to (26),
wherein the electrode substrate includes a plurality of detection units formed at intersections between the plurality of first electrodes and the plurality of second electrodes.

(28)
The input device according to (27), further including:
a control unit configured to generate a signal according to an input operation with respect to each of the plurality of key regions based on a change in electrostatic capacitance of the plurality of detection units.

(29)
The input device according to (26),
wherein the plurality of second structural bodies are provided along a boundary between the plurality of key regions.

(30)
An electronic apparatus including:
an operation member that has flexibility;
an electrode substrate;
a plurality of first structural bodies configured to separate the operation member from the electrode substrate; and
a control unit configured to generate a signal according to an input operation with respect to the operation member based on a change in electrostatic capacitance of the electrode substrate,
wherein the electrode substrate includes a plurality of first electrodes and a plurality of second electrodes intersecting the plurality of first electrodes, and
wherein at least one of the first and second electrodes includes a plurality of sub-electrodes.

Additionally, the present technology may also be configured as below.

(1)
A sensor device including:
a first conductor layer;
an electrode substrate; and
a plurality of first structural bodies configured to separate the first conductor layer from the electrode substrate,
wherein at least one of the first conductor layer and the electrode substrate has flexibility,
wherein the electrode substrate includes a plurality of first electrodes and a plurality of second electrodes intersecting the plurality of first electrodes, and
wherein at least one of the first and second electrodes includes a plurality of sub-electrodes.

(2)
The sensor device according to (1), further including:
a second conductor layer; and
a plurality of second structural bodies configured to separate the electrode substrate from the second conductor layer,
wherein the electrode substrate has flexibility.

(3)
The sensor device according to (1) or (2),
wherein both the first and second electrodes include the plurality of sub-electrodes, and
wherein the plurality of sub-electrodes included in the first and second electrodes intersect in a mesh form at intersections between the first and second electrodes.

(4)
The sensor device according to (2),
wherein the electrode substrate is capable of electrostatically detecting a change in a distance to each of the first conductor layer and the second conductor layer.

(5)
The sensor device according to any of (1) to (4),
wherein the electrode substrate includes a plurality of detection units formed at intersections between the plurality of first electrodes and the plurality of second electrodes.

(6)
The sensor device according to (5),
wherein a unit region is provided to correspond to each of the intersections between the plurality of first electrodes and the plurality of second electrodes, and
wherein the detection unit is provided to face the first structural body or a group of the first structural bodies and is included in the unit region.

(7)
The sensor device according to (5),
wherein a unit region is provided to correspond to each of the intersections between the plurality of first electrodes and the plurality of second electrodes, and
wherein the detection unit is provided to face the second structural body or a group of the second structural bodies and is included in the unit region.

(8)
The sensor device according to (2), further including:
a first frame provided along a circumference of the electrode substrate between the first conductor layer and the electrode substrate; and
a second frame provided along the circumference of the electrode substrate between the second conductor layer and the electrode substrate.

(9)
The sensor device according to (2),
wherein the second conductor layer includes a step portion.

(10)

The sensor device according to (2), wherein the second conductor layer includes a plurality of openings, and wherein the openings are arranged at a region not facing the second structural body or a region facing none of the second structural bodies forming a group.

(11)

The sensor device according to (5), wherein the second conductor layer includes a plurality of openings, and wherein the openings are arranged at a region not facing the detection unit.

(12)

The sensor device according to (5), wherein a density of intersecting points formed by intersection of the plurality of sub-electrodes is higher in a center portion of the detection unit than in a peripheral portion of the detection unit.

(13)

The sensor device according to (6), wherein a density of intersecting points formed by intersection of the plurality of sub-electrodes is higher in a region facing the first structural body or the group of the first structural bodies than in a region facing the second structural body.

(14)

The sensor device according to (7), wherein a density of intersecting points formed by intersection of the plurality of sub-electrodes is higher in a region facing the second structural body or the group of the second structural bodies than in a region facing the first structural body.

(15)

The sensor device according to (13), wherein the intersecting points formed by the intersection of the plurality of sub-electrodes are not provided in the region facing the second structural body.

(16)

The sensor device according to (14), wherein the intersecting points formed by the intersection of the plurality of sub-electrodes are not provided in the region facing the first structural body.

(17)

The sensor device according to (13), wherein the intersecting points formed by the intersection of the plurality of sub-electrodes are provided in the region facing the first structural body or the group of the first structural bodies, or inside of the region.

(18)

The sensor device according to (14), wherein the intersecting points formed by the intersection of the plurality of sub-electrodes are provided in the region facing the second structural body or the group of the second structural bodies, or inside of the region.

(19)

The sensor device according to (12), wherein the sensor device is supported by the peripheral portion of the detection unit from a rear surface of the second conductor layer.

(20)

The sensor device according to (13), wherein the sensor device is supported at a position facing the second structural body from a rear surface of the second conductor layer.

(21)

The sensor device according to (14), wherein the sensor device is supported at a position facing the first structural body from a rear surface of the second conductor layer.

(22)

The sensor device according to (1), wherein the plurality of first electrodes are provided between the plurality of second electrodes and the first conductor layer, and wherein, of the first and second electrodes, the first electrodes include a plurality of sub-electrodes.

(23)

An input device including:

an operation member that includes a conductor layer;

an electrode substrate; and a plurality of first structural bodies configured to separate the operation member from the electrode substrate, wherein at least one of the first conductor layer and the electrode substrate has flexibility, wherein the electrode substrate includes a plurality of first electrodes and a plurality of second electrodes intersecting the plurality of first electrodes, and wherein at least one of the first and second electrodes includes a plurality of sub-electrodes.

(24)

The input device according to (23), wherein the operation member includes a display unit.

(25)

The input device according to (23) or (24), wherein the operation member includes a plurality of key regions.

(26)

The input device according to (25), wherein the electrode substrate includes a plurality of detection units formed at intersections between the plurality of first electrodes and the plurality of second electrodes.

(27)

The input device according to (26), further including:

a control unit configured to generate a signal according to an input operation with respect to each of the plurality of key regions based on a change in electrostatic capacitance of the plurality of detection units.

(28)

The input device according to (25), wherein the plurality of second structural bodies are provided along a boundary between the plurality of key regions.

(29)

An electronic apparatus including:

an operation member that includes a conductor layer;

an electrode substrate;

a plurality of first structural bodies configured to separate the operation member from the electrode substrate; and a control unit configured to generate a signal according to an input operation with respect to the operation member based on a change in electrostatic capacitance of the electrode substrate, wherein at least one of the first conductor layer and the electrode substrate has flexibility, wherein the electrode substrate includes a plurality of first electrodes and a plurality of second electrodes intersecting the plurality of first electrodes, and wherein at least one of the first and second electrodes includes a plurality of sub-electrodes.

(30)

A sensor device including:

a first conductor layer that has flexibility;

an electrode substrate; and a plurality of first structural bodies configured to separate the first conductor layer from the electrode substrate, wherein the electrode substrate includes a plurality of first electrodes and a plurality of second electrodes intersecting the plurality of first electrodes, and wherein at least one of the first and second electrodes includes a plurality of sub-electrodes.

(31)

A sensor device including:

a first layer;

a second layer;

an electrode substrate provided between the first and second layers; and a plurality of structural bodies configured to separate at least one of the first and second layers from the electrode substrate, wherein at least one of the first and second layers includes a conductive layer, wherein at least one of the first layer and the electrode substrate has flexibility, wherein the electrode substrate includes a plurality of first electrodes and a plurality of second electrodes intersecting the plurality of first electrodes, and wherein at least one of the first and second electrodes includes a plurality of sub-electrodes.

(32)

An input device including:

a first layer that includes an operation member;

a second layer;

an electrode substrate provided between the first and second layers; and a plurality of structural bodies configured to separate at least one of the first and second layers from the electrode substrate, wherein at least one of the first layer and the electrode substrate has flexibility, wherein the electrode substrate includes a plurality of first electrodes and a plurality of second electrodes intersecting the plurality of first electrodes, and wherein at least one of the first and second electrodes includes a plurality of sub-electrodes.

(33)

An electronic apparatus including:

a first layer that includes an operation member;

a second layer;

an electrode substrate provided between the first and second layers;

a plurality of structural bodies configured to separate at least one of the first and second layers from the electrode substrate; and a control unit configured to generate a signal according to an input operation with respect to the operation member based on a change in electrostatic capacitance of the electrode substrate, wherein at least one of the first layer and the electrode substrate has flexibility, wherein the electrode substrate includes a plurality of first electrodes and a plurality of second electrodes intersecting the plurality of first electrodes, and wherein at least one of the first and second electrodes includes a plurality of sub-electrodes.

(34)

A sensor device including:

a first layer;

a second layer;

an electrode substrate provided between the first and second layers; and a plurality of structural bodies configured to separate at least one of the first and second layers from the electrode substrate, wherein at least one of the first and second layers includes a conductive layer, wherein at least one of the first layer and the electrode substrate has flexibility, wherein the electrode substrate includes a plurality of first electrodes having a plurality of first unit electrode bodies and a plurality of second electrodes having a plurality of second unit electrode bodies, and wherein at least one of the first and second unit electrode bodies includes a plurality of sub-electrodes.

(35)

The sensor device according to (34), wherein a detection unit is configured by a pair of first and second electrode bodies.

(36)

The sensor device according to (34), wherein the first and second electrode bodies are arranged to face each other.

(37)

The sensor device according to any of (34) to (36), wherein the plurality of first electrodes and the plurality of second electrodes intersect.

(38)

The sensor device according to (34) or (35), wherein the first unit electrode body includes a plurality of first sub-electrodes, wherein the second unit electrode body includes a plurality of second sub-electrodes, and wherein the plurality of first sub-electrodes and the plurality of second sub-electrodes are alternately arranged on the same plane.

REFERENCE SIGNS LIST 1 sensor device
100, 100A, 100B, 100C input device
10, 10A, 10B operation member
11 flexible display (display unit)
12 metal film (first conductor layer)
20 electrode substrate
20s detection unit
20r unit detection region
210 first electrode line
220 second electrode line
30 first support
310 first structural body
320 first frame
330 first space portion
40 second support
410 second structural body
420 second frame
430 second space portion
50 conductor layer (second conductor layer)
51 step portion
60 control unit
70, 70B electronic apparatus
710 controller

The invention claimed is:

1. A sensor device comprising:
a first conductor layer;
an electrode substrate;
a plurality of first structural bodies configured to separate the first conductor layer from the electrode substrate, wherein:

at least one of the first conductor layer and the electrode substrate has flexibility, the electrode substrate includes a plurality of first electrodes and a plurality of second electrodes intersecting the plurality of first electrodes, at least one first electrode of the plurality of first electrodes includes a plurality of first sub-electrodes, and the plurality of first sub-electrodes intersect at least one second electrode of the plurality of second electrodes at a plurality of different locations along the at least one second electrode;

a second conductor layer; and a plurality of second structural bodies configured to separate the electrode substrate from the second conductor layer, wherein:

the at least one second electrode of the plurality of second electrodes includes a plurality of second sub-electrodes, and a density of intersecting points formed by intersection of the plurality of first sub-electrodes and the plurality of second sub-electrodes is higher in a region aligned, in a direction perpendicular to the electrode substrate, with a first structural body or a group of first structural bodies of the plurality of first structural bodies than in a region aligned, in a direction perpendicular to the electrode substrate, with a second structural body of the plurality of second structural bodies.

2. The sensor device according to claim 1, wherein the electrode substrate has flexibility.

3. The sensor device according to claim 1, wherein the plurality of first sub-electrodes included in the at least one first electrode and the plurality of second sub-electrodes included in the at least one second electrode intersect in a mesh form.

4. The sensor device according to claim 1, wherein the electrode substrate is capable of electrostatically detecting a change in a distance to the first conductor layer and a change in a distance to the second conductor layer.

5. The sensor device according to claim 1, wherein the electrode substrate includes a plurality of detection units formed at intersections between the plurality of first electrodes and the plurality of second electrodes.

6. The sensor device according to claim 5, wherein a detection unit of the plurality of detection units is included in a unit region corresponding to an intersection of the intersections between the plurality of first electrodes and the plurality of second electrodes, and wherein the detection unit is aligned, in a direction perpendicular to the electrode substrate, with the first structural body or the group of first structural bodies of the plurality of first structural bodies.

7. The sensor device according to claim 5, wherein a density of intersecting points formed by intersection of the plurality of first sub-electrodes and the plurality of second sub-electrodes is higher in a center portion of a detection unit of the plurality of detection units than in a peripheral portion of the detection unit.

8. The sensor device according to claim 7, wherein the sensor device is supported by the peripheral portion of the detection unit from a rear surface of the second conductor layer.

9. The sensor device according to claim 1, further comprising:

a first frame provided along a circumference of the electrode substrate between the first conductor layer and the electrode substrate; and a second frame provided along the circumference of the electrode substrate between the second conductor layer and the electrode substrate.

10. The sensor device according to claim 1, wherein the second conductor layer includes a step portion.

11. The sensor device according to claim 1, wherein the second conductor layer includes a plurality of openings, and wherein the openings are arranged at a region not aligned, in a direction perpendicular to the electrode substrate, with any second structural body of the plurality of second structural bodies.

12. The sensor device according to claim 1, wherein the electrode substrate includes a plurality of detection units formed at intersections between the plurality of first electrodes and the plurality of second electrodes wherein the second conductor layer includes a plurality of openings, and wherein the openings are arranged at a region not aligned, in a direction perpendicular to the electrode substrate, with any detection unit of the plurality of detection units.

13. The sensor device according to claim 1, wherein the intersecting points formed by the intersection of the plurality of first sub-electrodes and the plurality of second sub-electrodes are not provided in the region aligned, in the direction perpendicular to the electrode substrate, with the second structural body.

14. The sensor device according to claim 1, wherein the intersecting points formed by the intersection of the plurality of first sub-electrodes and the plurality of second sub-electrodes are provided in the region aligned, in the direction perpendicular to the electrode substrate, with the first structural body or the group of the first structural bodies.

15. The sensor device according to claim 1, wherein the sensor device is supported at a position aligned, in a direction perpendicular to the electrode substrate, with the second structural body from a rear surface of the second conductor layer.

16. The sensor device according to claim 1, wherein the plurality of first electrodes are provided between the plurality of second electrodes and the first conductor layer.

* * * * *